(12) United States Patent
Kamath

(10) Patent No.: US 11,514,285 B2
(45) Date of Patent: *Nov. 29, 2022

(54) ARTWORK GENERATED TO CONVEY DIGITAL MESSAGES, AND METHODS/APPARATUSES FOR GENERATING SUCH ARTWORK

(71) Applicant: Digimarc Corporation, Beaverton, OR (US)

(72) Inventor: Ajith M. Kamath, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,497

(22) Filed: Jun. 9, 2021

(65) Prior Publication Data
US 2021/0374496 A1 Dec. 2, 2021

Related U.S. Application Data

(63) Continuation of application No. 16/833,178, filed on Mar. 27, 2020, now Pat. No. 11,037,038.

(60) Provisional application No. 62/972,522, filed on Feb. 10, 2020, provisional application No. 62/966,510, filed on Jan. 27, 2020, provisional application No. 62/946,732, filed on Dec. 11, 2019, provisional application No. 62/916,021, filed on Oct. 16, 2019, provisional application No. 62/841,084, filed on Apr. 30, 2019, provisional application No. 62/824,934, filed on Mar. 27, 2019.

(51) Int. Cl.
*G06K 19/06* (2006.01)
*G06K 1/12* (2006.01)

(52) U.S. Cl.
CPC ....... *G06K 19/06103* (2013.01); *G06K 1/121* (2013.01); *G06K 19/06037* (2013.01)

(58) Field of Classification Search
CPC ........... G06K 9/00771; G06K 9/00671; G06Q 10/06; G06Q 19/087
USPC .......................... 235/494, 454, 462.09, 462.1
See application file for complete search history.

(56) References Cited

U.S. PATENT DOCUMENTS

| | | |
|---|---|---|
| 5,649,032 A | 7/1997 | Burt |
| 6,122,403 A | 9/2000 | Rhoads |
| 6,137,498 A | 10/2000 | Silvers |

(Continued)

FOREIGN PATENT DOCUMENTS

WO 2020198660 10/2020

OTHER PUBLICATIONS

Kamath, Hiding in Plain Sight: Enabling the Vision of Signal Rich Art, IS&T Int'l Symposium on Electronic Imaging, Jan. 2019.

(Continued)

*Primary Examiner* — Daniel St. Cyr
(74) *Attorney, Agent, or Firm* — Digimarc Corporation

(57) ABSTRACT

2D machine readable symbologies are stylized and made aesthetically-appealing, facilitating their use to convey plural-symbol data on product packaging and other articles. In some arrangements, symbologies are stylized by geometric transformations (e.g., by multiple rotation and/or mirroring operations) to develop tiles having organized geometric structures. Such stylized symbologies can be decoded by existing code readers. A great variety of other features and arrangements are also detailed.

20 Claims, 50 Drawing Sheets
(6 of 50 Drawing Sheet(s) Filed in Color)

(56) References Cited

U.S. PATENT DOCUMENTS

| | | |
|---|---|---|
| 6,532,312 B1 | 3/2003 | Corkran |
| 6,590,996 B1 | 7/2003 | Reed |
| 6,614,914 B1 | 9/2003 | Rhoads |
| 6,665,451 B1 | 12/2003 | Kusama |
| 6,687,419 B1 | 2/2004 | Atkin |
| 6,724,946 B1 | 4/2004 | Kusama |
| 6,975,744 B2 | 12/2005 | Sharma |
| 6,993,152 B2 | 1/2006 | Patterson |
| 7,044,395 B1 | 5/2006 | Davis |
| 7,321,667 B2 | 1/2008 | Stach |
| 8,023,160 B2 | 9/2011 | Monga |
| 8,340,423 B1 | 12/2012 | Zelinka |
| 8,412,577 B2 | 4/2013 | Rodriguez |
| 9,690,967 B1 | 6/2017 | Brundage |
| 9,747,656 B2 | 8/2017 | Stach |
| 9,760,820 B2 * | 9/2017 | Lin .................. G06K 19/0614 |
| 9,864,919 B2 | 1/2018 | Reed |
| 9,959,587 B2 | 5/2018 | Sharma |
| 10,242,434 B1 | 3/2019 | Holub |
| 10,496,861 B2 * | 12/2019 | Rothschild ........... G06K 7/1417 |
| 10,558,900 B2 * | 2/2020 | Zhu ................. G06K 19/06037 |
| 10,621,482 B2 * | 4/2020 | Wang ............... G06K 19/06103 |
| 11,164,059 B2 * | 11/2021 | Zhu ................. G06K 19/06046 |
| 2002/0136429 A1 | 9/2002 | Stach |
| 2003/0001858 A1 | 1/2003 | Jack |
| 2004/0022444 A1 * | 2/2004 | Rhoads ................. G06V 20/80 |
| | | 382/232 |
| 2004/0022453 A1 | 2/2004 | Kusama |
| 2004/0047518 A1 | 3/2004 | Tiana |
| 2005/0047651 A1 | 3/2005 | Zheng |
| 2005/0147322 A1 | 7/2005 | Saed |
| 2005/0207615 A1 | 9/2005 | Stach |
| 2011/0050723 A1 | 3/2011 | Tokunaga |
| 2011/0058736 A1 | 3/2011 | Tokunaga |
| 2011/0103683 A1 | 5/2011 | Tokunaga |
| 2011/0214044 A1 | 9/2011 | Davis |
| 2011/0268369 A1 | 11/2011 | Richards |
| 2015/0262335 A1 | 9/2015 | Padwick |
| 2015/0324946 A1 | 11/2015 | Arce |
| 2016/0364623 A1 | 12/2016 | Evans |
| 2017/0024840 A1 | 1/2017 | Holub |
| 2017/0249491 A1 | 8/2017 | MacIntosh |
| 2019/0139176 A1 | 5/2019 | Stach |
| 2019/0171856 A1 | 6/2019 | Sharma |
| 2019/0213705 A1 | 7/2019 | Kamath |
| 2019/0266749 A1 | 8/2019 | Rhoads |
| 2019/0306385 A1 | 10/2019 | Sharma |
| 2019/0332840 A1 | 10/2019 | Sharma |
| 2019/0378235 A1 | 12/2019 | Kamath |
| 2020/0311505 A1 | 10/2020 | Kamath |

OTHER PUBLICATIONS

Kamath, Signal Rich Art: Improvements and Applications, presentation at Electronic Imaging Conference, Jan. 27, 2020.
International Search Report and Written Opinion for App. No. PCT/US2020/025420, dated Sep. 7, 2020, 19 pages.
Photographic Mosaic, Wikipedia article, Jan. 10, 2019.
Hunt, PhotoTiled Pictures, 2004.
International Preliminary Report on Patentability and Written Opinion for App No. PCT/US2020/025420, dated Sep. 28, 2021, 11 pages.
Kamath. Signal Rich Art: Object Placement, Object Position Modulation and Other Advances, IS&T Int'l Symposium on Electronic Imaging, Jan. 18, 2021.

* cited by examiner

STYLE IMAGE
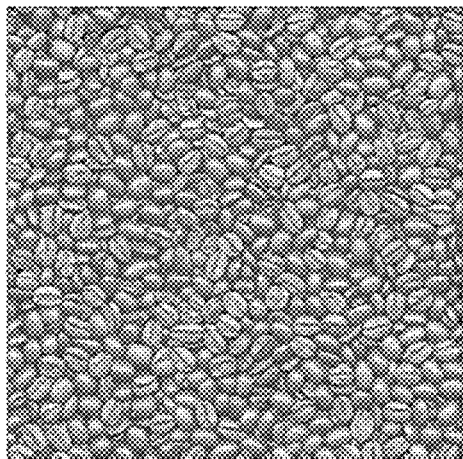
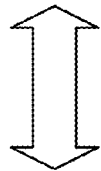
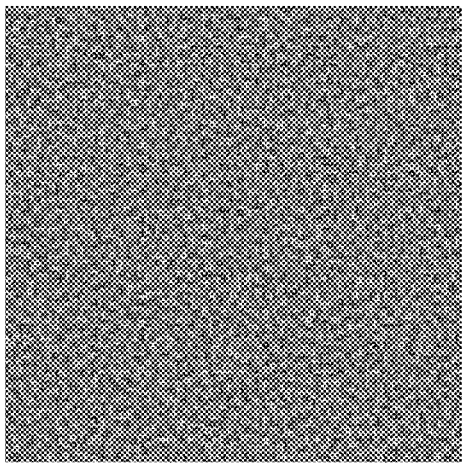
WATERMARK SIGNAL TILE
COLLAGE IMAGE
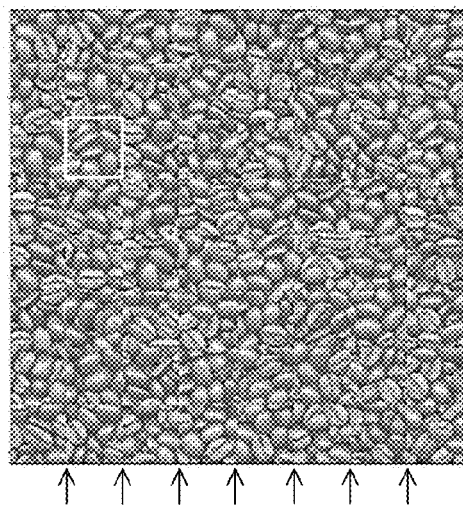
FIG. 4

```
clear all;%close all
%% Prepare image
im = imread('circles.tif');
im = imresize(im,[256,256]);
image = mean(double(im),3); % convert to gray-scale and double
figure(1);subplot(121); imshow(uint8(image));title('Style Image')

bkSize = 20; % patchwork block size

%% Vectorize style image blocks
y = im2col(image,[bkSize bkSize]); % convert to 8x8 blocks, each block in column
mx = mean(y); % calculate mean and save it for further processing
B = y - mx;    % zero-mean variable % Vectorize watermark signal blocks
imwm = double(imresize(imread('GP_tile.png'),floor(256/bkSize)*bkSize/512));  % load image
xb = im2col(imwm,[bkSize bkSize],'distinct'); % convert to 8x8 *non-overlapping* blocks, each block in column
xmx = mean(xb); % calculate mean and save it for further processing
x = xb - xmx;   % zero-mean variable %% Correlate and construct collage
beta = 40; % relative weight of correlation and T.V. metric
xo = zeros(size(x)); % output image
```

FIG. 9A

```
% edge vector buffer for T.V. metric
ledge = 127*ones(floor(size(imwm,1)/bkSize), bkSize);

for ii = 1:floor(size(imwm,2)/bkSize)
    tedge = 127*ones(1,bkSize);
    for jj = 1:floor(size(imwm,1)/bkSize)
        bidx = (ii-1)*floor(size(imwm,1)/bkSize) + jj; % signal block index
        edgetv = sum(abs(y(1:bkSize:end,:)-tedge'))+sum(abs(y(1:bkSize,:)-ledge(jj,:)')); % T.V. metric
        metric = B'*x(:,bidx) - beta*edgetv';
        [my,myi] = max(metric); % co-ordinates of best style image block
        xo(:,bidx) = y(:,myi);
        tmp = reshape(xo(:,bidx),bkSize,bkSize);
        ledge(jj,:) = tmp(:,end); % update edge vector buffer
        tedge = tmp(end,:);
    end
end
%%% Restore and plot
figure(1)
subplot(122)
% Reshape vectors to image blocks
oim = col2im(xo,[bkSize bkSize],[fix(size(imwm,1)/bkSize)*bkSize fix(size(imwm,2)/bkSize)*bkSize],'distinct');
imshow(uint8(oim));colormap gray; axis image
title('Collage')
```

FIG. 9B

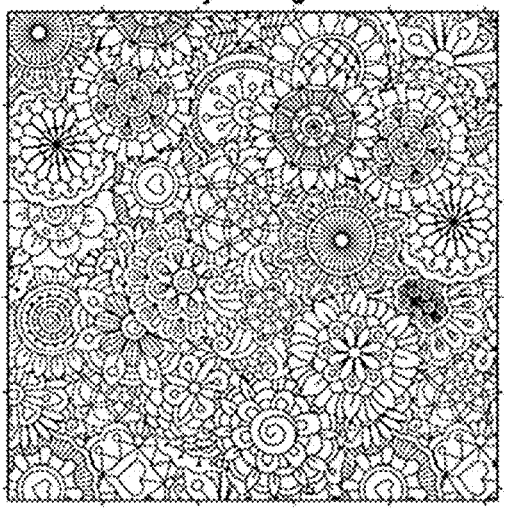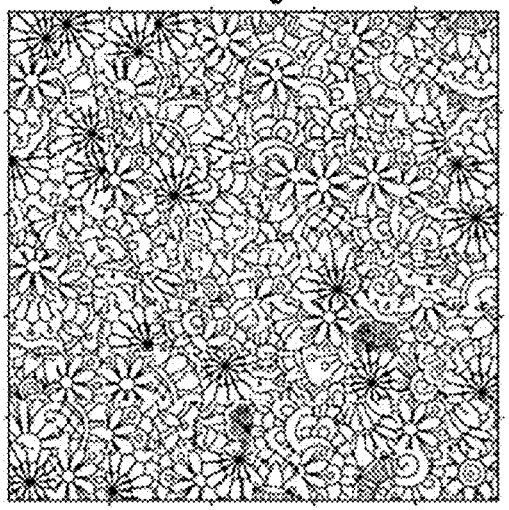
FIG. 10
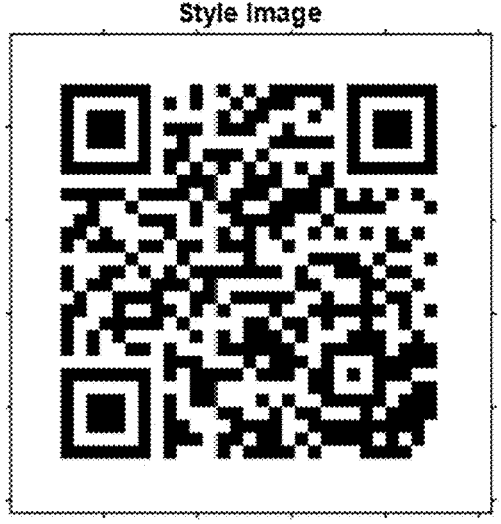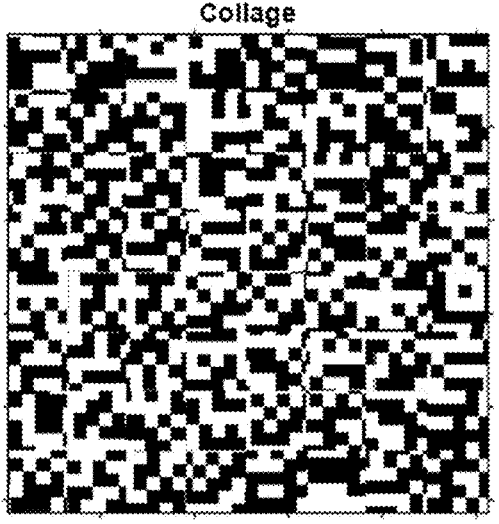
FIG. 11

```
clear all;%close all
%% Prepare image
% im = imread('circles.tif');
im = imread('denim01.jpg');
im = imresize(im,[256,256]/1);
image = mean(double(im),3); % convert to gray-scale and double
imrgb = double(im);

figure(1);subplot(121); imshow(uint8(imrgb));title('Style Image')

bkSize = 24; % patchwork block size

%%% Vectorize style image blocks
y = im2col(image,[bkSize bkSize]); % convert to 8x8 blocks, each block in column
ridx = randi(size(y,2),1,5e3); %choose random subset of blocks for faster processing
y = y(:,ridx);
% im2 = impyramid(image,'reduce');
% y = [y im2col(im2,[bkSize bkSize])];
% im3 = impyramid(im2,'reduce');
% y = [y im2col(im3,[bkSize bkSize])];
mx = mean(y); % calculate mean and save it for further processing
B = y - mx;   % zero-mean variable % Vectorize watermark signal blocks
% imwm = double(imresize(imread('GP_tile.png'),floor(128/bkSize)*bkSize)); % load image
% imwm = double(imresize(cconv2(imread('GP_tile.png'),fspecial('gauss',11,3)),floor(256/bkSize)*bkSize/512)); % load image
imwm = double(imresize(mean(imread('lenaWM.tif'),3),floor(512/bkSize)*bkSize/512)); % load image
oimsiz = fix(size(imwm,1)/bkSize)*bkSize;
cc = zeros(bkSize);cc(bkSize/2+1,bkSize/2+1) = 1;
dd = zeros(oimsiz);dd(end-bkSize/2+1,end-bkSize/2+1) = 1;
```

FIG. 18A

```
[xx,yy] = meshgrid(1:bkSize);
bsp = sin(pi*(xx-.5)/bkSize).^2 + sin(pi*(yy-.5)/bkSize).^2;bsp = bsp/2;
oim = zeros(oimsiz);
ocim = zeros(oimsiz,oimsiz,3);
for kk = 1:2
    if kk == 2
        imwm = cconv2(imwm,cc);
    end
    xb = im2col(imwm,[bkSize bkSize],'distinct'); % convert to 8x8 *non-overlapping* blocks, each block in column
    xmx = mean(xb); % calculate mean and save it for further processing
    x = xb - xmx;  % zero-mean variable %% Correlate and construct collage
    beta = 20; % relative weight of correlation and T.V. metric
    xo = zeros(size(x)); % output image % edge vector buffers for T.V. metric
    ledge = 127*ones(floor(size(imwm,1)/bkSize), bkSize);

cidx = []; % index of best block
    for ii = 1:floor(size(imwm,2)/bkSize)
        tedge = 127*ones(1,bkSize);
        for jj = 1:floor(size(imwm,1)/bkSize)
            bidx = (ii-1)*floor(size(imwm,1)/bkSize) + jj; % signal block index
            edgetv = sum(abs(y(1:bkSize:end,:)-tedge'))+sum(abs(y(1:bkSize,:)-ledge(jj,:)')); % T.V. metric
            met = B'*x(:,bidx) - beta*edgetv';
            [my,myi] = max(met); % co-ordinates of best style image block
            xo(:,bidx) = y(:,myi);
            cidx = [cidx myi]; % save index of best block
            tmp = reshape(xo(:,bidx),bkSize,bkSize);
            ledge(jj,:) = tmp(:,end); % update edge vector buffer
            tedge = tmp(end,:);
        end
    end
end
```

FIG. 18B

```
%%% Restore and plot
% Reshape vectors to image blocks
tmpo = col2im(xo,[bkSize bkSize],[fix(size(imwm,1)/bkSize)*bkSize fix(size(imwm,2)/bkSize)*bkSize],'distinct');
tmpo = tmpo.*kron(ones(fix(size(imwm,1)/bkSize)),bsp);
if kk==2
    tmpo = cconv2(tmpo,dd);
end
oim = oim + tmpo;
% Map to color collage
for ii = 1:3 % Loop over R, G and B color planes
    yc = im2col(imrgb(:,:,ii),[bkSize bkSize]);
    yc = yc(:,ridx);
    cim = col2im(yc(:,cidx),[bkSize bkSize],[fix(size(imwm,1)/bkSize)*bkSize fix(size(imwm,2)/bkSize)*bkSize],'distinct');
    cim = cim.*kron(ones(fix(size(imwm,1)/bkSize)),bsp);
    if kk==2
        cim = cconv2(cim,dd);
    end
    ocim(:,:,ii) = ocim(:,:,ii) + cim;
end
figure(1)
subplot(122)
imshow(uint8(ocim));colormap gray; axis image
title('Composite')
end
```

FIG. 18C

STYLE IMAGE
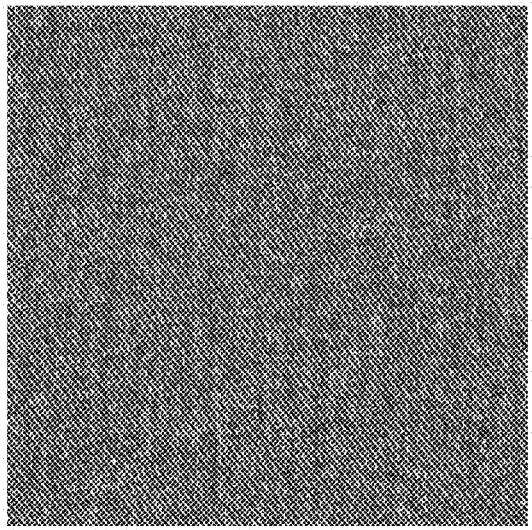
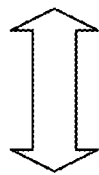
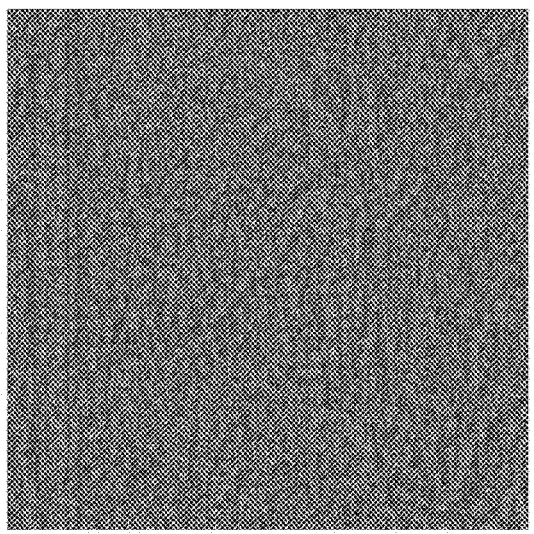
RESULTING COLLAGE
WATERMARKED TARGET IMAGE
FIG. 21

R4 = x + rot90(x) + rot90(x,2) + rot90(x,3)

T4: x + x(:,[(end/4+1):end,1:end/4])+x(:,[(end2+1):end,1:end/2])+x(:,[(end*3/4+1):end,1:end*3/4])

F(M4()): M4() + fftshift(M4())

R4,N,F: x - rot90(x) + rot90(x,2) - rot90(x,3) + fftshift(R4,N)

R14

R60 with geometric sum:

for ii = 1:60, bb = bb*1.04 +imrotate(aa,360/nang*ii,'crop');end

R10000 with geometric sum:

for ii = 1:1e4, bb = bb*1.04 + imrotate(aa,360/nang*ii,'crop');end

S: for ii = 1:21, bb = bb + imresize(aa, size(aa)*(.95).^ii); end

R(S()): for ii = 1:20, bb = bb + imrotate(imresize(aa, size(aa)*(.98).^ii),ii/nsc*20); end

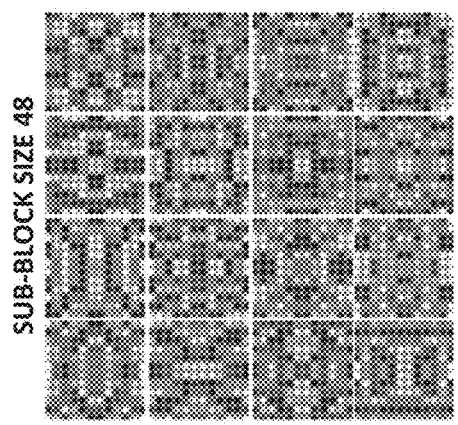
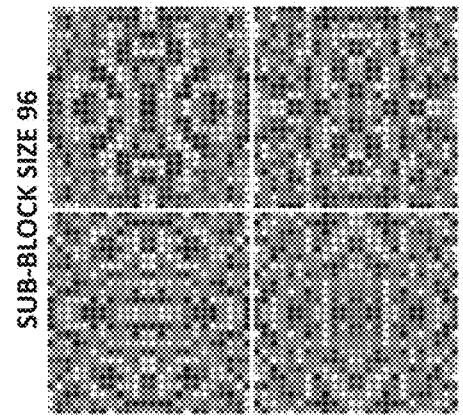
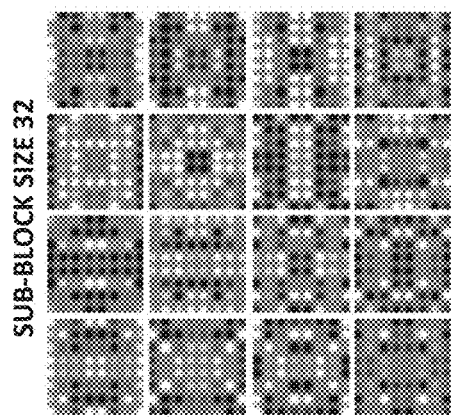
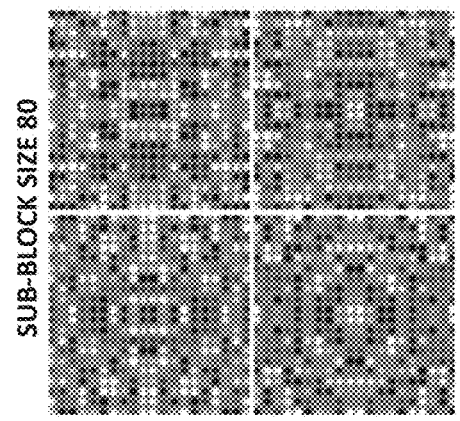
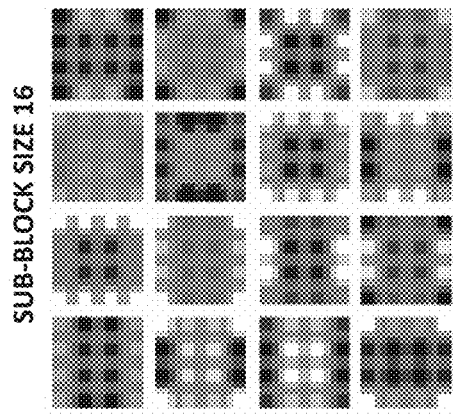
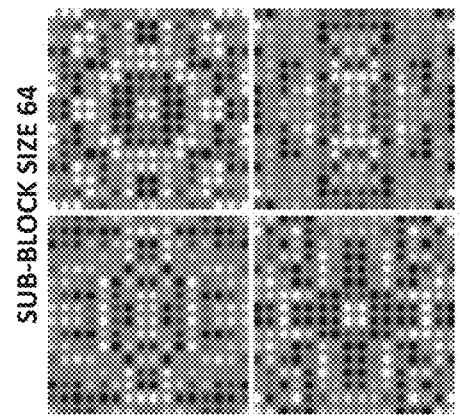
FIG. 48A

Screening & Vector Enhancement
2 for 1: Screen pattern carries independent ID
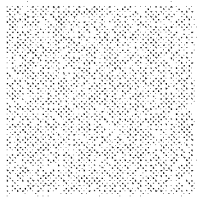
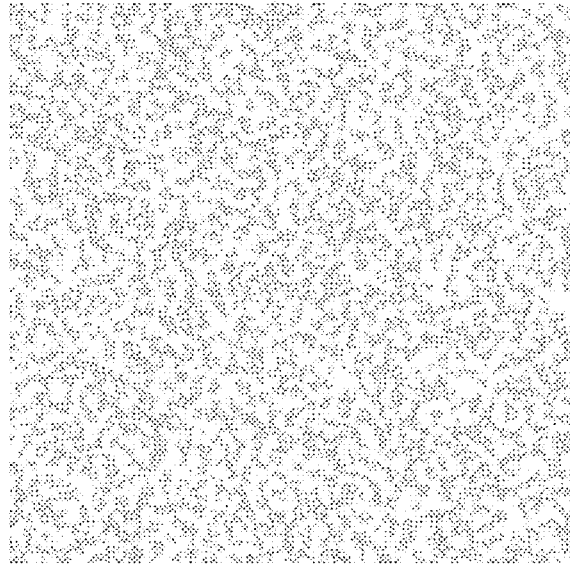
Two screens
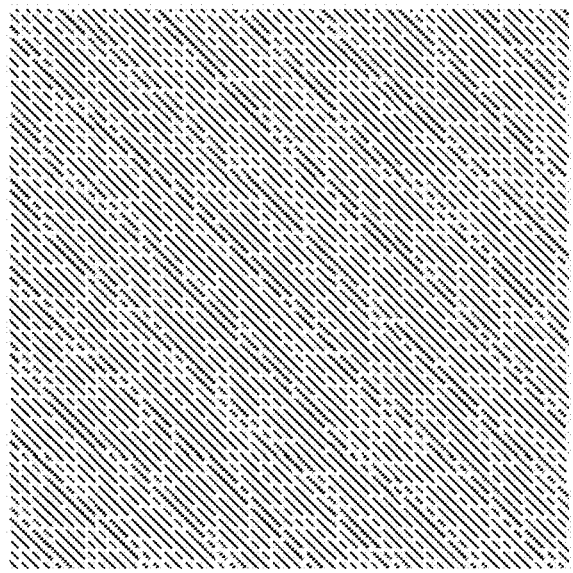
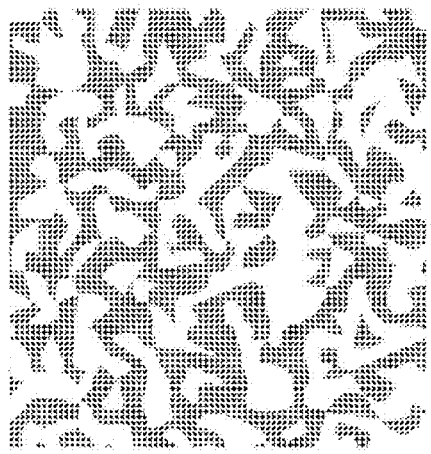
FIG. 56

ARTWORK GENERATED TO CONVEY DIGITAL MESSAGES, AND METHODS/APPARATUSES FOR GENERATING SUCH ARTWORK

RELATED APPLICATION DATA

This application is a continuation of application Ser. No. 16/833,178, filed Mar. 27, 2020 (U.S. Pat. No. 11,037,038), which claims priority to provisional applications 62/972,522, filed Feb. 10, 2020; 62/966,510, filed Jan. 27, 2020, 62/946,732, filed Dec. 11, 2019, 62/916,021, filed Oct. 16, 2019, 62/841,084, filed Apr. 30, 2019, and 62/824,934, filed Mar. 27, 2019.

This application is related to, and builds on the disclosures of, application Ser. No. 16/212,125, filed Dec. 6, 2018 (published as 20190213705), Ser. No. 16/435,164, filed Jun. 7, 2019 (published as 20190378235), Ser. No. 15/072,884, filed Mar. 17, 2016 (published as 20170024840), and Ser. No. 16/405,621, filed May 7, 2019 (published as 20190332840).

The disclosures of the above applications are incorporated herein by reference.

TECHNICAL FIELD

The present technology concerns message signaling. The technology is illustrated in the context of message signaling through artwork of grocery item packaging, to convey plural-bit messages—of the sort presently conveyed by UPC barcodes. However, the technology is not so-limited.

BACKGROUND AND INTRODUCTION

Barcodes are in widespread use on retail items, but take up package real estate that the manufacturers would prefer to use for other purposes. Some retail brands find that printing a barcode on a product detracts from its aesthetics.

Steganographic digital watermarking is gaining adoption as an alternative to visible barcodes. Watermarking involves making subtle changes to packaging artwork to convey a multi-bit product identifier or other message. These changes are commonly imperceptible to humans, but are detectable by a computer.

More particularly, digital watermarks are printed on product packaging for many products and serve to encode a Global Trade Item Number, or GTIN (much like the ubiquitous 1D UPC barcodes). A point of sale scanner in a retail store can detect and decode the watermark data, use it to look up the product's identity and price, and add same to a shopper's checkout tally.

FIGS. 1A and 1B shows illustrative digital watermark patterns, including magnified views depicting their somewhat mottled appearance. In actual use, the watermark pattern is scaled-down in amplitude so that, when overlaid with packaging artwork in a tiled fashion, it is an essentially transparent layer that is visually imperceptible amid the artwork details—just slightly altering local image luminance or chrominance.

Designing watermarked packaging involves establishing a tradeoff between this amplitude factor, and detectability. To assure reliable detection—even under the adverse imaging conditions that are sometimes encountered by supermarket scanners—the watermark should have as strong an amplitude as possible. However, the greater the amplitude, the more apparent the pattern of the watermark becomes on the package. A best balance is struck when the watermark amplitude is raised to just below the point where the watermark pattern becomes visible to human viewers of the packaging.

FIG. 2 illustrates this graphically. When a watermark is added to artwork at low levels, human visibility of the watermark is nil. As strength of the watermark increases, there becomes a point at which humans can start perceiving the watermark pattern. Increases in watermark amplitude beyond this point result in progressively greater perception (e.g., from barely, to mild, to conspicuous, to blatant). Point "A" is the desired "sweet-spot" value, at which the amplitude of the watermark is maximum, while visibility of the watermark is still below the point of human perception.

Setting the watermark amplitude to this sweet-spot value, when creating packaging artwork (e.g., using Adobe Illustrator software), is one thing. Hitting this sweet-spot "on-press" is another.

All print technologies, being physical processes, have inherent uncertainty. Some print technologies have more uncertainty than others. Dry offset printing is one; it is notably inaccurate. (Dry offset is advantageous in other respects; for example, it works well with the tapered shapes of plastic tubs, such as for yogurt and sour cream.)

Dry offset offers only gross control of dot size and other print structures. For example, if a digital artwork file specifies that ink dots are to be laid down with a density of 15%, a dry offset press may deposit a much greater density of ink, e.g., with 30% density.

Printer profiles exist to characterize such behavior. A profile for a particular model of dry offset press may specify that artwork indicating a 15% density will actually be rendered with a 25% density (e.g., a 10% dot gain). But there is a great deal of variation between presses of the same model—depending on factors including age, maintenance, consumables, temperature, etc. So instead of depositing ink at a 25% density—as indicated by a printer's profile, a particular press may instead deposit ink at a 20% density. Or a 40% density. Or anything in between.

This uncertainty poses a big obstacle for use of digital watermark technology. Packaging artwork that has been carefully designed to set the watermark amplitude to the point "A" sweet-spot of FIG. 2, may instead be printed with the watermark amplitude at point "B", making the watermark plainly visible.

Our patent publication 20110214044 teaches that, rather than attempt to hide a digital watermark signal in artwork, the payload data may be encoded as overt elements of the artwork. One example is a digital watermark in which the amplitude is set to a plainly human-visible level. Another example is a 1D or 2D black and white barcode that is used as a fill pattern, e.g., laid down by a paintbrush in Adobe Photoshop software.

These techniques often do not prove satisfactory. As illustrated by FIGS. 1A and 1B, a digital watermark, with its amplitude set to a plainly human-visible level, yields a pattern that does not fit well into the design of most packaging. Painted barcode fills similarly have limited practical utility.

In accordance with one aspect of the technology, a 2D machine-readable code is stylized by a collage process, based on excerpts copied from one or more artworks. The result no longer has the appearance of a machine-readable code, yet can be read by a compliant code reading apparatus. Such a code can be tiled and serve as a background for product packaging artwork, e.g., as shown by the coffee bean background in the yogurt label of FIG. 3. Unlike the arrangements detailed in application Ser. No. 16/212,125

(published as 20190213705), embodiments of the present technology typically do not employ a neural network.

In accordance with another aspect of the technology, a 2D machine-readable code is stylized by performing one or more transformations on the code itself, imparting an aesthetic patterning that can make the code suitable as a graphic design element, while still encoding a plural-bit message. In some arrangements the transformations also serve to extend the circumstances in which the code is readable.

The foregoing and additional features and advantages of the present technology will be more readily apparent from the following detailed description, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 illustrates a style image (depicting coffee beans) and a watermark image, which are processed according to the present technology to generate a coffee bean college that conveys the watermark's payload.

FIGS. 9A and 9B detail Matlab code used in an illustrative embodiment of the present technology.

FIGS. 10, 11 and 12 show style images, and corresponding watermarked collages, in accordance with certain embodiments of the present technology.

FIGS. 18A, 18B and 18C detail Matlab code used in an illustrative embodiment of the present technology.

FIG. 21 illustrates a style image (depicting a denim fabric weave) and a previously-watermarked image (Lena), which are processed according to the present technology to generate a denim collage that depicts the Lena image including its watermark.

FIGS. 48A-48C detail how the patterning produced by certain embodiments of the present embodiment becomes less distinct with larger sub-block sizes.

FIG. 56 shows an example of a signal block formed from combining two different resolution signal blocks.

DETAILED DESCRIPTION

Section I

Figure 3:
FIG. 3 shows artwork for a yogurt container, including a background digital watermark pattern stylized with coffee bean artwork.

An exemplary method according to one embodiment of the present technology produces a stylized version of a digital watermark signal, based on an input digital watermark signal image (sometimes termed a target image) and one or more style images (sometimes termed source images). The stylized version of the watermark signal is composed as a collage (or mosaic or patchwork) from pixel patches excerpted from the style images. To a human observer, the stylized artwork is evocative of the style image(s), rather than the watermark signal (e.g., the background of FIG. 3 appears as a field of coffee beans). To a compliant digital watermark decoder, however, the stylized artwork is interpreted as a signal carrier, conveying an encoded plural-symbol payload. (Digital watermark decoders mostly ignore the low frequency image components that dominate human vision, and instead tend to decode signals from the high frequency pattern variations that elude human eyes.)

The stylized image in a preferred embodiment (sometimes termed a mixed image, or collage, or mosaic image) is created by correlating blocks from the watermark signal image with blocks from the style image (a single style image is assumed for expository convenience). The style image block with the best correlation is substituted for the watermark signal block, for each of the watermark signal blocks. A watermarked pattern is thereby created without the conventional act of modulating pixels in a host image.

Since the resulting payload-conveying stylized image is a patchwork of the unmarked style image, typical watermarking signal visibility criteria need not be considered. But a new visibility concern arises—edge discontinuity in the collage.

To reduce this concern, the watermark signal can be divided into relatively fewer blocks of larger size, reducing the number of adjoining edges in the resulting collage. As a practical matter, the selected size of the watermark signal blocks depends on attributes of the style image—particularly its spatial autocorrelation. If the style image has a very regular pattern, like parallel lines or a repetitive/tiled geometric pattern, it will have a high spatial autocorrelation and may not be suitable for creating a stylized watermark pattern. Other style images, with a bit less spatial autocorrelation, may be suitable, provided the blocks are small in size, e.g., with side dimensions of 1-3% of the side dimensions of the watermark signal image. Better are style images with less autocorrelation, in which case blocks having side dimensions on the order of 3-7% those of the watermark signal image can be used. Best, from an edge artifacts standpoint, are style images with very little autocorrelation, in which blocks having side dimensions on the order of 7-20% those of the watermark signal can be used. This last size produces the smallest number of edge continuities within the collage. (Put another way, style images with the highest translation entropy are generally preferred.)

FIG. 4 shows, on the left, a watermark signal tile that serves as a target image, and a coffee bean image that serves as a style image, which are processed to produce the collage shown on the right.

It will be recognized that there is a great deal of spatial repetition in the coffee bean pattern. That is, its autocorrelation is high. This requires small block sizes. One block is outlined in white in the collage image. The arrows point to the edge boundaries between adjoining blocks in the collage image—boundaries that can be discerned with careful inspection. (The horizontal edge boundaries are not particularly identified.) In this composite image there are 64 blocks. That is, each block occupies about 1.6% of the watermark signal image area.

Figures 5, 6:
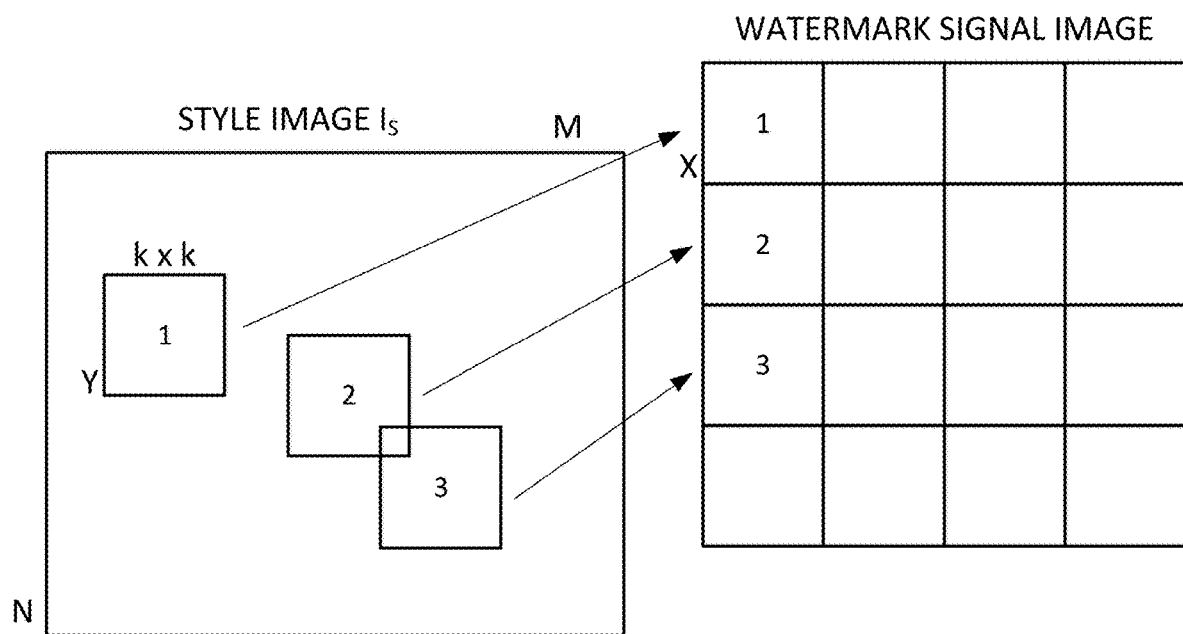
FIG. 5 schematically illustrates the selection of blocks from a style image to mimic a watermark pattern by a tiled collage.
FIG. 6 depicts a matrix operation employed in an illustrative embodiment of the present technology.

FIG. 5 conceptually shows the process. A regular array of blocks is identified within a watermark signal image. For each watermark signal block, a corresponding block is identified from within a style image, based on a similarity measure such as correlation, and copied to that position in the watermark signal image (or into a corresponding output image frame).

In a particular embodiment, the watermark signal image is divided into an array of k×k pixel blocks. Each of these is correlated against every k×k pixel excerpt within an N×M pixel style image, by a cross-correlation operation. For a k×k watermark signal block X, the cross-correlation operation with a single same-sized block Y in the style image can be expressed as:

$$x\text{corr}(X, Y) = \sum_{j=1}^{k}\sum_{i=1}^{k} (x_{ij} - m_x)(y_{ij} - m_y)$$

Where $m_x$ is the average value of the watermark signal block X, and $m_y$ is the average value of the style image block Y.

This double-summation expression can be rewritten as a matrix function B, as indicated by FIG. 6. Each column in this matrix is the vector of $k^2$ pixels $y=[y_{ij}-m_y]$ in each k×k block of the style image, where $m_y$ is the mean value of the pixels in that block. There are (M−k)(N−k) blocks of size k×k in the style image of size MN. Hence we obtain a matrix of size $k^2\times(M-k)(N-k)$ by stacking all the vectors y as columns. (For large style images, we may prune the number of columns in the matrix B, by choosing a random sub sample of the columns up to a target number of columns.) Similarly, we create a vector $x=[x_{ij}-m_x]$ from the image block X in the watermark signal image.

From this matrix expression we may write:

$$x\text{corr}(X,Y) = x^T y$$

a simple vector inner product operation.

Then the co-ordinates u, v of the block in the style image with the best correlation with the current watermark signal image block, out of all possible blocks in the style image, are given by:

$$\max_{u,v} x^T B$$

The edge artifacts caused by tiling disparate blocks from the style image can be mitigated by considering edge continuity as a factor when selecting blocks from the style image.

Figure 7:
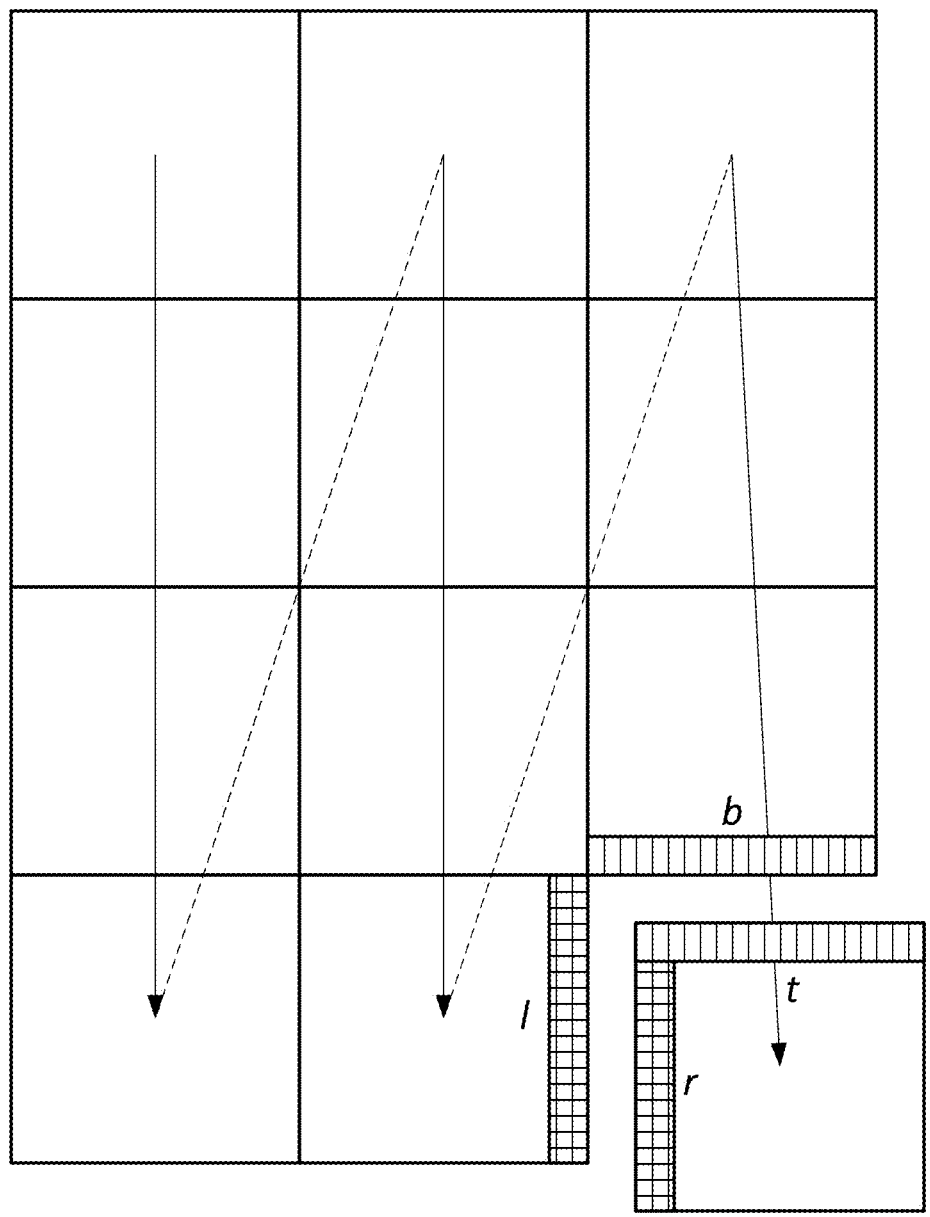
FIG. 7 is a diagram showing adjoining edges that are considered as each block is added to a tiled collage, so as to minimize edge discontinuities.

The arrows in FIG. 7 show a progression of adding blocks to the collage. To reduce edge discontinuities, an edge discontinuity metric (or similarity metric) can be employed. One may be termed a Total Variation (T.V.) metric and is defined as:

$$T.V.=\sum_{i=1}^{k}(|b_i-t_i|+|r_i-l_i|).$$

This factor evaluates congruence between the bottom edge ("b") edge of the previously-added style block above, and the top-edge ("t") of the style block under consideration, and similarly considers congruence between the right edge ("r") of a previously-added style block to the left, and the left edge ("l") of the style block under consideration. In one exemplary arrangement, the absolute differences in pixel values along each of these two edges are summed.

(At the outer edges of the watermark signal image, where there is no adjoining block, we assume uniform pixel values of 127—mid-grey in a 0-255 pixel scale.)

To reduce edge artifacts, we want to minimize this T.V. metric, which is the same as maximizing its negative value. We thus combine the TV metric with the cross-correlation metric in a weighted sum to create a single metric for optimization:

$$\max_{u,v}\left[\alpha x^T B - \beta\left(\sum_{i=1}^{k}(|b_i-t_i|+|r_i-l_i|)\right)\right]$$

where α is a weighting factor for the correlation term, and β is a weighting factor for the edge continuity term. Put another way, parameters α,β determine the signal strength and embedding smoothness, respectively.

The result does not change by multiplying both of the parameters by a common factor; only their ratio matters. For example, to get the most signal, but also the most discontinuous edges, the parameters can be set as α=1,β=0. At the other extreme, with α=0,β=1, there is nil watermark signal, but smooth edge transitions.

Figure 8A:
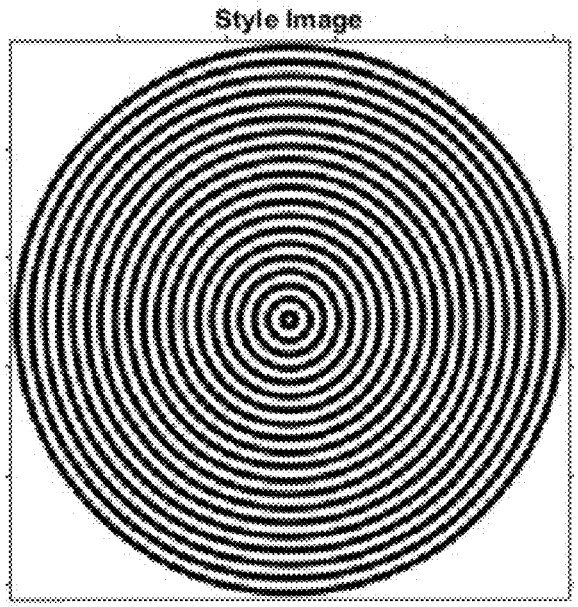
FIG. 8A shows a style image depicting concentric circles.
Figure 8B:
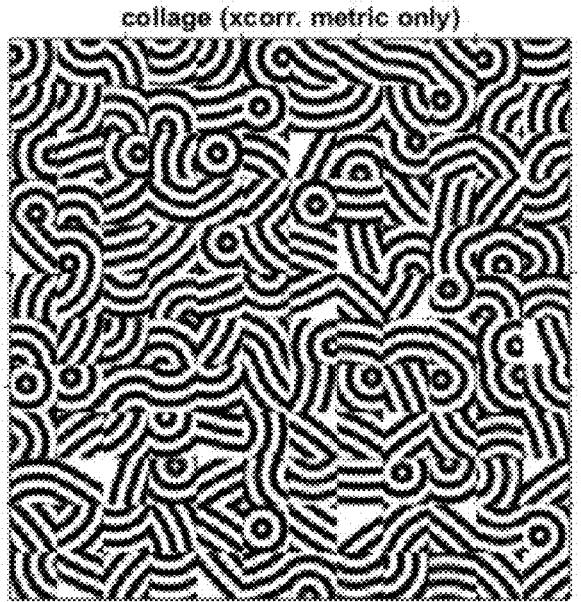
FIG. 8B shows a collage produced from the style image of FIG. 8A and a watermark image, considering block correlation, but without regard to edge artifacts.
Figure 8C:
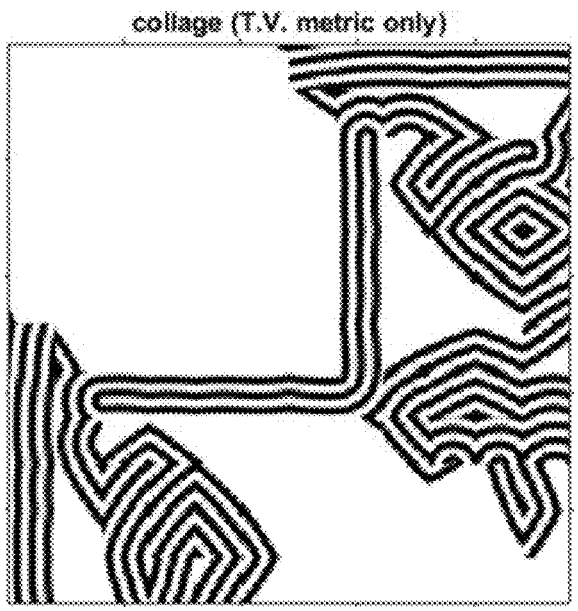
FIG. 8C shows a collage produced from the style image of FIG. 8A and a watermark image, minimizing edge discontinuities, but without regard to block correlation.
Figure 8D:
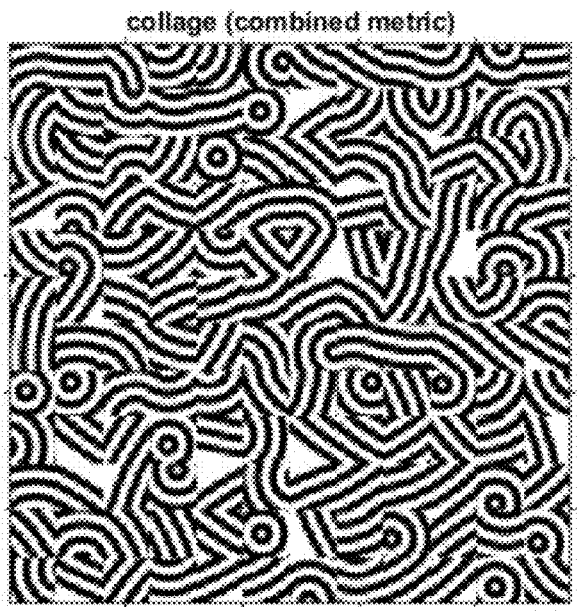
FIG. 8D shows a collage produced from the style image of FIG. 8A and a watermark image, which considers both block correlation and edge artifacts.

FIGS. 8A-8D illustrate. FIG. 8A shows a pattern of concentric circles, used as a style image. FIG. 8B shows a collage produced using excerpts taken from the concentric circles style image (and the watermark signal image of FIG. 4), when the correlation metric α=1 and the Total Variation metric β=0. FIG. 8C shows the opposite case, when edge smoothness is exalted over signal strength (α=0,β=1). FIG. 8D shows an intermediate state, in which parameters α,β both have non-zero values.

(One might expect FIG. 8C to match FIG. 8A, since FIG. 8A has the fewest edge artifacts. The unexpected FIG. 8C pattern is due, in part, to the block with which tiling started, and the fact that blocks are chosen based on continuity along only two edges—since the other two edges don't yet have blocks in place.)

Matlab code for producing the patterns of FIGS. 8B-8D is shown in FIG. 9A, which continues onto FIG. 9B. (The im2col function divides an image into blocks, converts each block to a vector, and creates a matrix by listing the vectors in columns.)

Figure 11A:
FIG. 11A shows a watermarked collage to which QR code synchronization markings have been added.
Figure 12:
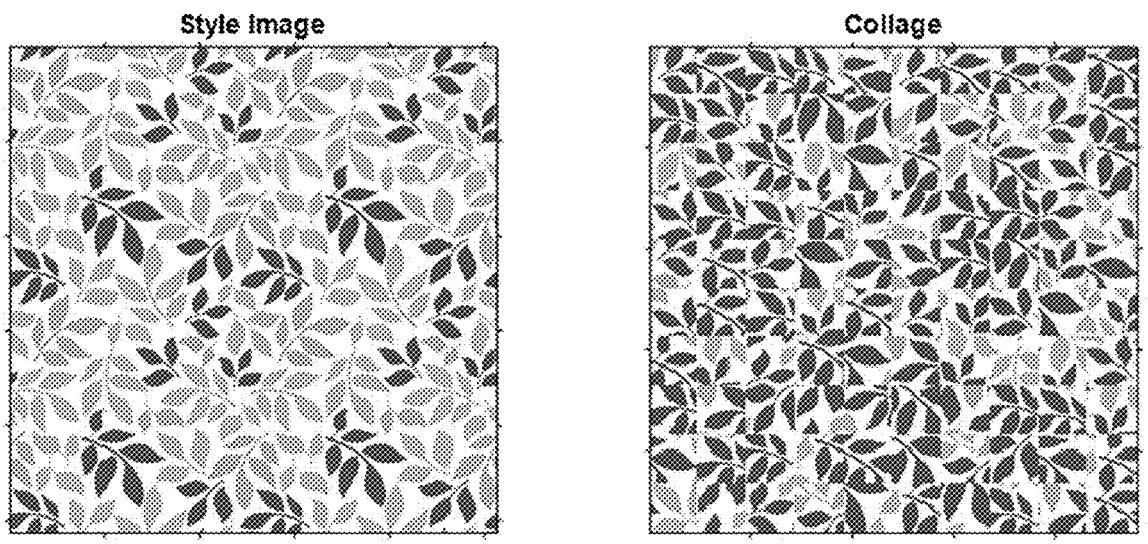

FIGS. 10, 11 and 12 show other examples of stylized watermark signals produced by the just-detailed arrangements—each with a style image on the left, and a resulting collage image on the right. FIG. 11A is similar to the collage shown on the right of FIG. 11, but the synchronization marks of the original QR code used as a style image are maintained, to reinforce the visual association with a QR code. Each of the collage images of FIGS. 10, 11, 11A and 12, like the collage images of FIG. 4, FIGS. 8B and 8D, readily reads using the Digimarc Discover digital watermark detector, available from the Apple and Android app stores.

The collage images of FIGS. 10, 11, 11A and 12 read best when presented at a scale of about 100 waxels per inch or larger (e.g., 75 WPI). At such scale, the depicted collages are at least 1.28 inches on a side. Below this size their reading becomes less robust. (On the other hand, below this size, their artiness become less visible—reducing the appeal of using such stylized patterns.) Better robustness at smaller physical sizes may be aided by applying a low frequency boost to the watermark image prior to the block matching process, and by employing smaller sub-block sizes for the collage.

If the style image is in RGB color, one particular embodiment converts the style image to a counterpart luminance image (e.g., using a RGB weighting of 0.21R+0.72 G+0.07B) for matching. That is, blocks from the watermark signal image are checked for correlation and edge congruence with greyscale blocks resulting from this conversion operation, to determine locations, within the style image, of the best-matching blocks. The original color image blocks from the thus-determined locations are then copied from the style image into the output frame to produce a color collage.

If the style image is in color, the discontinuity metric discussed earlier can be modified to also assess color discontinuity along the adjoining edges.

Applicant earlier referred to blocks having side lengths ranging from 1% to 20% of the watermark image side length. Blocks larger than 20% would theoretically be better but are statistically impractical.

An exemplary watermark tile comprises 16,384 waxels, arrayed in 128 columns and 128 rows. A block with side dimensions of 20% of such a tile has 25 rows and 25 columns, or 625 elements. (This assumes each watermark element is represented by a single pixel. Commonly, a "bump" comprising 4, 9 or 16 pixels is used.) Even with just two values, there are $2^{625}$ different 25×25 watermark blocks—a decimal number that is 188 digits in length. If the style image is regarded as a dictionary from which different blocks are taken to compose the mosaic, an ideal such dictionary would have a similar number of different blocks that could be excerpted. For a style image to have $10^{188}$ different 25×25 excerpts, it would need to have at least $10^{94}$ rows, and a like number of columns (assuming no 25×25 excerpt is repeated in such an image).

The situation is somewhat better with block sides measuring 10% of the watermark image sides. Such a block would be 13 pixels on a side, or 169 elements. Since each element may have two different values, there are $2^{169}$ different such blocks—a decimal number with 50 digits. For a style image to serve as a dictionary with this many different blocks, it would need to have at least $10^{25}$ rows, and a like number of columns.

Surprisingly, applicant found that image dictionaries (i.e., style images) of such sizes are not required. Due to data redundancies and the error correcting capabilities of coding used in an exemplary watermark, much much smaller, and much much more practical, style images can be used. The examples discussed herein employ style and watermark images measuring 256×256 pixels. If a 10% block size is used, each block is about 26 pixels on a side. There are 52,900 such blocks that can be excerpted from a 256×256 pixel style image (i.e., (256−26)*(256−26)), and this has been found to be generally adequate in most cases.

Roughly speaking, most typical applications of the technology (e.g., when mimicking watermark images having a 128×128 array of waxels, using blocks whose sides are at least 6% that of the watermark image) generally require a style image dictionary from which more than 10,000 different blocks can be drawn. A minimum dictionary size of 20,000 is better, and 40,000 or more is still better. The larger the dictionary, the more faithfully the collage can mimic the watermark signal image, and the more reliably such a collage will be readable by a digital watermark reader.

However, as the side length of the block increases, the size of the needed imagery dictionary increases exponentially. When the side length exceeds 20% of the watermark image dimension, there are typically not enough different style image blocks that can be excerpted to mimic the watermark image with the degree of fidelity needed to assure reliable watermark reading—at least with style images of practical size.

(At the other extreme, very small image dictionaries may be used. In the limiting case of a block having a size of one pixel, a dictionary of just a few differently-valued pixels, e.g., 32 or less, can suffice.)

The field of Photomosaic art, developed by Silvers (c.f. U.S. Pat. No. 6,137,498), seeks to mimic target artworks (e.g., famous portraits) in mosaic form, using other photos as mosaic elements. Such a mosaic, especially if seen from a distance or blurred (e.g., by a Gaussian filter), immediately evokes—to human viewers—the original target artwork. The present technology is different from Silvers' in a number of respects—a primary difference is that the resulting mosaic does not appear, to human viewers, like the target watermark signal. Rather, the resulting mosaic evokes, to human viewers, a visual impression from the style image. Put another way, if viewers are asked whether applicant's mosaic bears more resemblance to the style image or to the watermark image, nine viewers out of ten (or more) will respond saying it resembles the style image. See, e.g., FIG. 4.

This difference is due, in large part, to Silvers' concern with human perception, and applicant's concern with watermark decoding. Silvers tries to replicate an RGB image with full fidelity in the color space, to immediately evoke the target artwork to human viewers. Applicant is more concerned with faithfully reproducing pixel-scale gradients, and phases, in greyscale representation—the feature spaces on which watermark embedding and reading depend.

More on Edge Artifacts

Many different approaches can be employed to mitigate edge artifacts that arise when blocks are mosaiced together to mimic a watermark tile. Some rely on selecting style blocks based, in part, on edge congruence—an example of which is detailed above.

Other approaches can use weighting masks, in conjunction with overlapping blocks. In a first such approach, shown in FIG. 13, bold grid 131 indicates a first tiled array of blocks selected from a style image. A fine grid 132 indicates a second tiled array of blocks selected from the style image.

The first grid 131 represents a complete 128×128 waxel watermark, composed of 16 blocks A-P, each mimicking a 32×32 waxel excerpt of the full watermark signal. (A further row and column of 32×32 blocks are shown, as the watermark tile is designed to be continuous between its left and right edges, and likewise between its top and bottom edges—so-called spatial wrap-around, or toroidal wrapping.)

The second grid 132 also represents the same complete 128×128 watermark, albeit shifted right by 16 waxels and shifted down by 16 waxels. (That is, the upper left waxel in the fine grid 132 corresponds to waxel {16,16} in the watermark tile.) Again, grid 132 comprises blocks selected from a style image to mimic corresponding patches of the watermark signal.

Thus, in this example, instead of selecting 16 blocks from the style image to mimic corresponding patches of the watermark tile, 32 blocks are selected.

To blend these two overlapping arrays of blocks together, a 2D weighting function, or mask, is applied to each of the 32 blocks selected from the style image.

The 2D weighting function has the property that, if a block is shifted by half its side (say L), the sum of the original and shifted functions is a constant. That is, for each point in the 2D space, the weights applied to the two overlapping pixels sum to a constant.

There are many choices for this function. The following function is exemplary:

$$F(x, y) = \sin\left(\frac{\pi x}{L}\right)^2 + \sin\left(\frac{\pi y}{L}\right)^2$$

In this case, the weighting function, offset by L/2, is given by $$F\left(x + \frac{L}{2}, y + \frac{L}{2}\right) = \sin\left(\frac{\pi\left(x + \frac{L}{2}\right)}{L}\right)^2 + \sin\left(\frac{\pi\left(y + \frac{L}{2}\right)}{L}\right)^2$$
$$= \sin\left(\frac{\pi x}{L} + \frac{\pi}{2}\right)^2 + \sin\left(\frac{\pi y}{L} + \frac{\pi}{2}\right)^2$$
$$= \cos\left(\frac{\pi x}{L}\right)^2 + \cos\left(\frac{\pi y}{L}\right)^2$$

From the trigonometric identity $\sin(x)^2 + \cos(x)^2 = 1$, it can be seen that this weighting function F has the desired property. That is:

$$F(x, y) + F\left(x + \frac{L}{2}, y + \frac{L}{2}\right) = 2 \text{ for all } x \text{ and } y.$$

Figure 14A:
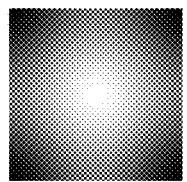
FIG. 14A shows a weighting function.

FIG. 14A graphically shows this weighting function, F, that can be applied to each of the 32 blocks selected from the style image. The lightest, central, region indicates a weight of 100%. The darkest, corner, regions indicate a weight of 0%.

Figure 13:
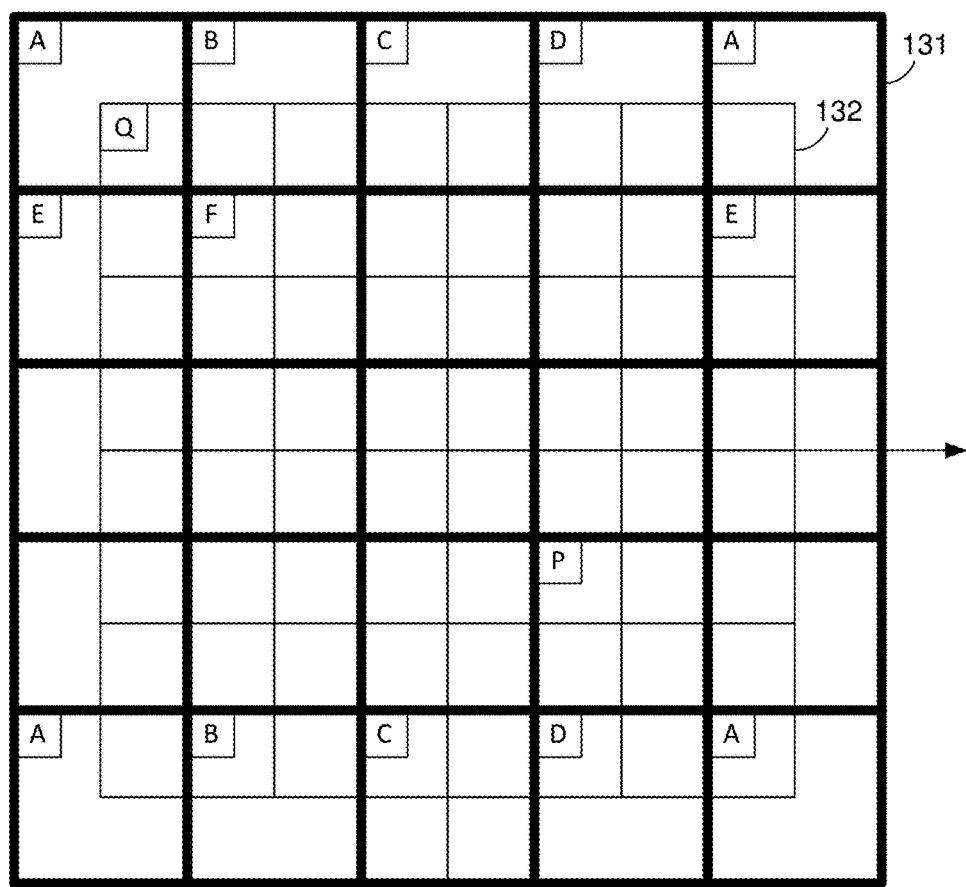
FIG. 13 shows that a collage can be formed of two tiled, overlapping arrays of blocks selected from a style image.
Figure 14B:
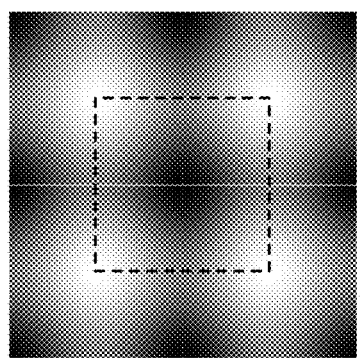
FIG. 14B shows the weighting function of FIG. 14A applied to a region of four corner-adjoining blocks, and defining a complementary weighting function at a central region.
Figure 14C:
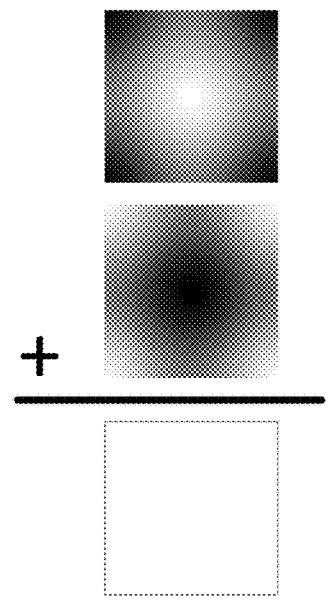
FIG. 14C shows two complementary weighting functions, which sum to unity at all points.

It will be seen that, if the weighting function of FIG. 14A is applied to selected blocks A, B, E and F in FIG. 13, the composite functions weight these blocks as shown in FIG. 14B. The dashed square printed in the center of FIG. 14B indicates where a block Q from the second grid 132 of blocks is overlaid. It will be appreciated that if block Q is also weighted by the same function F (i.e., FIG. 14A), and summed with the outlined weighting function from blocks A, B, E and F (FIG. 14B), the weights will sum to a constant, as shown by the summation of FIG. 14C.

The weighting function F thus does not serve to make any region of the finished collage lighter or darker than any other region, since every region is composed of two weighted contributions (i.e., from the first and second grids of blocks), and the weights applied to the two contributions always sum to a constant. (At outer edges of the mosaic, a slightly different weighting function can be applied—one that maintains a 100% weight to the outer edge.)

Yet it will also be seen that along the four edges of the FIG. 14A weighting function F, the weights are diminished in amplitude, even diminishing to zero in the four corners. This serves to diminish edge discontinuities where, e.g., blocks A and B adjoin. In such regions, the overlaid block from the second grid (e.g., block Q) is more dominantly weighted. Points falling along the proximate boundaries of blocks A, B, E and F fall within the interior of block Q, and these interior (and continuous) features from block Q then dominate the sum. Edge discontinuities are thereby greatly reduced.

(Since the constant value of the weighting function sum is 2, values of pixels in the summed result are divided by two to yield the final result.)

Figure 15A:
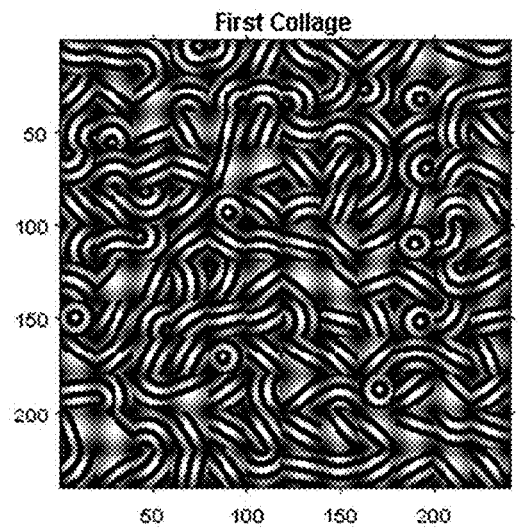
FIGS. 15A and 15B show two arrays of weighted blocks that can be overlapped and summed to yield a collage.
Figure 15B:
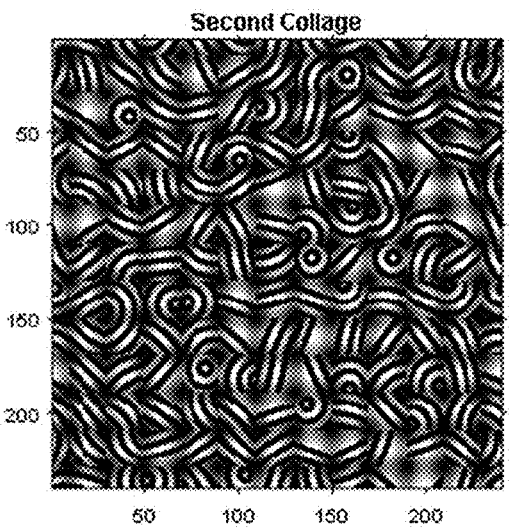
Figure 15C:
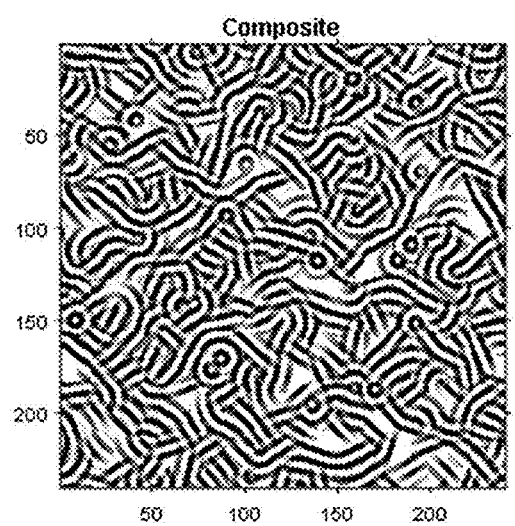
FIG. 15C shows the collage resulting from FIGS. 15A and 15B.

FIGS. 15A and 15B show two arrays of blocks selected from the style image of FIG. 8A, corresponding to the first and second block arrays 131, 132 of FIG. 13, after each block has been weighted by the function F of FIG. 14A. FIG. 15C shows their summation (after division by 2). As can be seen, there are no apparent edges where one block adjoins the next.

Figure 16A:
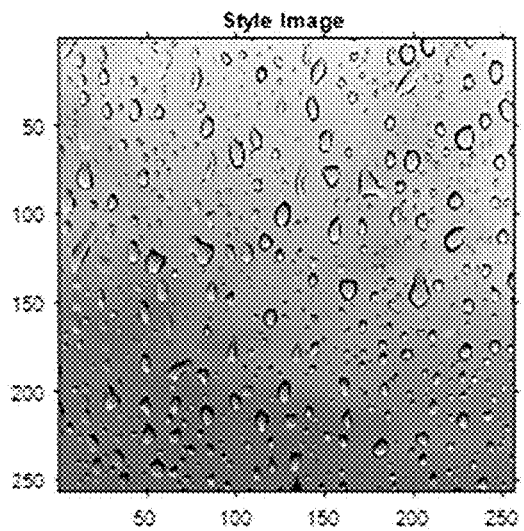
FIG. 16A shows a style image.
Figure 16B:
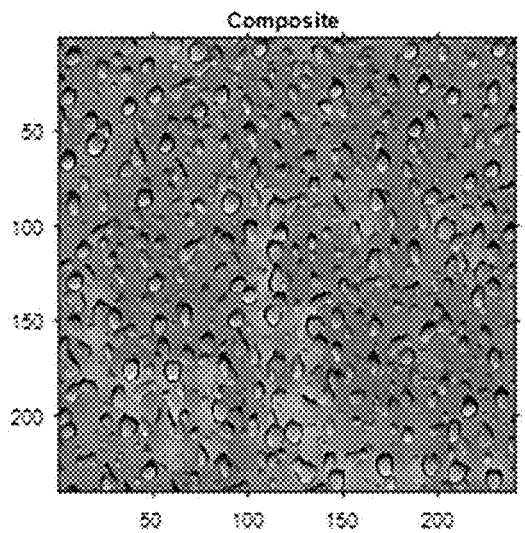
FIG. 16B shows a corresponding watermarked collage produced therefrom.
Figure 17A:
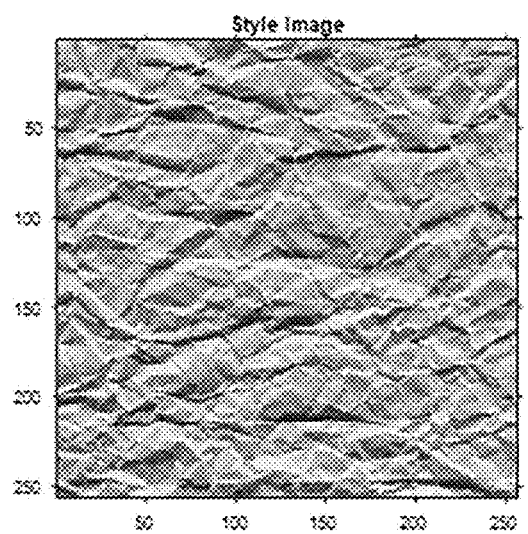
FIG. 17A shows another style image.
Figure 17B:
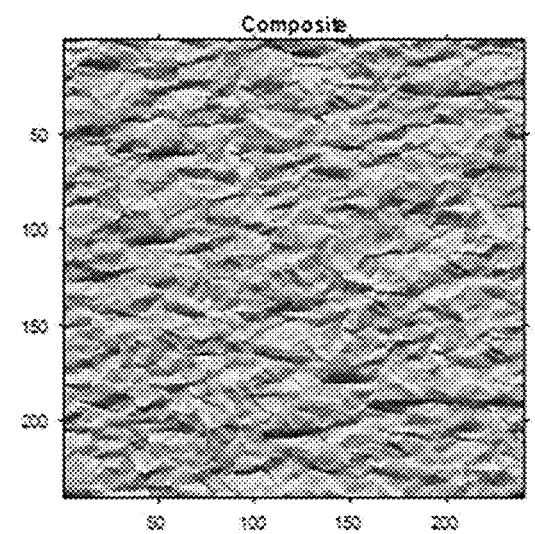
FIG. 17B shows a corresponding watermarked collage produced therefrom.

FIG. 16B shows application of this method to produce a watermarked collage using blocks copied from the water droplet style image of FIG. 16A to mimic a watermark signal. Likewise, FIG. 17B shows a watermarked collage produced using blocks copied from the style image of FIG. 17A to mimic a watermark signal. As is evident, none of FIG. 16B or 17B shows edge artifacts.

FIGS. 18A, 18B and 18C show Matlab code used with the just-described arrangement.

Figure 19A:
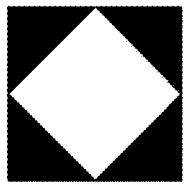
FIG. 19A shows a weighting function.
Figure 19B:
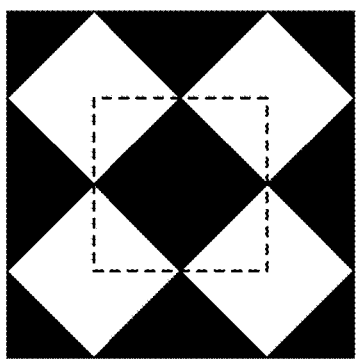
FIG. 19B shows the weighting function of FIG. 19A applied to a region of four corner-adjoining blocks and defining a complementary weighting function at a central region.
Figure 19C:
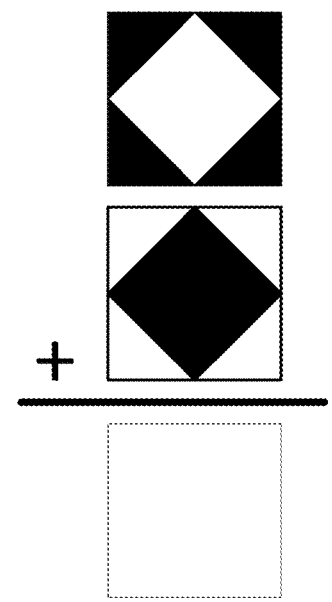
FIG. 19C shows two complementary weighting functions, which sum to unity at all points.

A second, variant, weighted-overlay approach uses the weighting function shown in FIG. 19A, where white indicates a weight of 1.0, and black indicates a weight of 0. If such a function is applied to each of blocks A, B, E and F of FIG. 13, the pattern of FIG. 19B results. The dashed square again shows where block Q, from the second grid of blocks, is overlaid. Again, if block Q is weighted by the same pattern, the summed results again yield a constant value at all positions, as shown by FIG. 19C. (Again, at the outer edges of the collage, no summation or weighting is needed—those blocks can extend all the way to the outer edges with a weighting of 1.0.)

No division by two is required with the FIG. 19A weighting function, since one function always has a value of 1.0 where the other has a value of 0, and vice versa.

The FIG. 19A weighting function is advantageous in certain respects, relative to the FIG. 14A weighting function. For example, when using the FIG. 14A weighting function, most points in the collage reflect non-zero contributions from two different blocks from the style image. This can produce ghosting or blurring effects where both components are evident, as is visible from close inspection of FIG. 15C. Relatedly, the bitonal black/white aspect of the FIG. 8A style image is lost; the finished FIG. 15C pattern including grayscale tones.

Additionally, the superposition of two staggered collages can result in a doubling of features. This doubling, or busyness, is conspicuous in FIG. 16B, in the increased number of raindrops, and likewise in the increased number of paper wrinkles in FIG. 17B. (However, in other situations, this attribute is not so evident.)

The FIG. 19A weighting function is disadvantageous in other respects. Notably, pairs of overlaid blocks have edge-transitions along the inclined lines of the weighting function of FIG. 19A. An edge discontinuity metric can be used to select blocks that yield less conspicuous artifacts along such boundaries. Nonetheless, edge transitions associated with the FIG. 19A weighting function are generally preferable to those found in the first-described arrangement (e.g., FIG. 7) since such transitions zig-zag through the collage, and are not as conspicuous as parallel sets of vertical and horizontal boundary lines traversing the pattern.

This highlights a further advantage of the FIG. 14A weighting function: no consideration of edge matching is required. Blocks can be selected wholly on the basis of their correlation with the target watermark pattern. The value β in the earlier equation can be set to zero.

Figure 20A:
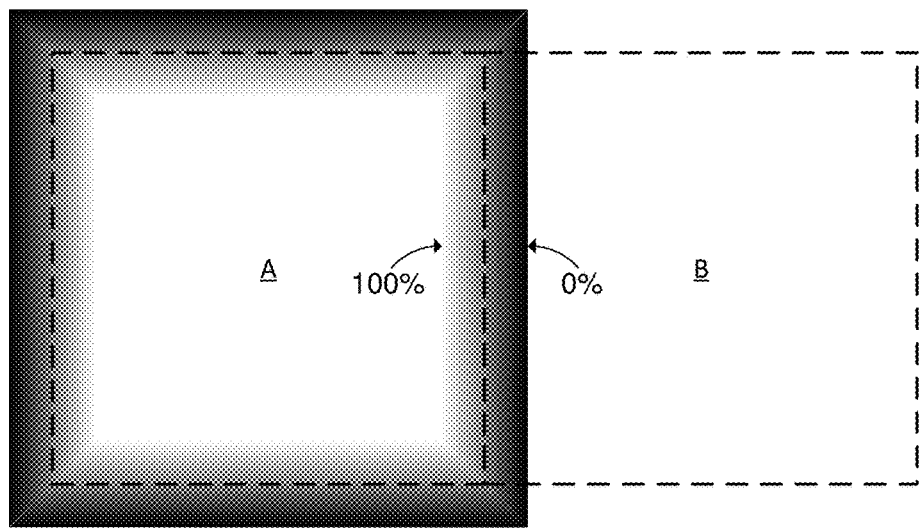
FIGS. 20A and 20B show a border weighting function applied to two blocks.
Figure 20B:
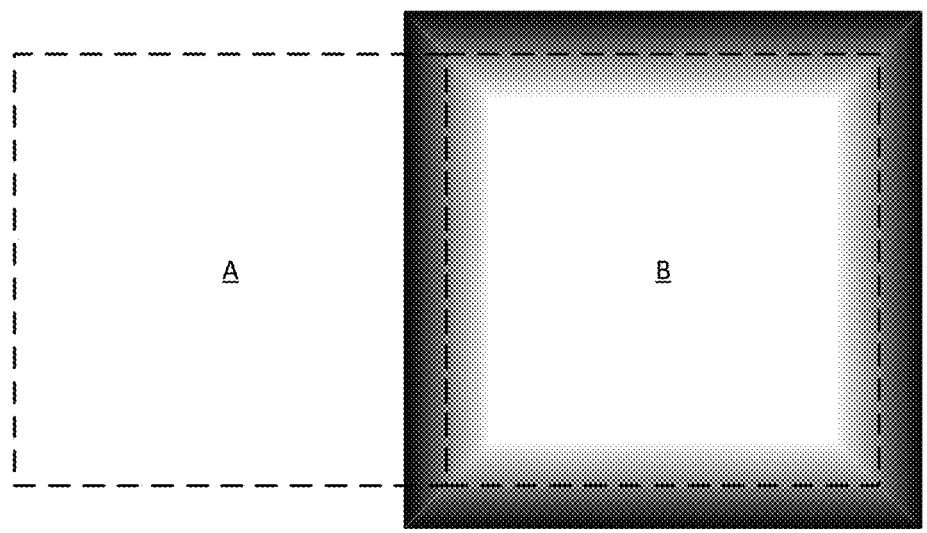
Figure 20C:
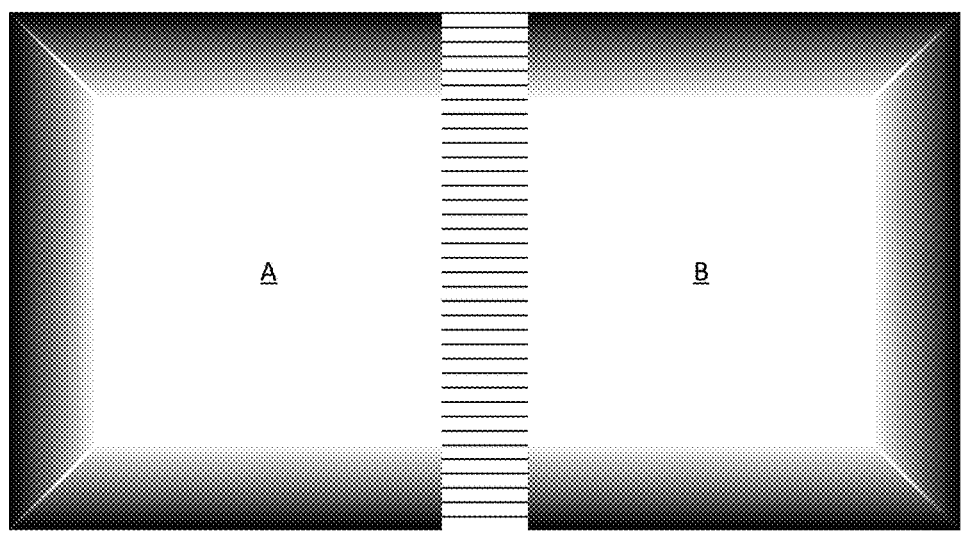
FIG. 20C depicts a combination of the two weighted blocks of FIGS. 20A and 20B.

A third variant approach to avoiding edge artifacts, using overlapping blocks, is shown in FIGS. 20A-20C. In this approach, a band of pixels around the edge of each selected block is weighted in a linear variation, transitioning from 100% nearer the center of the block (shown in white), to near 0% at the outer edges of the block (shown in black). This tapered weighting is positioned to overlie a complementary tapered weighting of the adjoining block, so that the overlapping weights sum to 100%

This arrangement requires that the blocks selected from the style image be larger than the corresponding blocks of the watermark tile. For example, if the watermark tile is divided into 30×30 pixel blocks, and a taper-weighted border of 4 pixels is utilized, then the blocks selected from the style image are padded to be 34×34 pixels in size. These selected blocks overlap the adjoining block by 4 pixels along each edge: 2 inside the boundaries of the corresponding watermark tile block (shown in dashed lines in FIGS. 20A and 20B), and 2 outside. Exemplary weightings for the four overlapping columns of pixels between blocks A and B in FIGS. 20A-20C are shown in the following table:

| | |
|---|---|
| Block A, cols. 5-30: weight = 100% | ### |
| Block A, col. 31: weight = 80% | Block B, col. 1: weight = 20% |
| Block A, col. 32: weight = 60% | Block B, col. 2: weight = 40% |
| Block A, col. 33: weight = 40% | Block B, col. 3: weight = 60% |
| Block A, col. 34: weight = 20% | Block B, col. 4: weight = 80% |
| ### | Block B, cols. 5-30: weight = 100% |

The area of overlap between blocks A and B, where paired weights transition from favoring one block to the next, summing to 100%, are shown by the parallel lines in FIG. 20C. (Of course, transition border zones larger or smaller than 4 pixels in width can naturally be used. Corners are also treated differently, in a straightforward manner—such as by dividing the sum of overlaid pixel values by the sum of their respective weights.)

In this arrangement, a discontinuity metric may be employed to help select blocks from the style pattern that will help further avoid any visual edge artifacts.

Still other variants overlap selected blocks with gaussian weights—with a maximum weight at the block center, and tapering towards the edges. Overlapping pixels from two or more blocks can be averaged in accordance with their respective weights.

Collages that Mimic a Previously-Watermarked Image

The discussion to this point has focused on collages that mimic the statistics of a pure watermark signal tile, e.g., as shown in FIG. 4. The technology can likewise be used to mimic a previously-watermarked graphic artwork. FIG. 21 shows an example.

FIG. 21 shows, on the left, a denim "style" image and a previously-watermarked "target" image (Lena). Blocks from the former are mosaiced, as described earlier, to yield a collage image mimicking the latter.

Although the watermark is not immediately apparent in the FIG. 21 target image, it is present—it is simply encoded at a sufficiently-low amplitude (and scaled in accordance with human visual system sensitivity) so as to be easily-overlooked by humans. But if presented to a watermark reader, such as the Digimarc Discover reader cited earlier, it decodes (as does the collage).

Unlike the Silvers photomosaics discussed earlier, the collage of FIG. 21 evokes twin visual impressions in the observer. One is that of the target image. And one is that of the style image.

The visual impression of the target image within the resulting college of FIG. 21 is relatively subdued. Prominence of the target image within the resulting collage can be increased, without impairing watermark readability, by changing the average luminance of each block of the collage. (Changing the average block luminance changes the low frequency content of the image. Watermark readability, in contrast, depends on the high frequency content of the image.)

More particularly, the average luminance of each block in the collage may be adjusted to reduce its dependence on the luminance of the selected block copied from the style image, and to increase its value based on the luminance of the corresponding block of the target image.

In a particular embodiment, each block selected from the style image (StyleBlock) is processed using a weighting factor w to yield an adjusted style block (StyleBlock'), as follows:

StyleBlock'=StyleBlock−$w$*mean(StyleBlock)+ $w$*mean(TargetBlock)

(The two weights w applied in this equation are typically the same, but need not be.)

Thus, a w weight of 0 corresponds to the mean coming from the style image only and no contribution from the target image. At the other extreme, a weight of 1.0 corresponds to the mean coming from the target image only.

FIGS. 22A-D show collage images resulting from such processing.

Figure 22A:
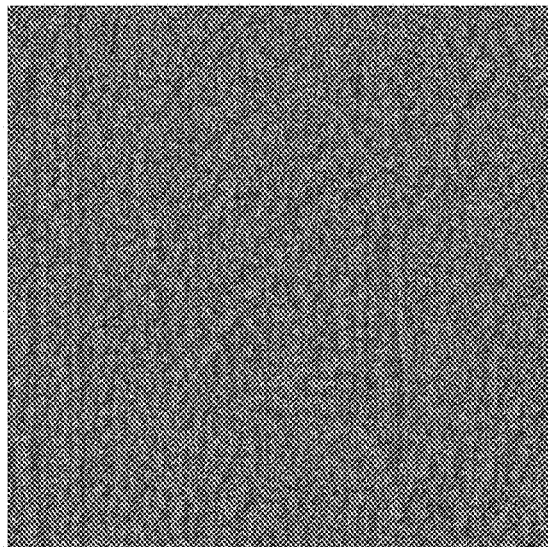
FIGS. 22A, 22B, 22C and 22D show the collage of FIG. 21 in which pixel values within each selected style block have been adjusted based on the average pixel value of the target image block to which that style block corresponds.

FIG. 22A shows the result when w=0. This is the original case, depicted in FIG. 21, in which no adjustment is made to average block luminances. The mean of each block in the collage is simply the mean of each style image block from which the collage is assembled.

Figure 22B:
Figure 22C:
Figure 22D:

FIG. 22B shows the result when w=0.2. FIG. 22C shows the result when w=0.5. FIG. 22D shows the result when w=1.0.

As is evident, best results are generally achieved for w values between 0.2 and 0.5. Below w=0.2, expression of the target image is subdued, to a commonly-undesirable degree. Above w=0.5, the mean values of the target blocks tend to dominate, yielding a gross pixelated aspect to the resulting collage image. Colors of the style image also tend to be increasingly-overwhelmed by the greyscale offset of the added luminance, at high values of w.

Another approach to emphasizing the target image is to remove, from each style block selected for the collage, a weighted portion of its average luminance, and then add-in a weighted portion of the target image itself to the resultant collage to change its luminance accordingly.

That is, each selected style block (StyleBlock) is processed to yield an adjusted style block (StyleBlock'), as follows:

StyleBlock'=StyleBlock−$w$*mean(StyleBlock)

And then the collage (Collage) is adjusted to yield an adjusted collage (Collage'), as follows:

Collage'=Collage+$w$*(TargetImage)

(Again, the two weights applied in these equations are typically the same but need not be.)

Figure 23A:
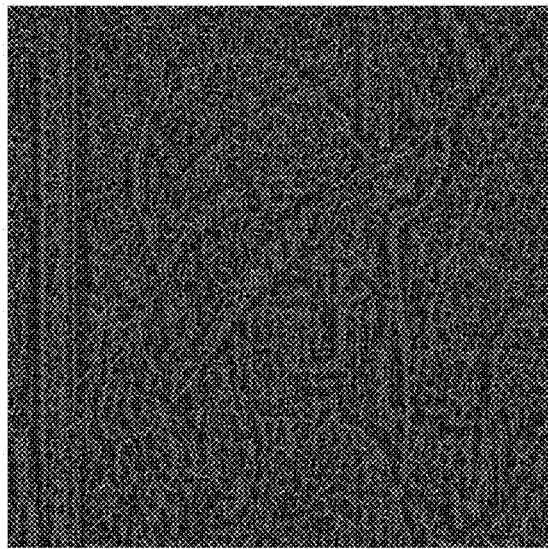
FIGS. 23A, 23B, 23C and 23D show another collage in which pixel values within each selected style block have been adjusted to remove a fraction of the block's average value, and to add a fraction of the corresponding target image value.
Figure 23B:
Figure 23C:
Figure 23D:

FIGS. 23A-23D show results of such approach, when the Lena image of FIG. 21 is stylized using an image of grass. FIG. 23A shows the result when a weight w of 0 is applied (i.e., no adjustment of style blocks nor the collage). FIGS. 23B and 23C show the results when weights w of 0.2 and 0.5, respectively, are applied. FIG. 23D shows the result when a weight w of 1.0 is applied. Again, weights in of about 0.2 to 0.5 are again usually preferred.

In addition to avoiding the pixilation/blockiness associated with high-w weights in the former approach (e.g., as in FIG. 22D), this approach also reinforces the watermark signal in the resulting collage. (Since the target image is watermarked, adding a weighted fraction of that image into the collage adds watermark signal back in also.)

It should be understood that there are many edge similarity/discontinuity metrics that can be employed; the detailed ones are exemplary only. In some arrangements, similarity is determined using a metric based not on pixel values, but on divergences of pixel values from a local mean (e.g., a criss-cross kernel or 3×3 kernel). Edge discontinuity may be based on a sum of squared differences measure, instead of on a sum of differences measure. Other edge measures take human visual system factors into account, factoring-in spatial-, contrast-, and color-sensitivity functions. Many other variants will be apparent to the artisan.

The RMS block similarity measure employed by Silvers may be used with the present technology, in greyscale, if a large enough dictionary of different style image blocks is available.

In still further embodiments, block matching can employ the phase deviation approach detailed in applicant's patents U.S. Pat. No. 9,959,587 and 10,242,434.

The dictionary of image blocks available from the style image can be enlarged by considering the style image at different angular rotations, e.g., 90, 180 and 270 degrees—as well as at intermediate angles (with interpolation). Multiple style images can be employed, although in such situations is it typical for all to depict the same subject matter. An example is to take a style image and scale it by 3%. The scaled image will provide excerpts with a new, different, set of statistics, which may provide better matches with certain blocks from the watermark image.

As is evident from FIG. 8D, certain pixel patches from the style image may be used multiple times within a single collage. (See, e.g., the multiple uses of the bulls-eye copied from the center of the style image.)

In the foregoing discussion, applicant refers to the patches of imagery selected from the style image as "blocks." However, applicant tends to refer to a full expression of a watermark signal as a "block," as well. Plural of the former blocks are mosaiced to mimic one of the latter blocks. By being alert to this issue, confusion can be avoided. (The full expression of a watermark signal is sometimes referenced as a "tile" as well, which lead to other confusion.)

While the detailed arrangements employ square blocks, this is not essential. For example, the excerpts matched between the target image and the style image may be rectangular in shape, e.g., patches that are 8×16 (or 8×32) pixels in size. More generally, shapes other than rectangles can be used; image excerpts of countless shapes can be collaged together. Triangles and hexagons are simple examples, but any shapes that can be arrayed together to span the target image can be employed—including tessellation tiling patterns composed of two or more different shapes and/or sizes. Many such tiling patterns are detailed in the appendices.

In addition to the noted Silvers patent, the following patents describe other photo mosaicking arrangements. The present technology can be incorporated into these systems, and vice versa: U.S. Pat. Nos. 6,532,312, 6,665,451, 6,687,419, 6,724,946, 8,340,423, 20030001858, 20040022453, 20040047518, 20050047651, 20050147322, 20110050723, 20110058736, 20110103683, 20110268369 and 20150262335. For example, certain of these references teach methods of determining block similarity, and dealing with edge artifacts, that can be employed in the present arrangements.

Section II: Artwork Generated by Code Transformations

In accordance with a different aspect of the technology, code-conveying artwork suitable for use as a visible, aesthetic design element is produced by applying one or more geometric transformations to the 2D signal code, imparting an organized structure to the code.

Figure 24A:
FIGS. 24A-24I show different transformations that can be used in embodiments employing a further aspect of the present technology.
Figure 24G:
Figure 24B:
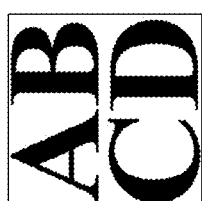
Figure 24H:
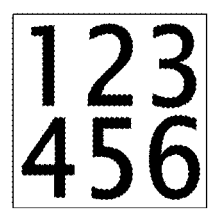
Figure 24C:
Figure 24I:
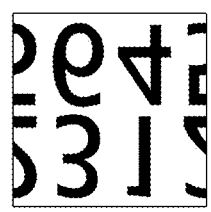
Figure 24D:
Figure 24E:
Figure 24F:

Some of the transformations that can be employed are shown in FIGS. 24A-24H. FIG. 24A shows a proxy for an input image, prior to transformation. FIG. 24B shows this image transformed by rotation. (A 90 degree rotation is shown, but any rotations can be used.) FIG. 24C shows mirroring of the input image. (Horizontal mirroring is shown, but mirroring around any axes can be used.) FIG. 24D shows scaling. FIG. 24E shows inversion (light for dark) of the input image. FIG. 24F shows translation (shifting) with wrap-around, of the input image. (Horizontal shifting is shown, but shifting in other directions can be employed as well.) FIG. 24G shows an FFT-shift operation of the input image. (FFT shift is a half a block horizontal translation and half a block vertical translation, with wrap-around. It is a special case of a toroidal shift. The generalized toroid shift (or wrap) is not limited to shifts of a half block.) FIG. 24H shows a second input image. FIG. 24I shows this second input image after a glide-reflection transform, with wrap-around. (Reflection around a horizontal axis is shown, but reflection around other axes can be used as well.)

Figure 1A:
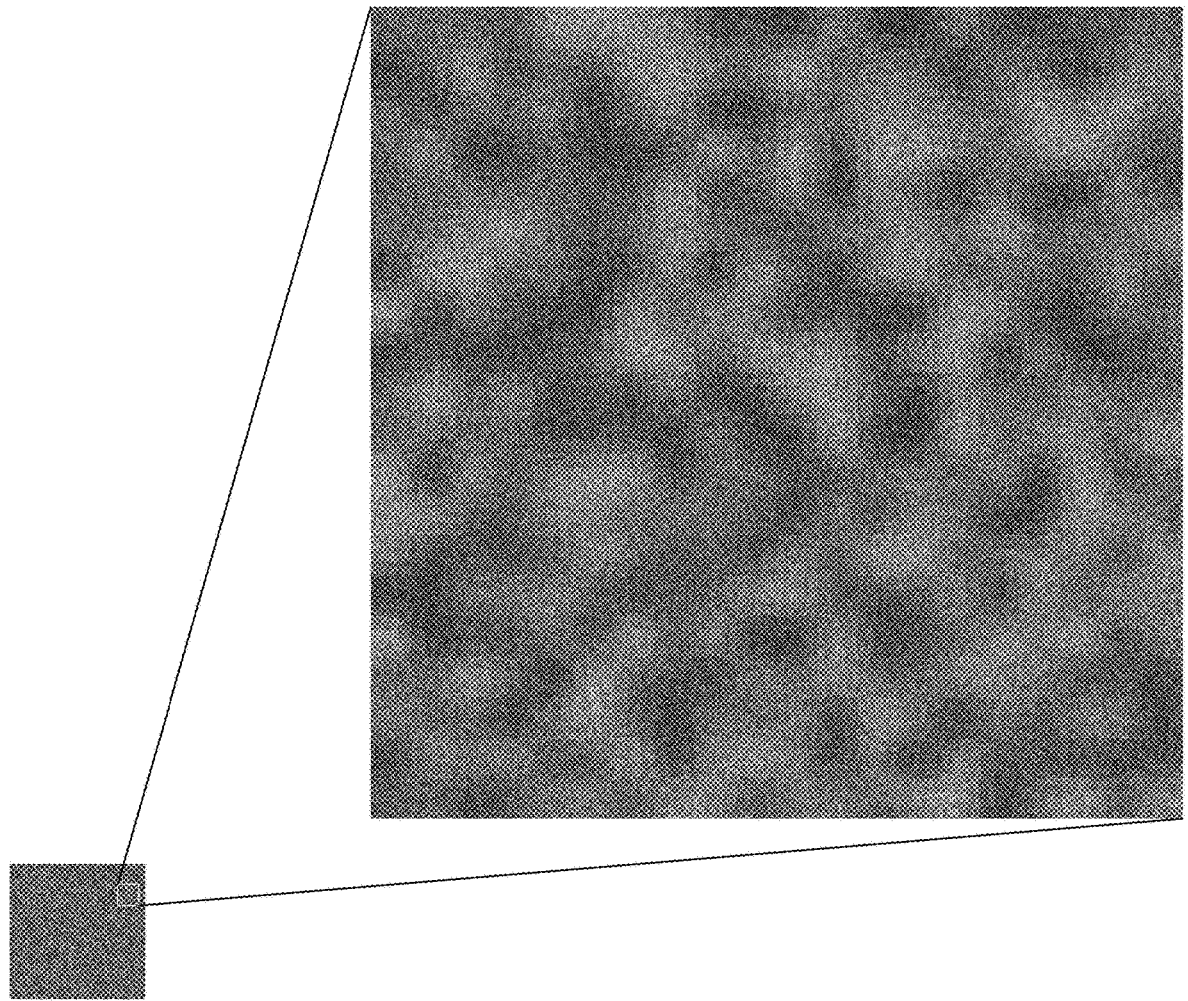
FIGS. 1A and 1B illustrate exemplary digital watermark patterns.
Figure 1B:
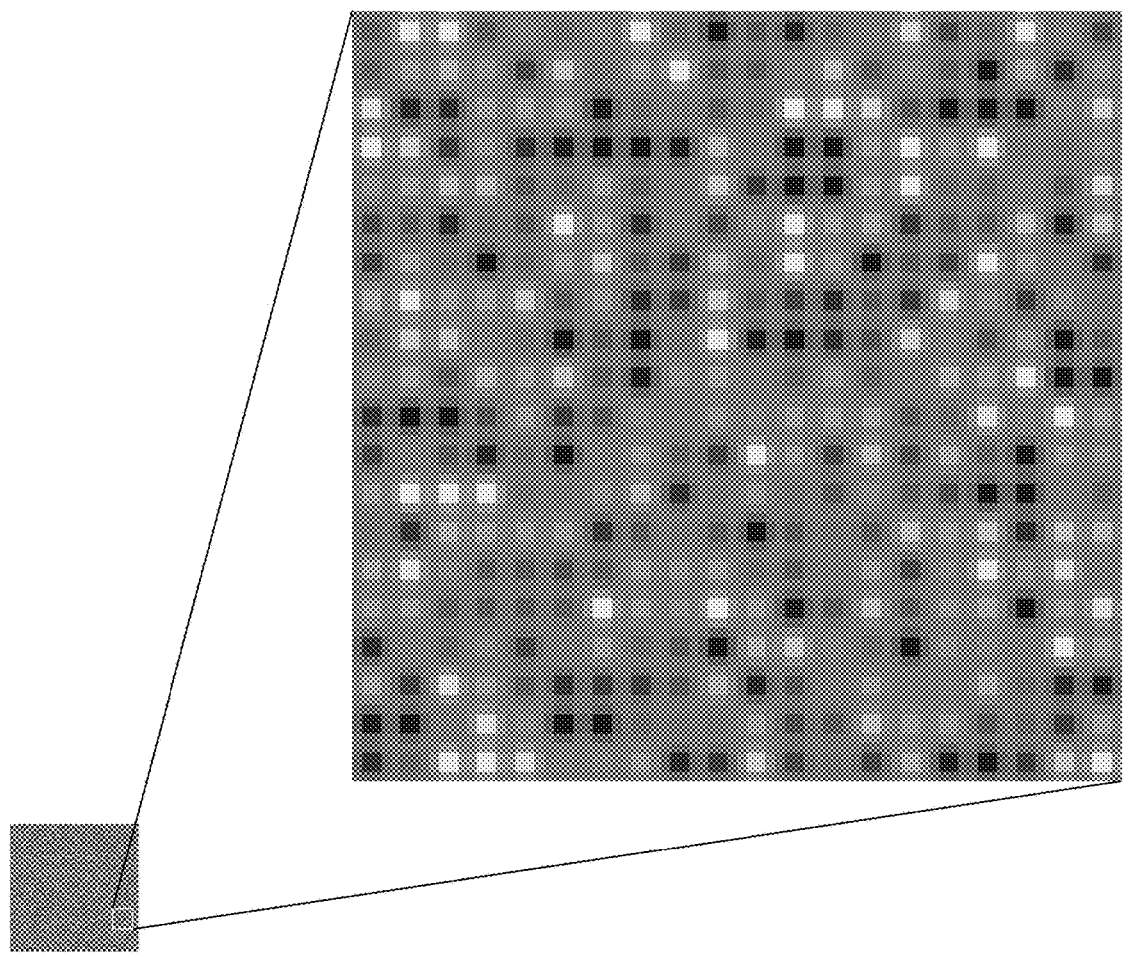
Figure 2:
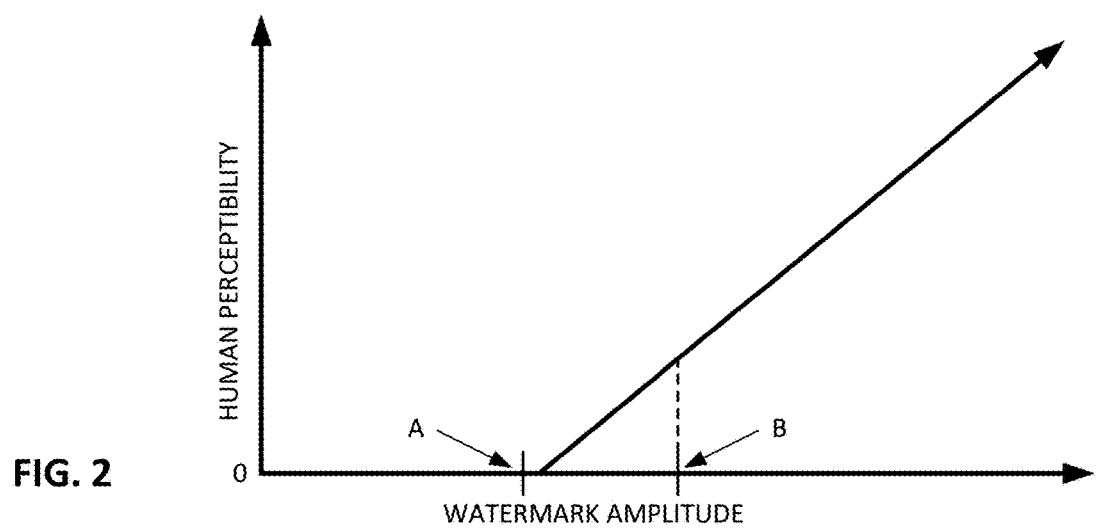
FIG. 2 is a graph showing how a digital watermark is human-imperceptible at low strengths, but becomes progressively more conspicuous at higher strengths.
Figure 25:
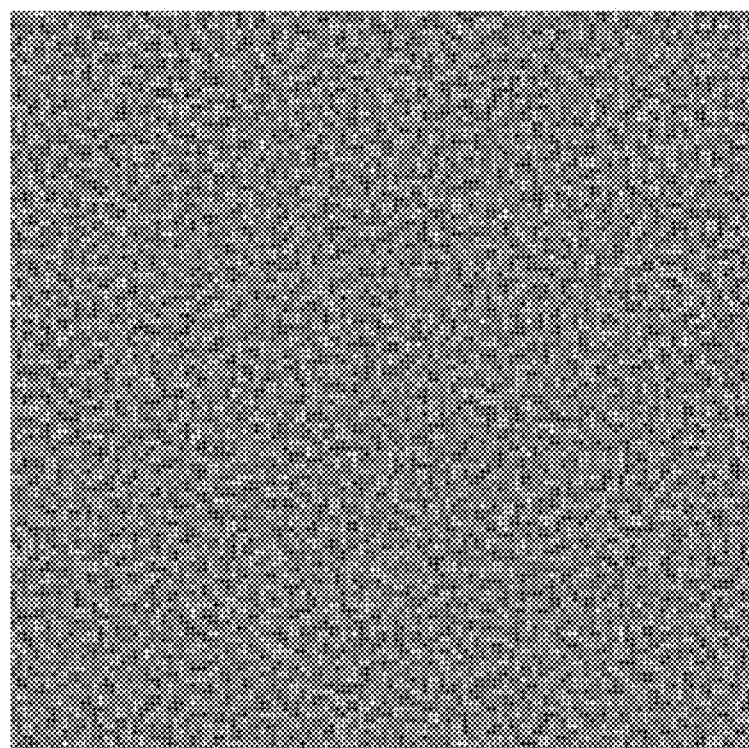
FIG. 25 shows a 2D code block that can serve as an input indicia to which various transformations are applied.

This is just a sampling of available transforms. Some of these (e.g., FIGS. 24B, 24C, 24F and 24I) are members of the "wallpaper group" of tiling symmetries. The present technology can be used with any member of the wallpaper group. (The Wikipedia article for Wallpaper Group is attached as Appendix A to application 62/972,522 and forms part of this specification.) All such transforms can be applied to parts, or the entirety, of an input 2D signal code 250, as shown in FIG. 25. This code is produced using methods known in the prior art and reviewed elsewhere herein (e.g., as in FIG. 1B). The code signal comprises a 128×128 array of waxels. Each waxel is represented by a 4×4 block of pixels. The code thus measures 512×512 pixels. The code may convey a plural-symbol payload, e.g., of 50 bits.

Figure 26:
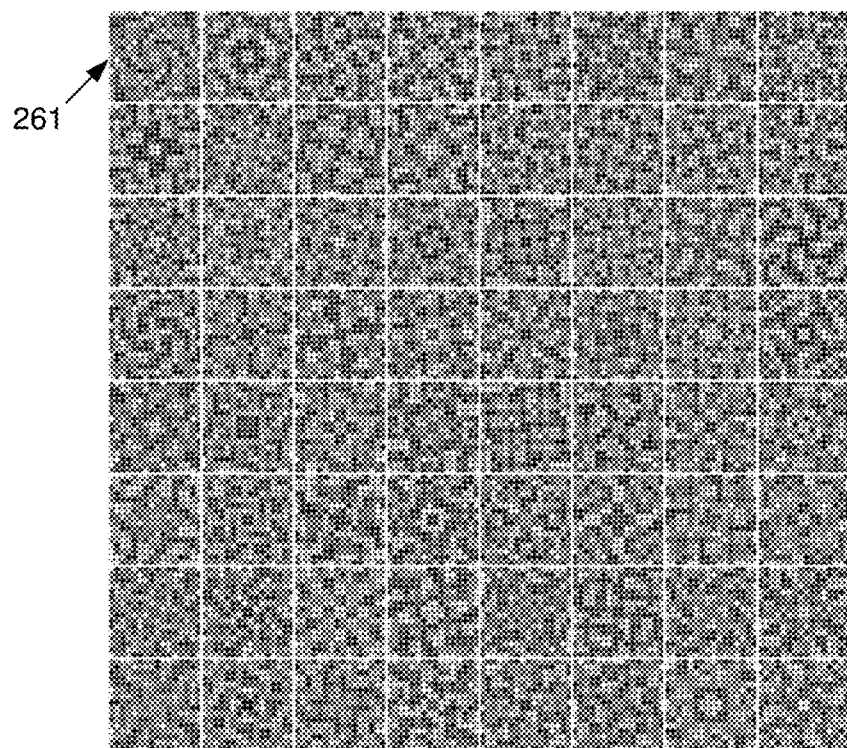
FIG. 26 shows one such transformation of the FIG. 25 indicia, based on a summation of multiple rotations of sub-blocks of the input indicia.

FIG. 26 illustrates one illustrative transformation of this input signal code 250. The code signal block is first divided into an 8×8 array of sub-blocks (as indicated by the white lines, which are provided simply to aid explanation, and have no physical counterpart in the signal code). Each sub-block thus comprises 64×64 pixels. The FIG. 26 pattern is produced by summing each original 64×64 pixel sub-block, with that sub-block rotated by 90 degrees, and that sub-block rotated by 180 degrees, and that sub-block rotated by 270 degrees.

For example, the upper left pixel in original signal code 250 is summed with the pixel that is at row/column coordinates (1, 64) in the original signal code, together with the pixel that is at (64, 64) in the original signal code, as well as with the pixel that is at (64, 1) in the original signal code. This sum of four pixel values is divided by 4 to normalize it back to fall within the original range of pixel values (e.g., 0 to 255). In like fashion, each pixel shown in transformed sub-block 261 is the normalized sum of four pixel values, produced by rotating the corresponding pixel sub-block in the original code signal by 0, 90, 180 and 270 degrees.

The mathematical transform used in FIG. 26 is indicated by the Matlab equation shown at the top of the figure, where "x" is the original code signal. "R4" is the name given by applicant to this pattern, indicating each sub-block is the sum of 4 rotated versions of the original sub-block (with one of the rotations being 0).

Figures 26A, 27:
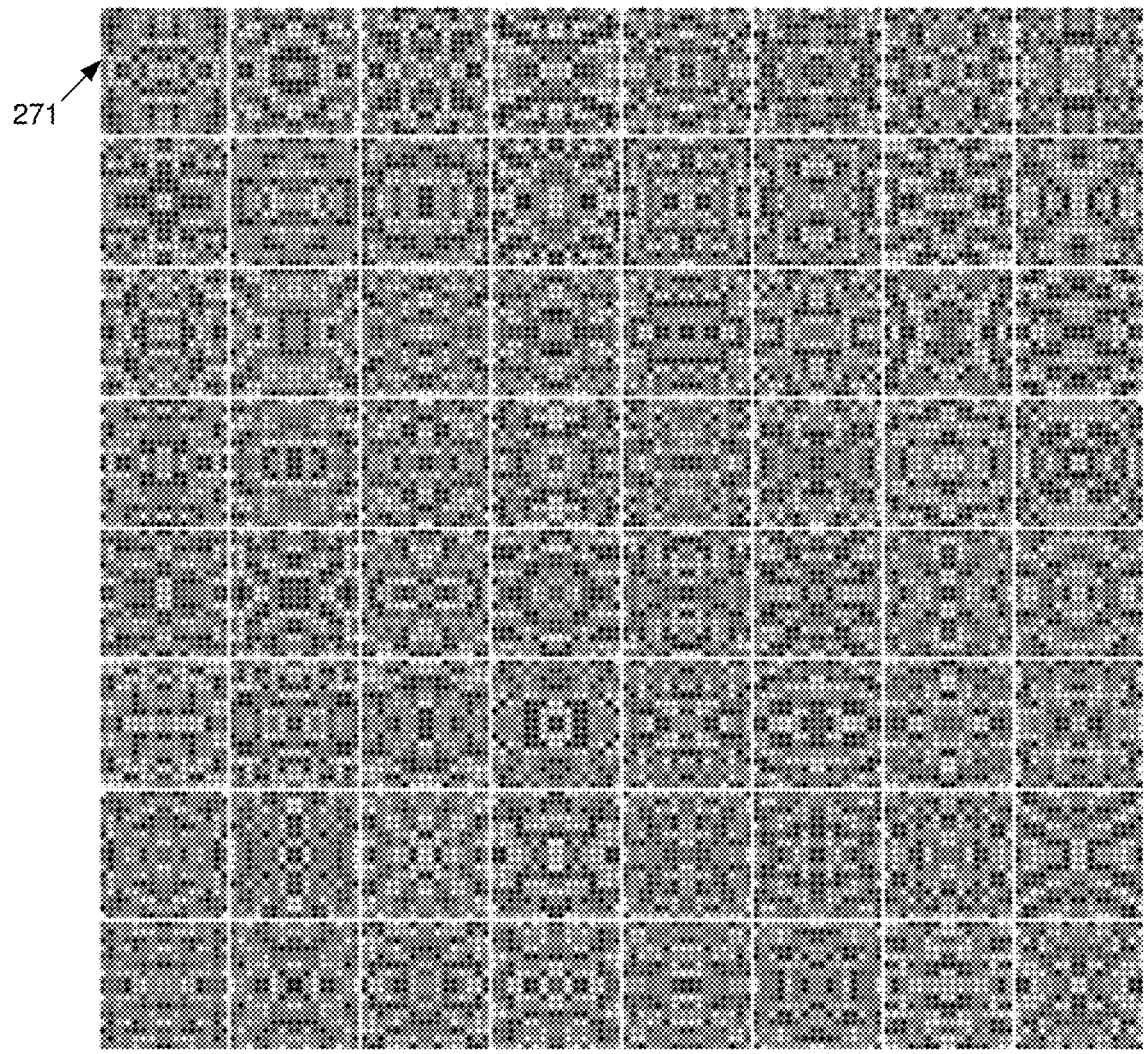
FIG. 26A further illustrates the transformations employed in FIG. 26.
FIG. 27 shows another transformation of the FIG. 25 indicia, based on a summation of multiple mirrorings of sub-blocks of the input indicia.

FIG. 26A indicates, graphically, the normalized sum of the four rotations of the upper-left sub-block from FIG. 25, which yields the upper left sub-block 261 of FIG. 26.

As can be seen from FIG. 26, each sub-block produced by this method is characterized by 4-way geometric symmetry, imparting a pleasing aesthetic to the resulting pattern. Each such processed sub-block may be regarded as a tile in a tiled pattern.

Despite such transformations, the FIG. 26 pattern still conveys the originally-encoded information to a watermark reader. Indeed, its readability is enhanced by the transformation. In particular, when a watermark reader is presented with captured imagery depicting the FIG. 26 pattern (e.g., an image of a food package bearing this pattern, captured as the package is swiped over a glass platen of a point-of-sale scanner), the reader does not need to consider all possible rotation states with which the pattern might be depicted in the captured imagery as it tries to geometrically synchronize to the pattern (e.g., to determine its scale, rotation, and the position of the upper left hand corner within the captured imagery, so that the encoded information can be extracted). Instead, the reader can search just a 90 degree range of rotations; the indicia is 90 degree rotationally-invariant. That is, the symmetry induced by the just-detailed transformation enables the reader to synchronize to the pattern as depicted in the captured imagery—regardless of its presentation in the captured imagery—by considering just a 90 degree range of possible rotations. This symmetry allows the watermark reader to synchronize to the pattern of FIG. 26 more quickly, and/or with less computational resources, than it requires to synchronize to the pattern of FIG. 25, when these patterns are presented in captured imagery at unknown rotational states.

FIG. 27 illustrates another pattern resulting from transformations applied to the input 2D code signal. In this case each original code signal sub-block is mirrored (flipped) left-for right, and summed with itself, to yield an interim product. This interim product is then mirrored top-for-bottom and summed with itself, yielding the pattern shown in FIG. 27. Again, since each pixel in the transformed sub-block is based on a sum of four processed pixels (i.e., each of the four terms in the equation atop the figure), the sum is divided by 4 to normalize. (The "M4" in the Matlab equation atop the figure is applicant's way of denoting a 4-way mirroring transform.) Again, each sub-block in the input image is processed to yield a structured tile.

Figure 28:
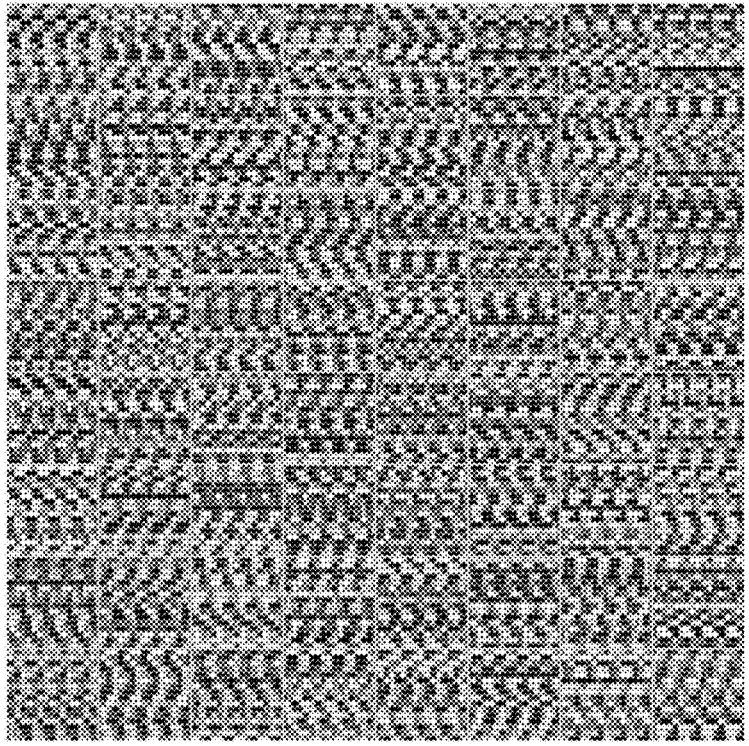
FIG. 28 shows a further transformation of the FIG. 25 indicia, based on a summation of multiple shiftings (translations) of sub-blocks of the input indicia.

FIG. 28 illustrates still another pattern resulting from transformations applied to sub-blocks of the input 2D code signal. In this case each sub-block is shifted horizontally by one-quarter of its width, and by one-half of its width, and by three-quarters of its width. The four variations on the sub-block (i.e., the original and the three shifted versions) are summed, and the sum is normalized, to produce one of the tiles of the pattern. The "T4" in the Matlab equation atop the figure is applicant's way of denoting a transformation based on four such translations.

Again, the FIG. 28 pattern eases the decoder's work. The decoder needs to search for a smaller range of possible translations, when attempting to synchronize to an input code signal of unknown translation.

Figure 29:
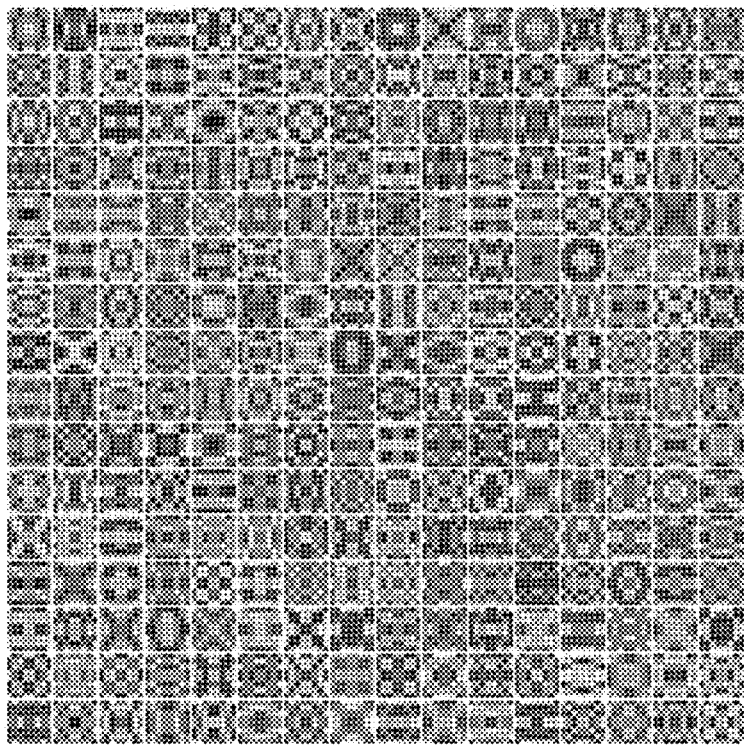
FIG. 29 shows yet another transformation of the FIG. 25 indicia, based on a summation of multiple mirrorings and FFT-shifts of sub-blocks of the input indicia.

FIG. 29 shows yet another processed indicia. In this pattern each sub-block has been transformed into a tile comprising what appears as a 2×2 pattern of sub-tiles (corresponding white lines have been added); the entire block is comprised of a 16×16 pattern of such smaller sub-tiles.

Each tile in this case is produced by an M4 mirroring operation applied to each sub-block (detailed above and shown in FIG. 27) to yield an interim-processed sub-block, which is then summed with an FFT-shifted counterpart of that interim-processed sub-block.

Figure 30:
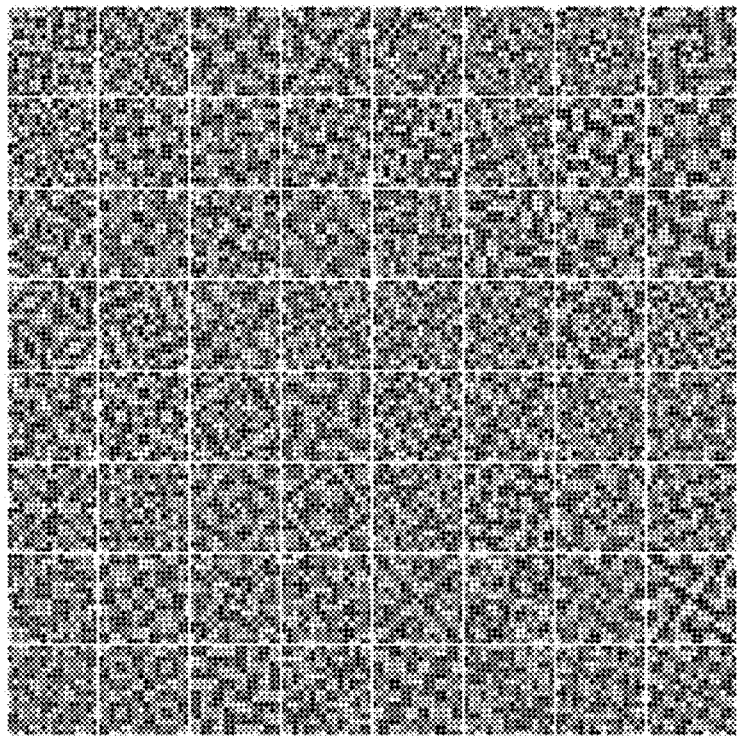
FIG. 30 shows still another transformation of the FIG. 25 indicia, based on rotations, negations, and FFT-shifts of sub-blocks of the input indicia.

FIG. 30 shows still another such processed pattern, employing rotation, negation (inversion), and FFT-shifting. The input pattern x is summed with the input pattern rotated 180 degrees, and from this sum are subtracted the input pattern rotated 90 degrees, and the input pattern rotated 270 degrees. This yields an interim pattern, which is then FFT-shifted and added to itself.

The subtraction is the negation operation, causing each tile to include two inverted counterparts of the original sub-block. The presence of such inverted counterparts allows the payload to be recovered from circumstances in which the light/dark pattern is inverted—as can happen when reading texture patterns from specular plastic surfaces (as noted in published application 20190306385, which is incorporated herein by reference in its entirety). The rotation operation again limits the search space of possibly-transformed counterparts that the detector must explore in finding correct synchronization to decode the payload from the pattern.

(The terms "sum," "summation" and the like, as used herein, encompass operations in which one or more of the operands may be negative. Thus, subtraction is a form of summation.)

Figure 31:
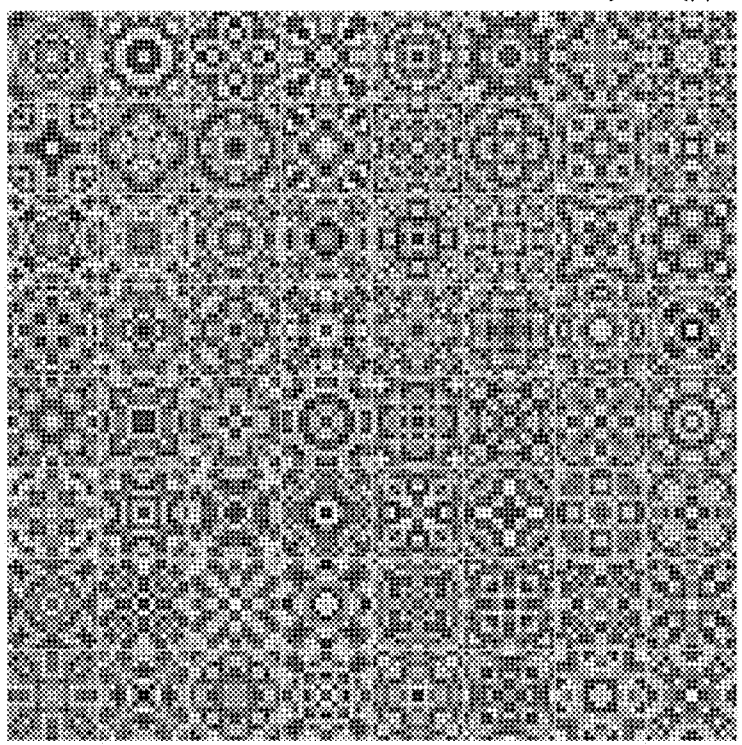
FIG. 31 shows a further transformation of the FIG. 25 indicia, based on rotations and mirrorings of sub-blocks of the input indicia.

FIG. 31 shows a pattern in which each component tile is produced by 4-way rotation/summing of a sub-block (as in FIG. 26), and the resulting interim tiles are then 4-way mirrored (as in FIG. 27).

Although the axes in the foregoing examples all pass through the center of a sub-block, this is not essential.

Figure 32:
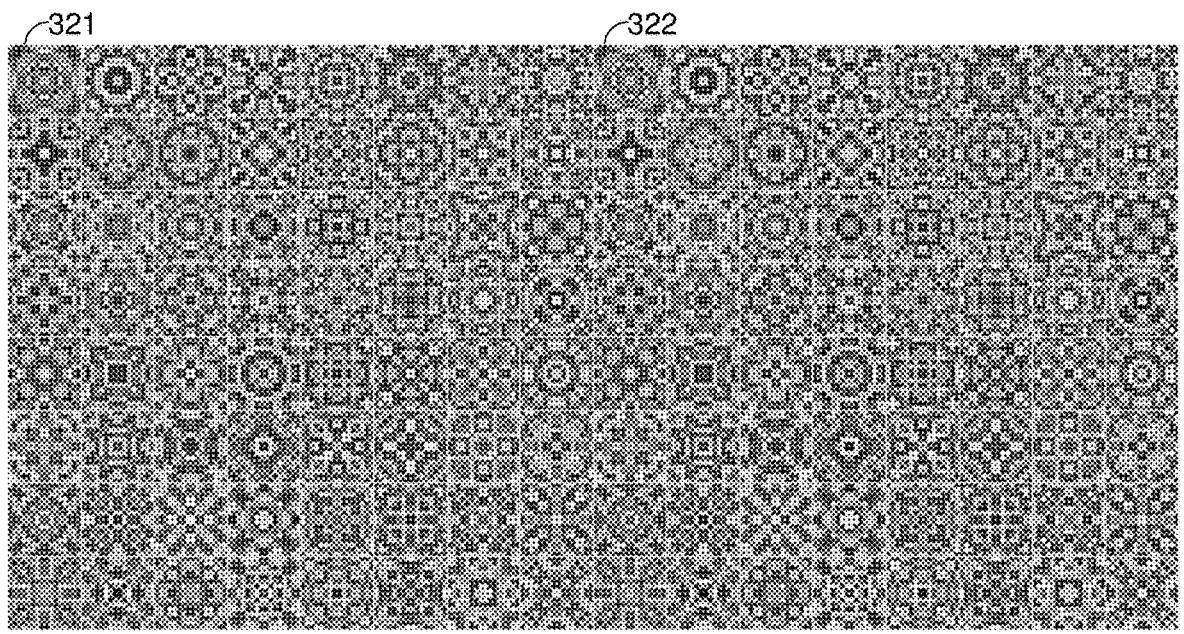
FIG. 32 shows two processed signal indicia tiled side-by-side, where a sequence of component tiles repeats.

In the above examples, a 512×512 pixel signal block is divided into an integral number of sub-blocks. That is, the sub-blocks are sized to perfectly span the block (e.g., 64×64 pixels). In such arrangement, if the post-processed blocks are placed edge to edge (e.g., to span an area of product artwork), the sequence of different tiles cyclically repeats. In FIG. 32, where two of the patterned blocks of FIG. 31 are placed side-by-side, the upper-left tile 321 of one block is identical to the upper-left tile 322 of a next block, etc.

Figure 33:
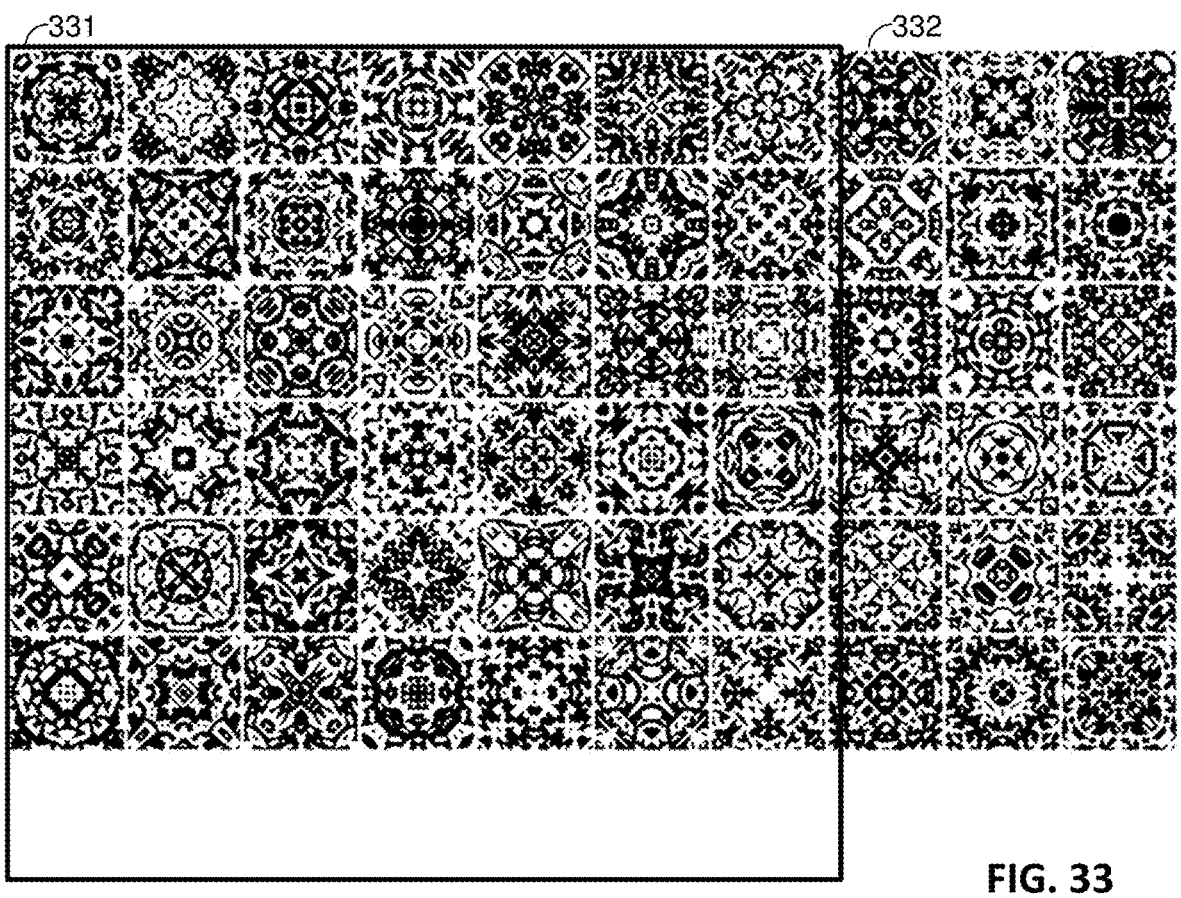
FIG. 33 shows an excerpt from two processed signal indicia tiled side-by-side, where a sequence of components tiles does not repeat.

A different result can be achieved by setting the sub-block size so that it is not an integral fraction of the whole signal block. FIG. 33, for example, shows tiles resulting from sub-blocks of size 72×72 pixels. 7.111 such tiles span a 512×512 signal block (shown by the solid line square). In this case the tiles take different appearances, and do not repeat from one block to the adjacent block. For example, the tile 331 found in the upper left corner of one block is visibly different than the tile 332 found in the upper left corner of the adjoining block. (FIG. 33 is magnified relative to FIG. 32 to show additional detail.)

It will be recognized that the tiles of FIG. 33 are black and white, or bitonal, whereas the earlier examples were greyscale. A bitonal tile (or block) can be derived from a greyscale tile by thresholding: setting all pixels of a particular value (e.g., below 128 or 96, or the lowest-valued 30% of pixels) to black, while setting other pixels to white. Despite such further transformation to the original signal elements, the pattern of FIG. 33 still reads with a conventional watermark detector (e.g., the Digimarc Discover iPhone app).

In other arrangements the input watermark block can be divided into hexagonal sub-blocks, rather than squares. Such sub-blocks lend themselves to mirroring, rotation, and other transformations along axes oriented, e.g., at 0, 120 and 240 degrees.

Figure 34:
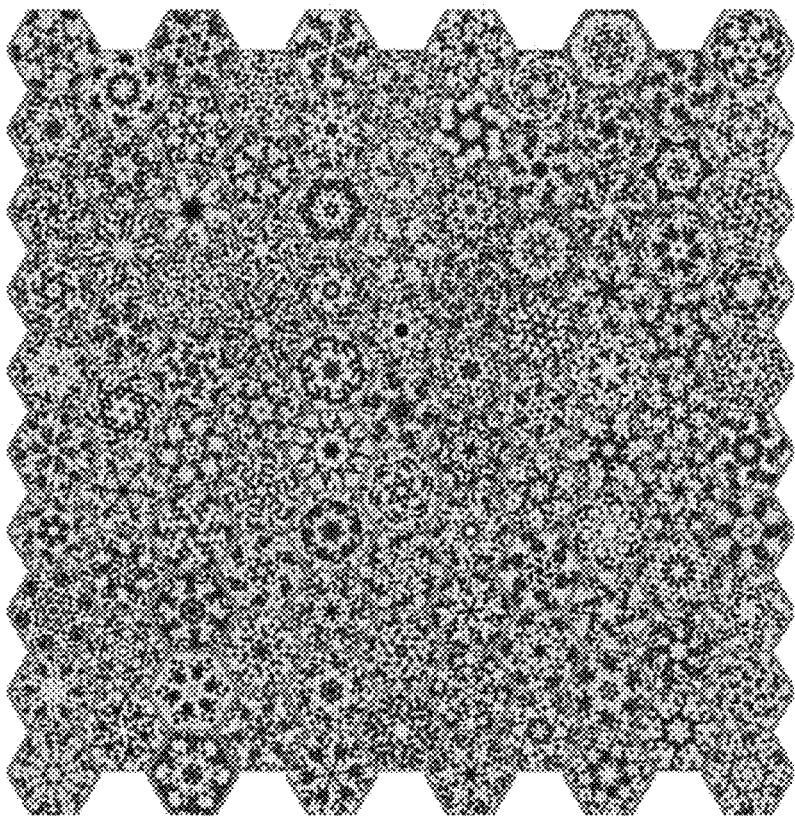
FIG. 34 shows a transformation of the FIG. 25 indicia based on hexagonal sub-blocks and a summation of multiple rotations of sub-blocks of the input indicia.
Figure 36A:
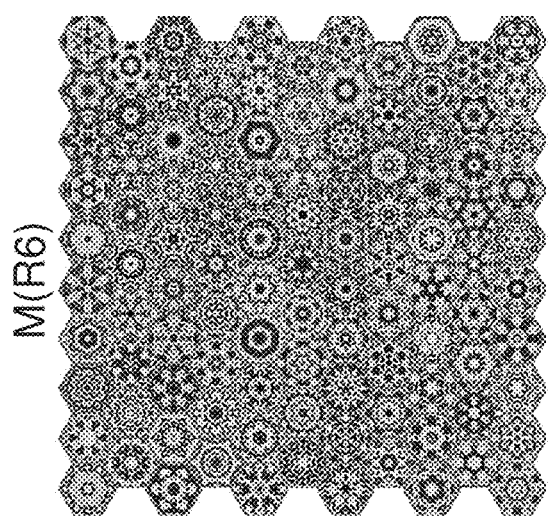
FIGS. 36A-36D show transformations of the FIG. 25 indicia based on combinations of different transformations—all leading to the same output pattern.
Figure 36B:
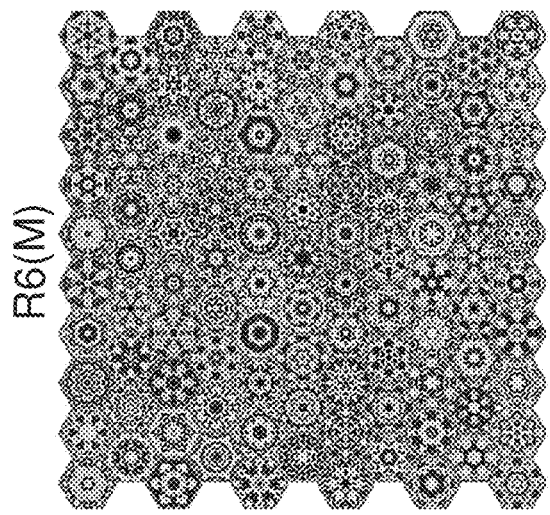
Figure 36C:
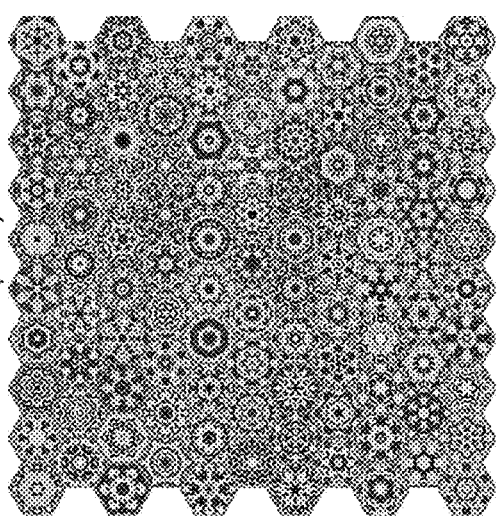
Figure 36D:
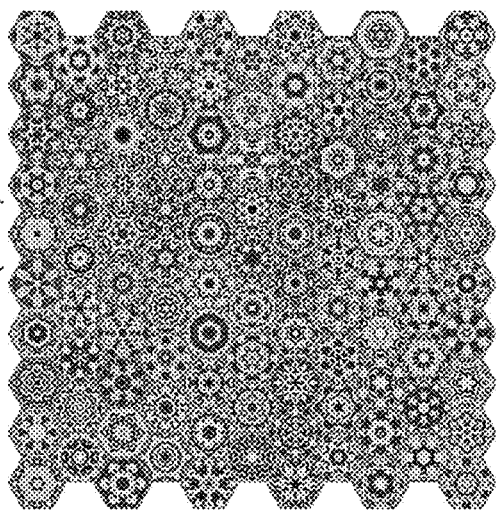

FIG. 34 shows an example employing six rotations, thus "R6." In this case each sub-block is rotated to six different states (oriented at 0, 60, 120, 180, 240, and 300 degrees). These differently-rotated sub-blocks are cropped, summed, and the results normalized by dividing by six. Put in Matlab terms, this transform is:

R6=@(x)(x+imrotate(x,60,'crop')+imrotate
(x,120,'crop')+imrotate(x,180,'crop')+
imrotate(x,240,'crop')+imrotate(x,300,'crop'))

Figure 35:
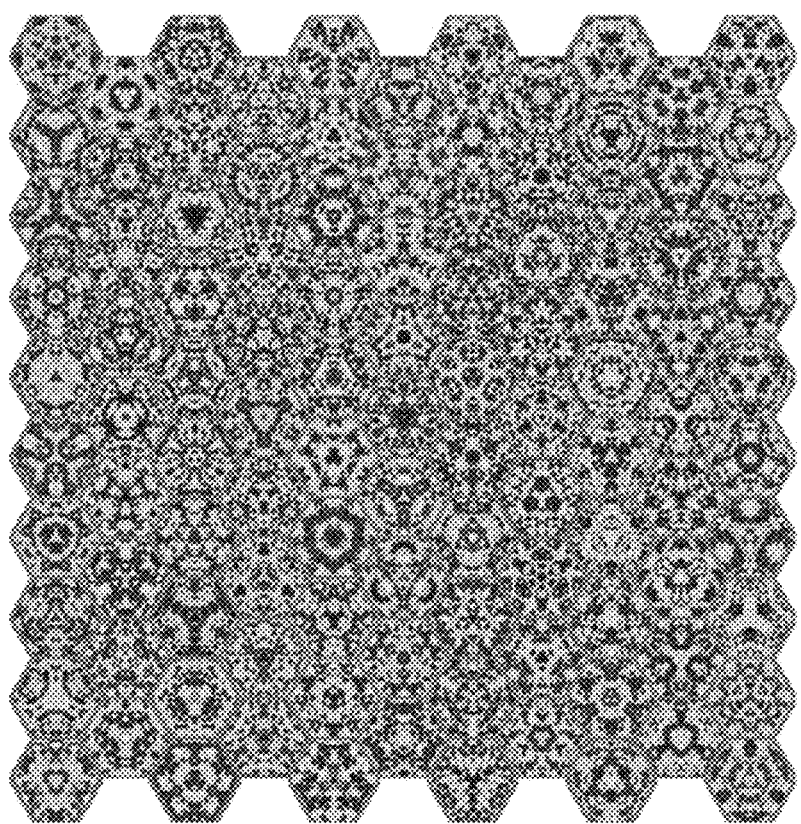
FIG. 35 shows a transformation of the FIG. 25 indicia based on hexagonal sub-blocks and a summation of mirrorings rotations of sub-blocks of the input indicia.

FIG. 35 shows another example: "M6." In this case it is sufficient to perform the mirror/sum operation once (e.g., across a horizontal axis that bisects each sub-block), and then sum counterparts of this intermediate pattern, rotated at 0, 120 and 240 degrees. That is:

M=@(x)(x+flipud(x));

M6=@(x)(M(x)+imrotate(M(x),120,'crop')+imrotate
(M(x),240,'crop'));

(Normalization is omitted in these formulas.)

FIGS. 36A-36D show a further pattern that is produced by cascading different mirroring and rotation transformations on each sub-block in a 2D signal block. In these four cases, all of the transformations produce the same output pattern.

Figure 37:
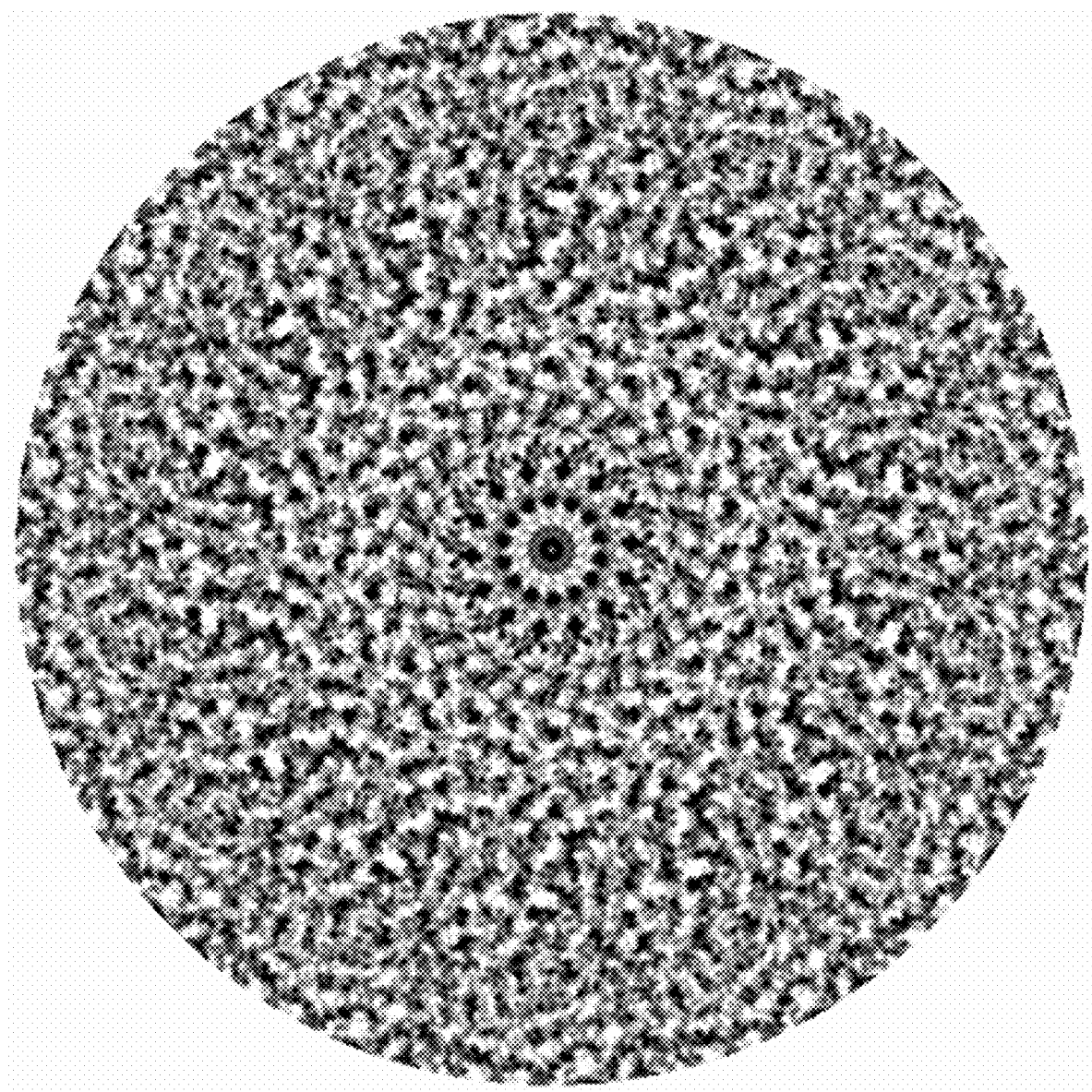
FIG. 37 shows a transformation of the FIG. 25 indicia based on a summation of 14 different rotations of the input indicia.

FIG. 37 shows a nearly-circular pattern resulting from taking the full, square signal code block of FIG. 25, rotating it to 14 angular rotations (equally-spaced, here 12.86 degrees), summing, and normalizing (i.e., scaling by an amplitude factor of 1/14).

Figure 38:
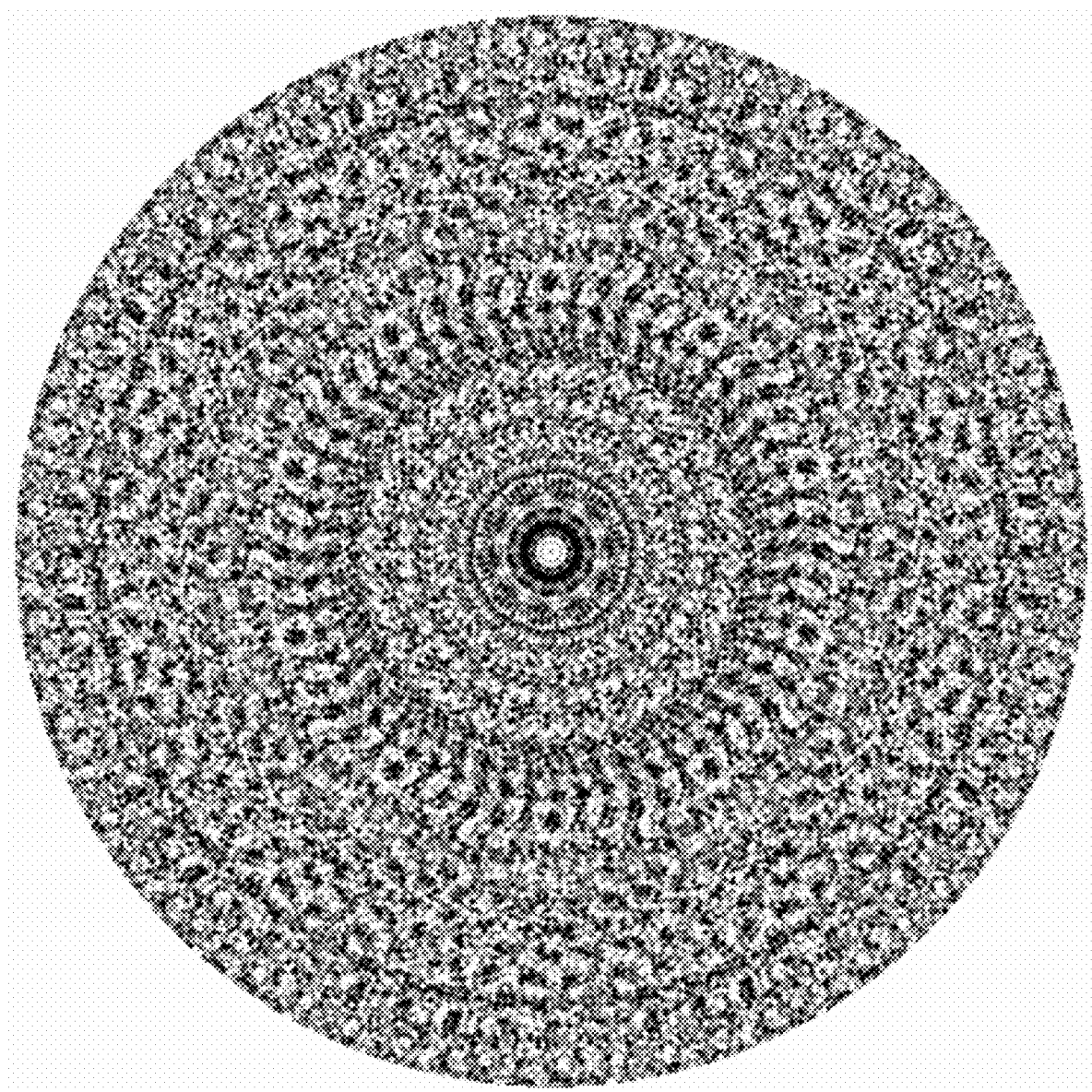
FIG. 38 shows a transformation of the FIG. 25 indicia based on a summation of 60 equally-spaced rotations of the input indicia, combined with a similar summation of 10 rotations.

FIG. 38 shows another variant in which the full code block of FIG. 25 is rotated to 60 equally-spaced angular rotations (i.e., 6 degrees apart), summed, and normalized. The full code block is also rotated to 10 equally-spaced angular rotations (i.e., 36 degrees apart), summed, and normalized. The results from these two sets of operations are then summed and normalized.

As with some of the previously-discussed arrangements, the transformations of FIGS. 34-38 enable a decoder to synchronize to a counterpart of the encoded information without searching the entire range of possible rotation states. Instead, geometric synchronization will be found in a much-abbreviated search space.

Figure 39:
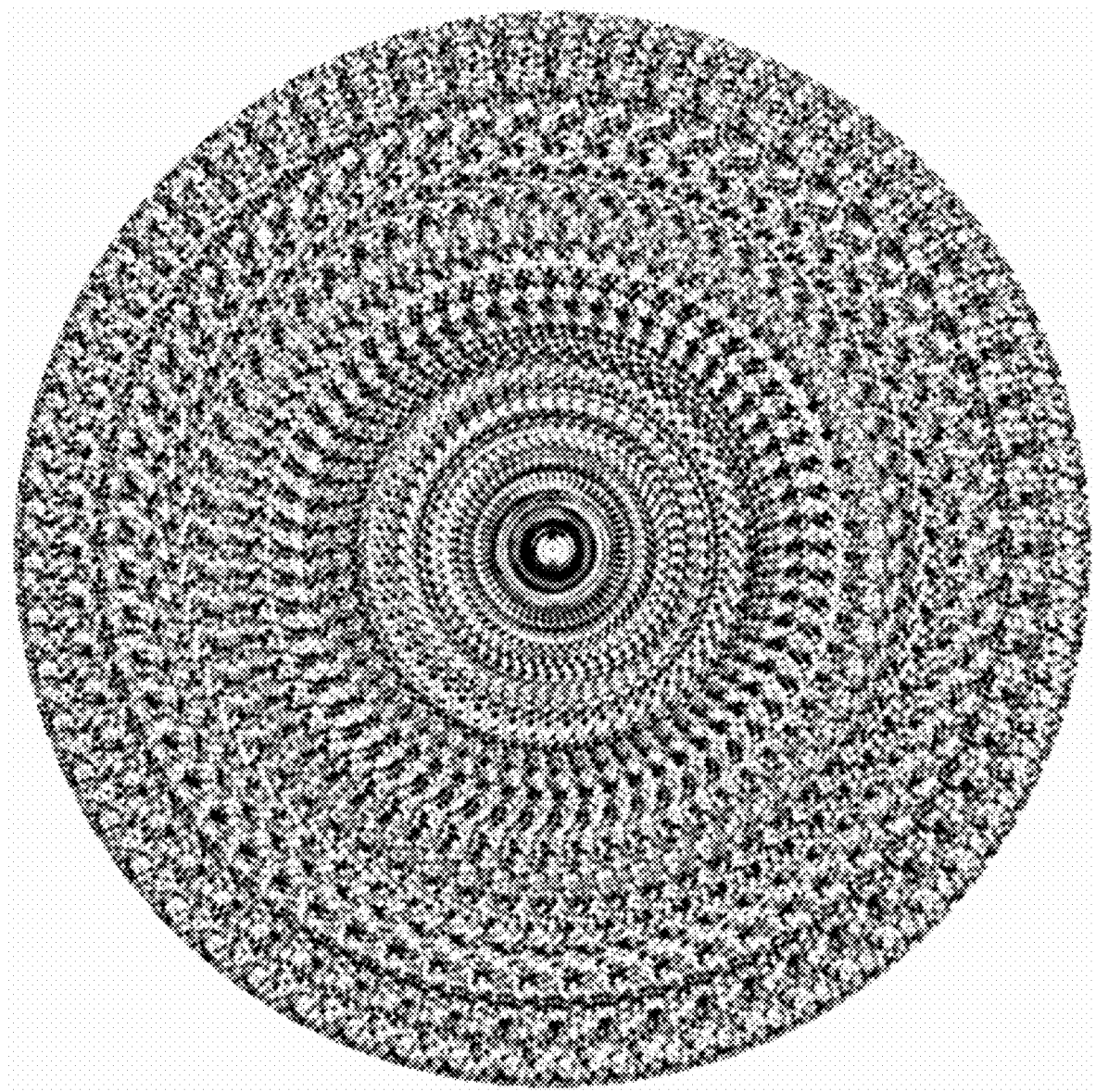
FIG. 39 shows a transformation of the FIG. 25 indicia based on 60 rotations—each at a different scale.

FIG. 39 shows a further variant in which the full code block of FIG. 25 is rotated to 60 equally-spaced angular rotations, summed and normalized. However, at each successive rotation state the block is scaled by 104%, so the summation includes patterns at a great variety of different scale states. This extends the range of distances over which a decoder can successfully extract the encoded payload information. When the decoder is at large reading distances, the pattern appears relatively small, but the largest-scale counterparts of the blocks still fall within the decoder's range of permitted scale states, and thus are readable. Conversely, when the decoder is at close reading distances the pattern appears relatively large, but the smallest-scale counterparts of the blocks still fall within the decoder's operational range.

Figure 40:
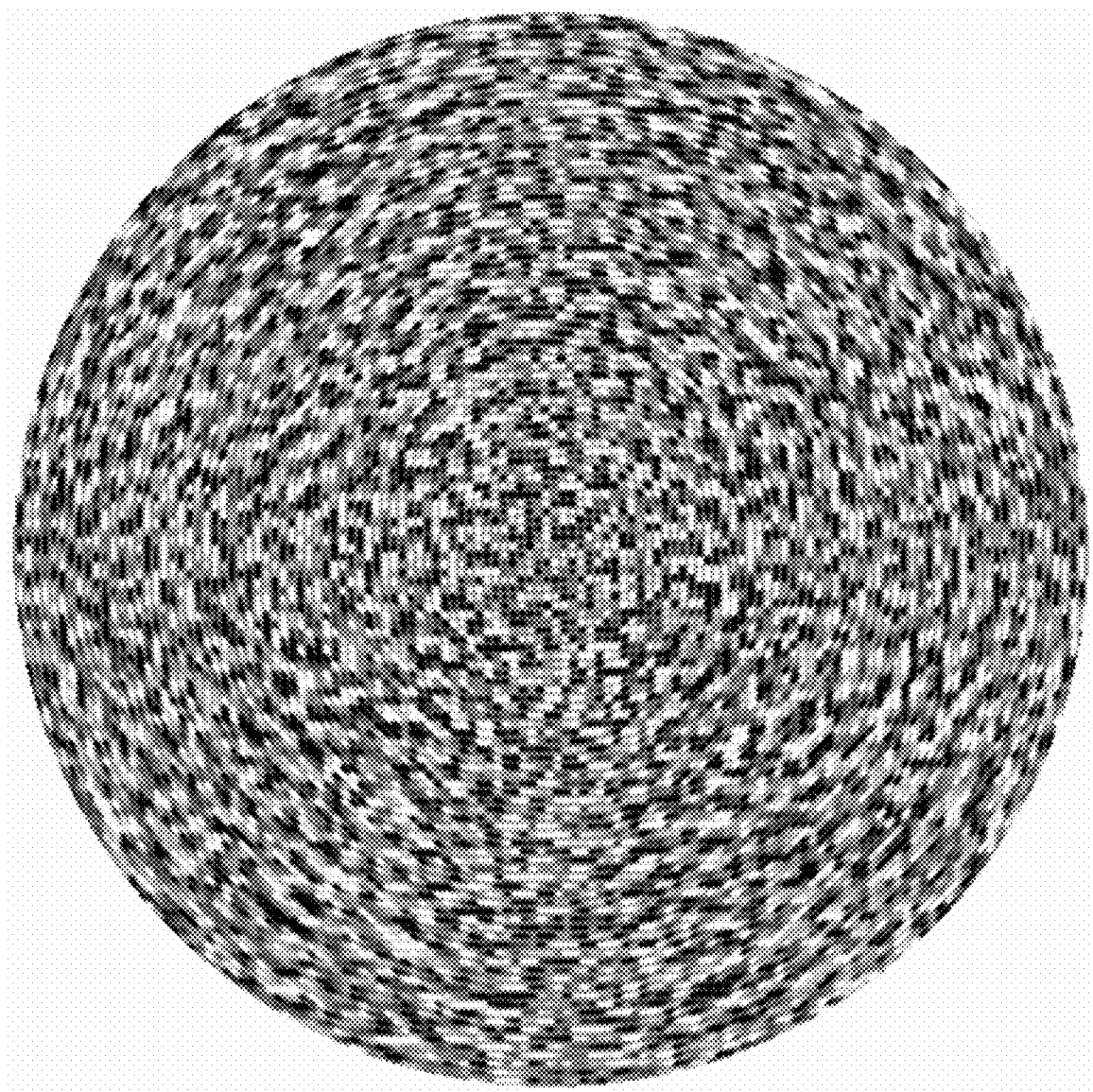
FIG. 40 shows a transformation of the FIG. 25 indicia based on 10,000 rotations—each at a different scale.

FIG. 40 shows the pattern resulting from the FIG. 39 transformations, but employing 10,000 equally-spaced angular rotations.

Figure 41:
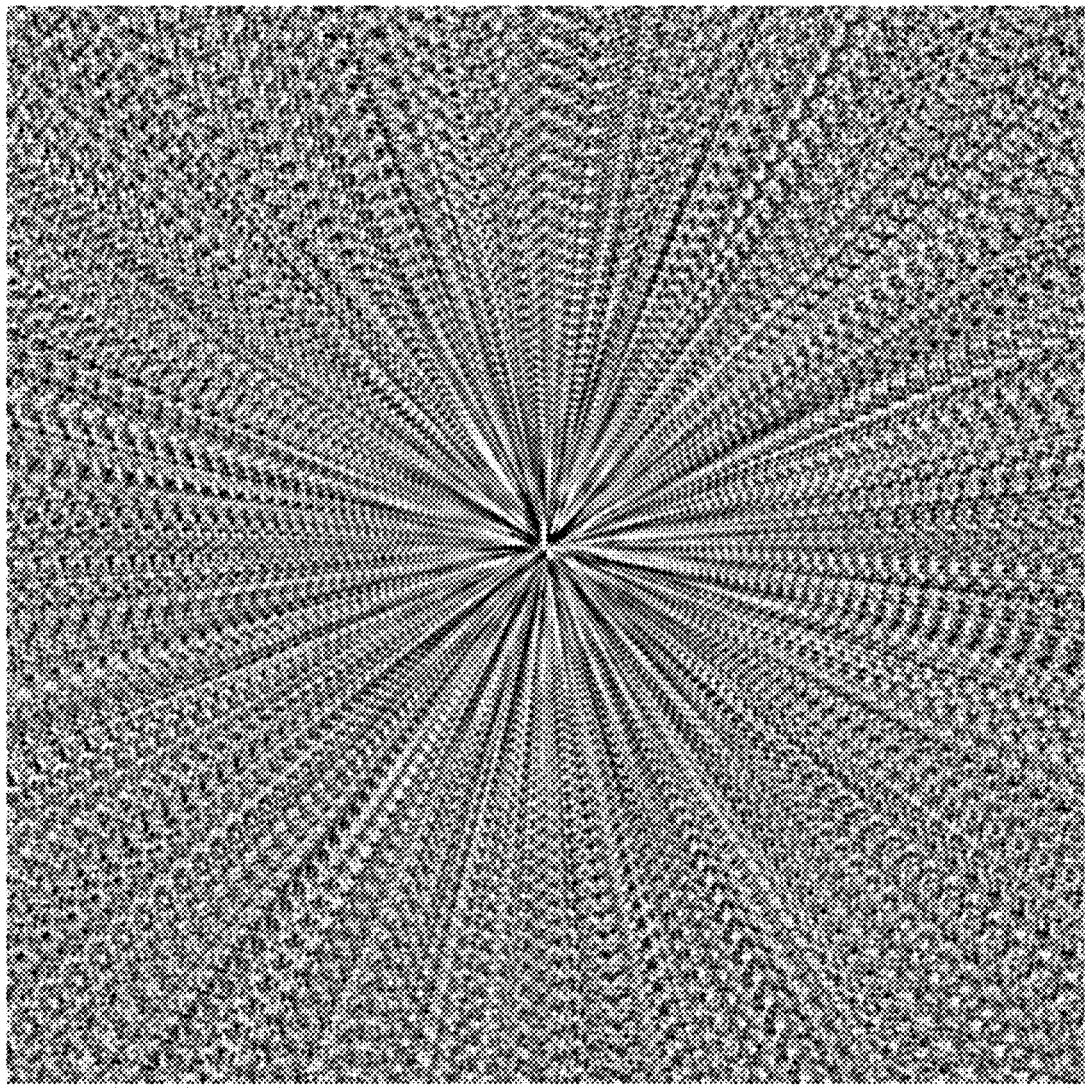
FIG. 41 shows a transformation of the FIG. 25 indicia based on a summation of 21 differently-scaled versions of the input indicia.

FIG. 41 shows a pattern resulting from scaling a pattern at 21 different scale states (each 95% the size of the previous one), summing and normalizing. This pattern is readable over a range of reading distances of about 25:1 using a standard watermark decoder (e.g., as provided in the Digimarc Discover iPhone app) —about 10 times larger than the decoder's normal reading range.

Figure 42:
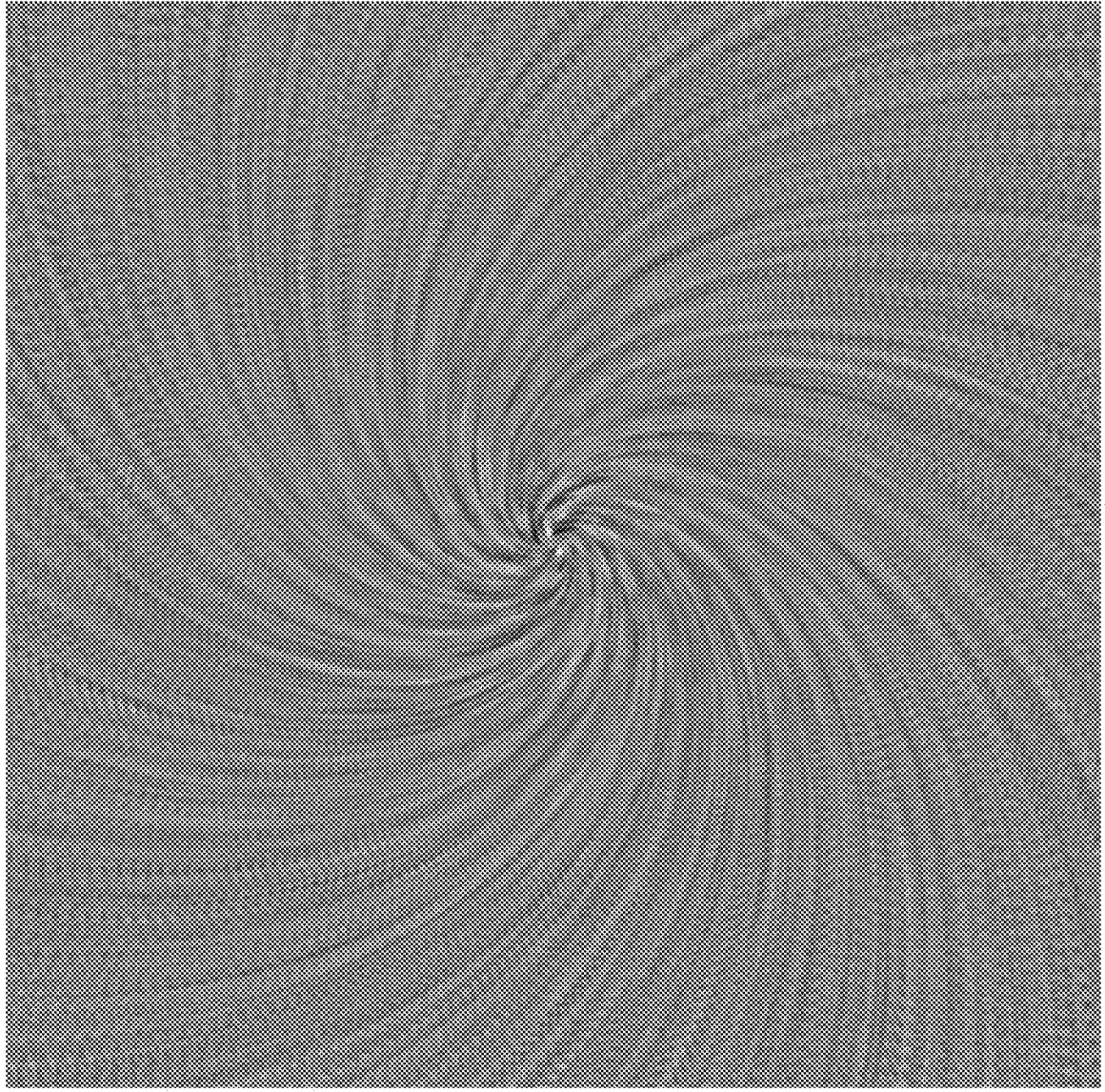
FIG. 42 shows a transformation of the FIG. 25 indicia based on 20 different rotations, each differently-scaled.

FIG. 42 shows another pattern resulting from both repeated scaling and rotation transforms. This pattern is comprised of 20 equally-spaced rotations of the signal block, with each successively scaled by a factor of 0.98.

The arrangements described above process the entirety of the signal block (in whole, or in sub-blocks) to yield the resulting pattern. But this is not necessary. Parts of the signal block, or of each sub-block, can be discarded, and a pattern can be formed by one or more transforms applied to remaining elements.

A useful analogy is a kaleidoscope—an instrument in which two or more mirrors are tilted towards each other at an angle, causing a set of items positioned within this angle to be apparently replicated around axes when viewed from an eyepiece. In like fashion, a spatial excerpt of elements within a block or sub-block can be projected around one or more axes to generate symmetrical patterns.

Figure 43A:
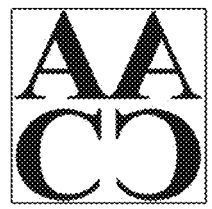
FIGS. 43A-43C illustrate different kaleidoscopic operations.

An example is shown in FIG. 43A. In this case a sub-block is represented by the ABCD pattern of FIG. 24A. A vertical axis bisects the sub-block, and elements to the right of the axis are discarded. The remaining elements are mirrored around the axis to produce the pattern of FIG. 43A.

Figure 43B:
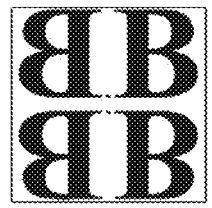

A further example is shown in FIG. 43B. Here both vertical and horizontal axes bisect the sub-block, and elements except those in the upper right quadrant are discarded. When reflected (mirrored) around the two axes, the pattern of FIG. 43B results.

Figure 43C:
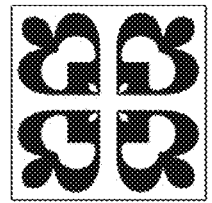

A still further example is shown in FIG. 43C. Here vertical, horizontal, and diagonal axes define a one-eighth sliver. Elements except in this one eighth sliver are discarded. When the remaining elements are reflected around the axes, the pattern of FIG. 43C results.

Figure 44A:
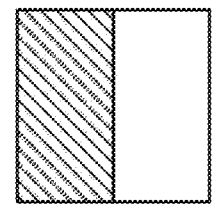
FIGS. 44A-44C illustrate different windowing operations used in connection with the operations of FIGS. 43A-43C.
Figure 44B:
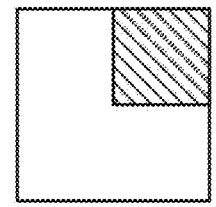
Figure 44C:
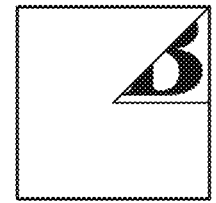

The discarding of some elements in a sub-block (or block), with preservation of other elements in the sub-block, may be conceptualized as a windowing function. FIG. 44A shows the windowing function used in the example of FIG. 43A, with the retained area shown in cross-hatching, and the discarded elements shown by white. FIG. 44B shows the windowing function used in the example of FIG. 43B. FIG. 44C shows the one-eighth sliver identified by the window used in the example of FIG. 43C.

The discarding of signal elements by windowing does not prevent reading of the encoded information due to the highly redundant error-correction encoding used in most forms of applicant's digital watermarking. (Particular examples are detailed in our patent publication 20190332840, which is incorporated herein by reference in its entirety.)

In the just-detailed arrangements, no normalization (e.g., division by four) is required, due to the reflection of elements into otherwise blank areas.

In other arrangements, normalization is required. Consider the input signal block represented by the Sample Design box of FIG. 45A. A windowing function can be applied to select the left half of this block, and the selected half can be mirrored around the vertical axis, yielding the interim-processed block of FIG. 45B. No normalization is needed, since the selected half of the block was windowed onto a blank area.

Figure 45A:
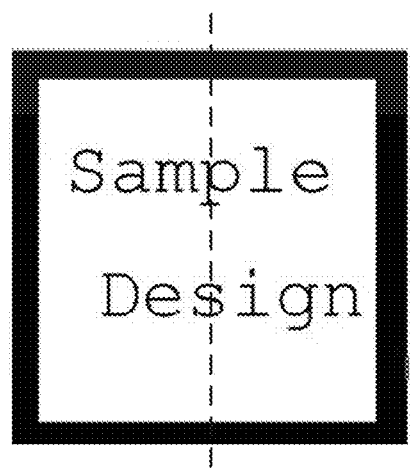
FIGS. 45A-45D further illustrate kaleidoscopic operations.
Figure 45B:
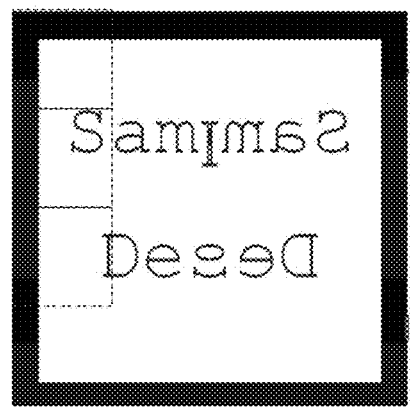
Figure 45C:
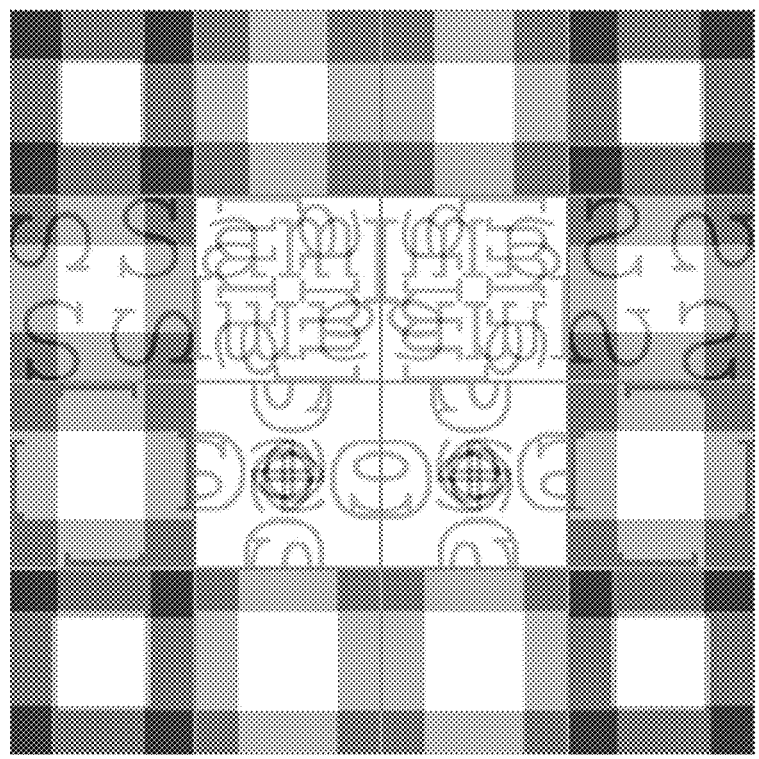

The interim-processed block of FIG. 45B can then be divided into an array of 16 sub-blocks. (Only three are shown, by the dotted lines.) Each of these sub-blocks can then be R4-processed to yield the final block shown in FIG. 45C (enlarged to show detail). Since the R4 operation involves summing multiple counterparts of image data, normalization is here required. This normalization leads to the greyscale tones in FIG. 45C, whereas the original signal block of FIG. 45A is bitonal.

(As illustrated by the foregoing example, a windowing operation can be applied before dividing into sub-blocks, rather than after—as in FIGS. 43A-43C.)

Figure 45D:
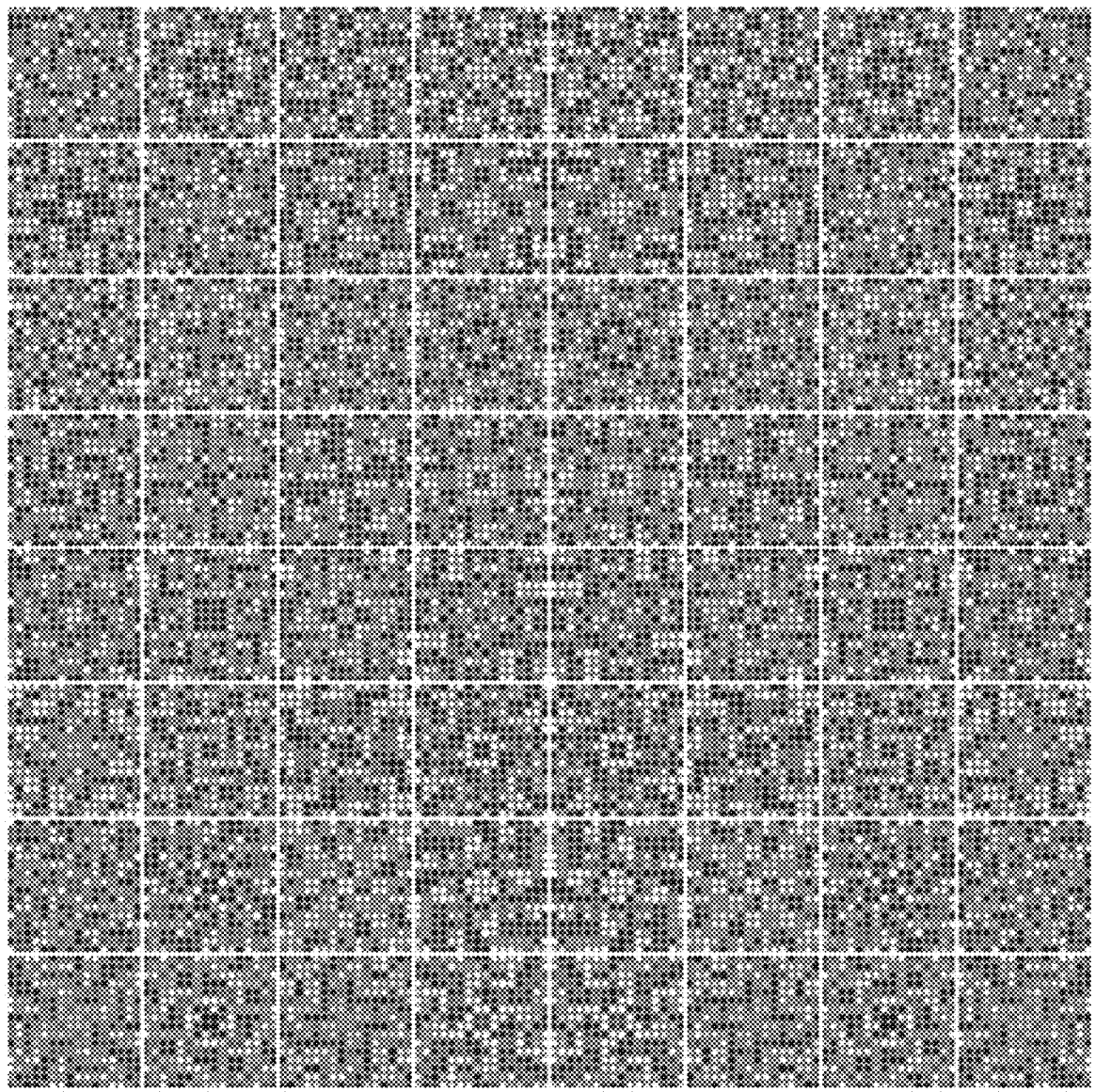

When the just-described process is applied to the 2D signal block 250 of FIG. 25, but dividing into an 8×8 array of sub-blocks, the pattern of FIG. 45D results. (Again, white lines separating the processed tiles are added to aid visual understanding.) A watermark detector can extract the payload from this pattern without examining all possible rotations, since the use of the R4 operation constrains the search space that must be explored. This sequence of transformations also yields an array of tiles that can be read even if mirror-imaged, further enhancing its utility.

(Windowing may be regarded as a sparsification operation—limiting the amount of input data that will be included in the output signal.)

Figure 46:
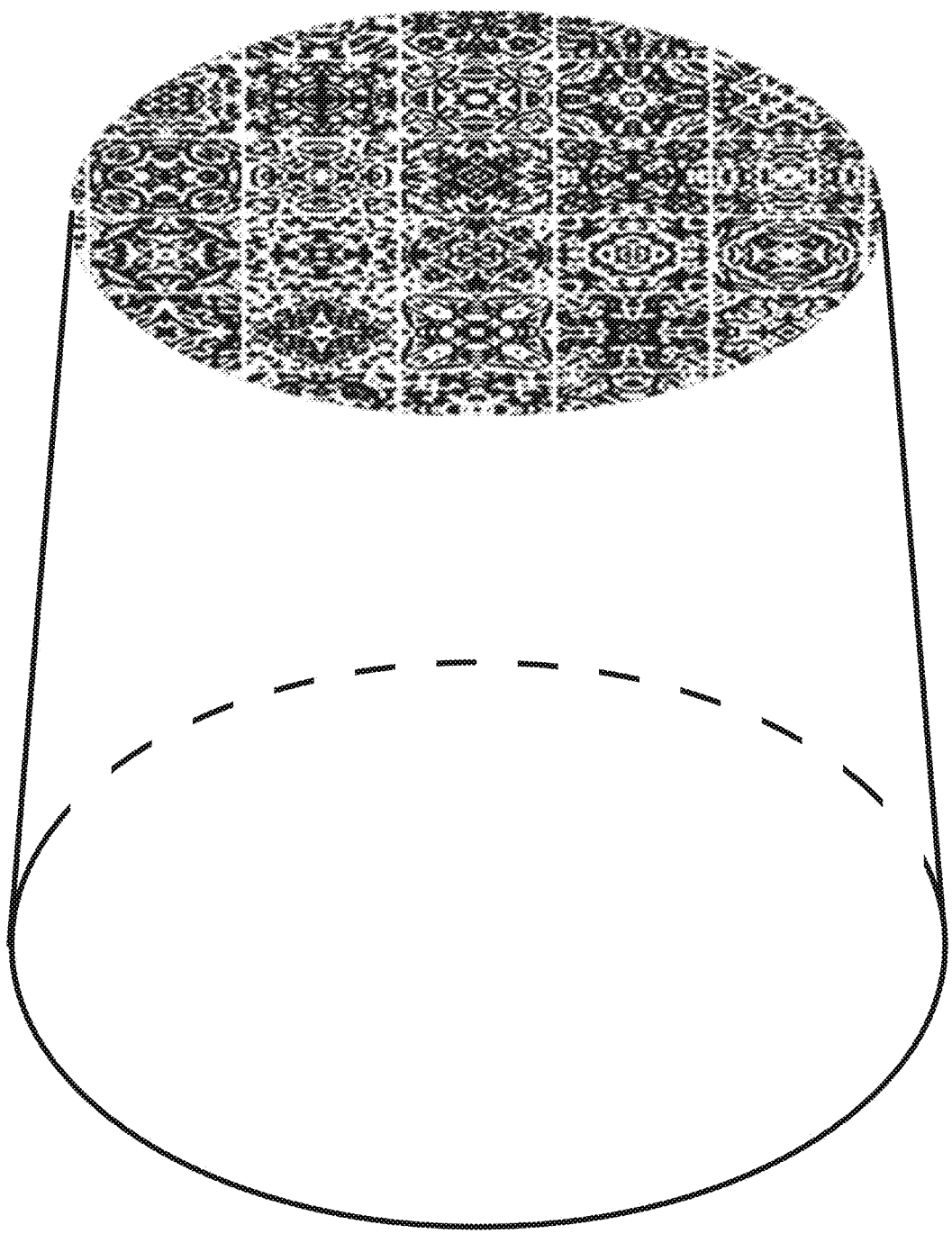
FIG. 46 shows a food container, such as a plastic yogurt tub, printed with a code indicia produced by one of the present methods.

FIG. 46 shows how a pattern produced by the foregoing methods can be printed on the bottom of a food container (e.g., a yogurt tub). Printing may be performed using ink-jet, offset, dry offset, or other technique. The encoded information may include a GTIN for the item, a lot code, expiration date information, etc.

Figure 47:
FIG. 47 illustrates how a stylized pattern produced by one of the present methods can be combined with host artwork.

As with other watermark patterns, patterns generated according to the present methods can also be combined with other artwork, in a ratio chosen to yield desired visibility and robustness. FIG. 47 is an example. Although the Lena image is probably not suitable for product packaging, it will be recognized that other images may be combined with such watermark patterns for use in packaging applications.

Figure 48C:
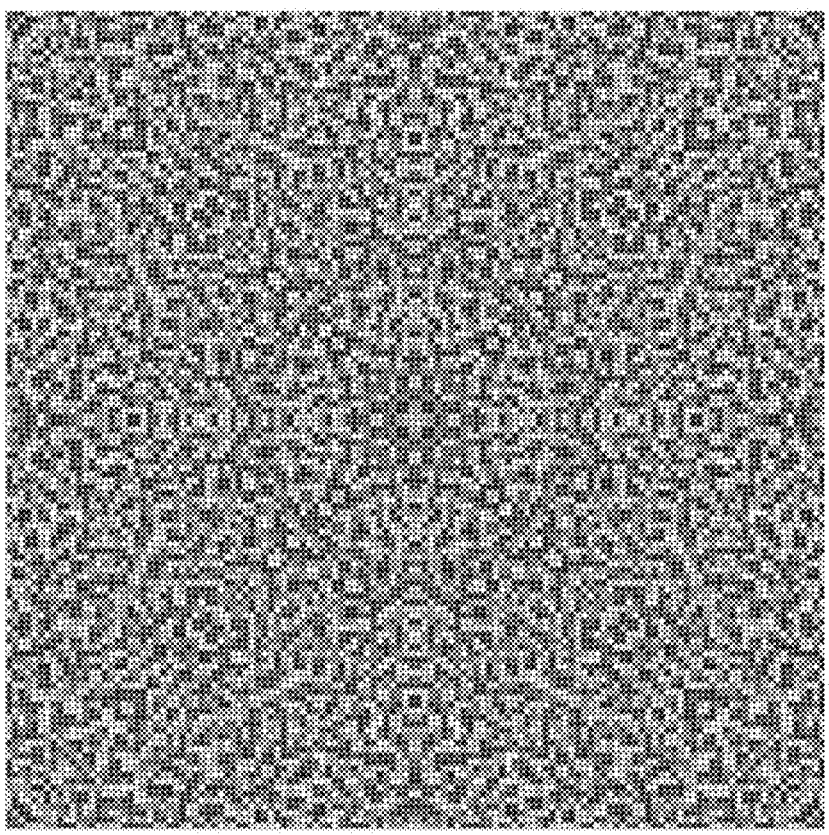
Figure 48B:
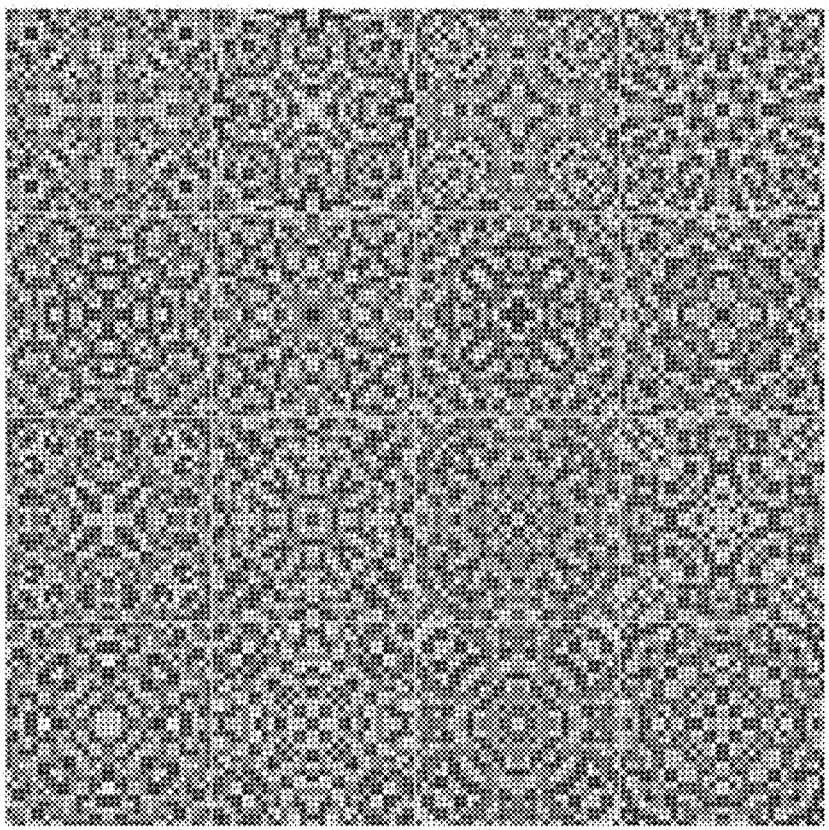

The patterning of tiles resulting from the foregoing methods becomes more distinct as the sub-block size is reduced. FIG. 48A shows the M4 transformation of FIG. 27 applied with sub-block sizes ranging from 16×16 to 96×96. As can be seen, with larger sub-blocks, the patterning becomes more nuanced and less overt. FIG. 48B shows a signal block M4-processed using sub-block sizes of 128×128. FIG. 48C shows a signal block M4-processed using sub-block size of 512×512 pixels. In this instance it will be recognized that the sub-block is the size of the entire input signal block. Again, the larger the sub-block size, the more subtle is the patterning introduced by the transformation operations.

Applicant has found that the "kaleidoscopic" approach, in which windowing produces a blank area in to which other imagery is rotated, mirrored, translated, etc., seems to work best with large sub-block sizes (e.g., of a fifth of a block or larger), while the earlier-detailed approach, in which all input data is preserved and transformed, seems preferable with smaller sub-block sizes. Thus, the patterns of FIGS. 48B and 48C would have more visible organized structure if windowing were employed, in a kaleidoscopic approach.

While the arrangements detailed in this section take, as input, a 2D signal block alone, this is not essential. Instead, the input block can comprise artwork that has been previously-processed to convey a 2D code signal. Examples include the collage images earlier-detailed in Section I, as well as the stylized artworks detailed in published application 20190213705.

Figure 49:
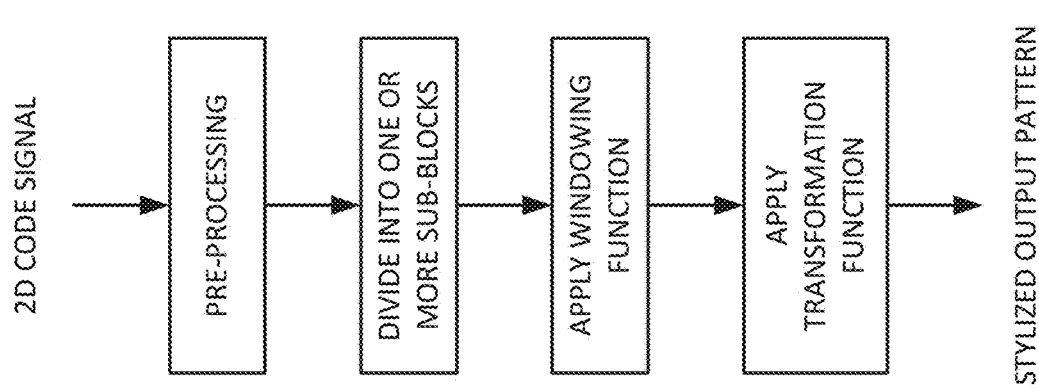
FIG. 49 is a flowchart detailing one particular implementation incorporating aspects of the present technology.
Figure 51B:
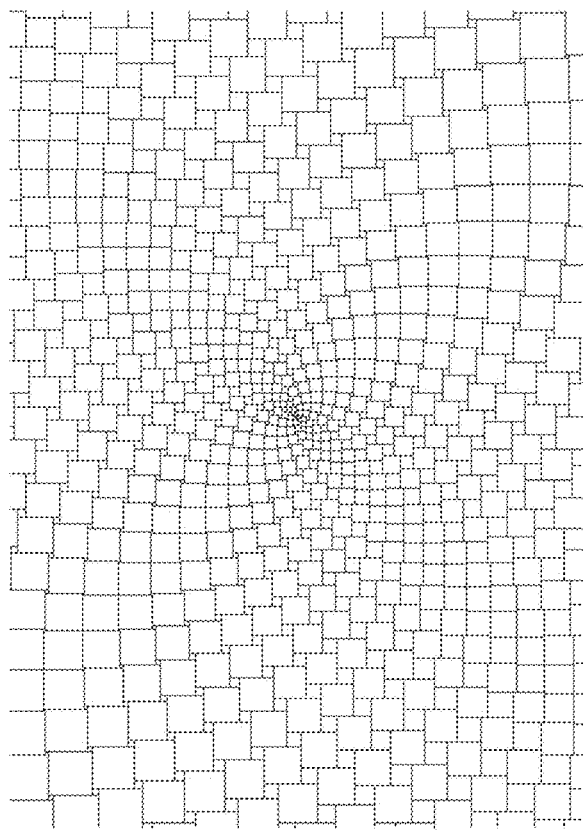
FIGS. 51A-51E illustrate a few different sub-block arrangements that can be employed in embodiments of the present technology.
Figure 51A:
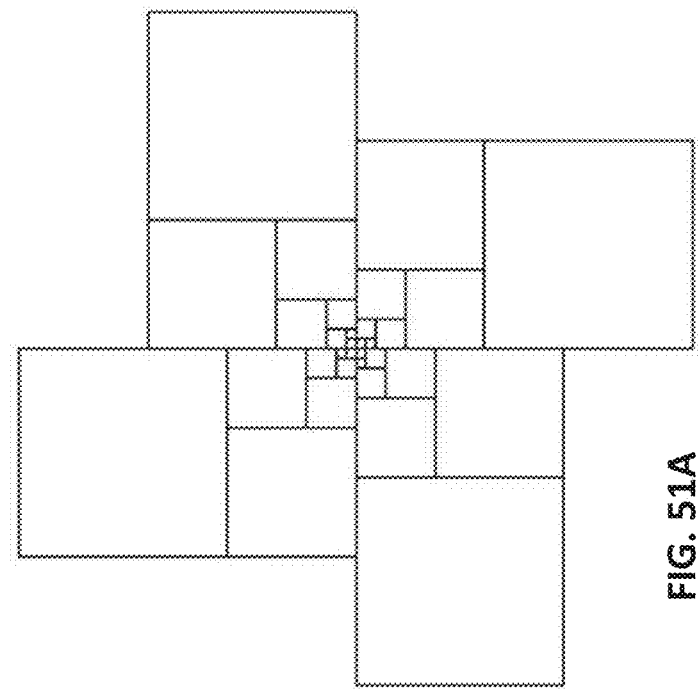
Figure 51E:
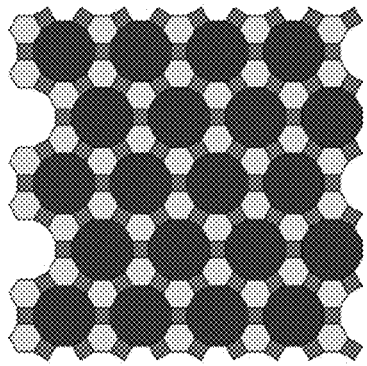
Figure 51D:
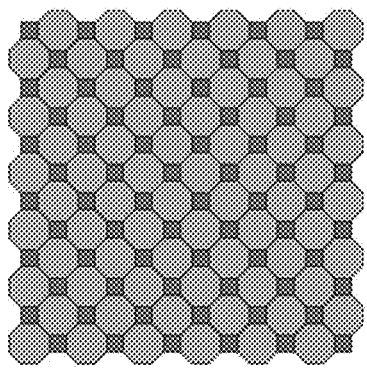
Figure 51C:
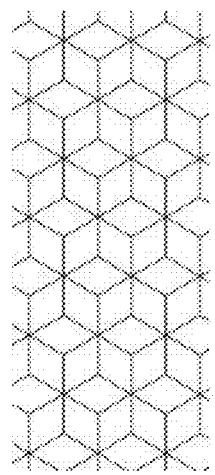
Figure 53:
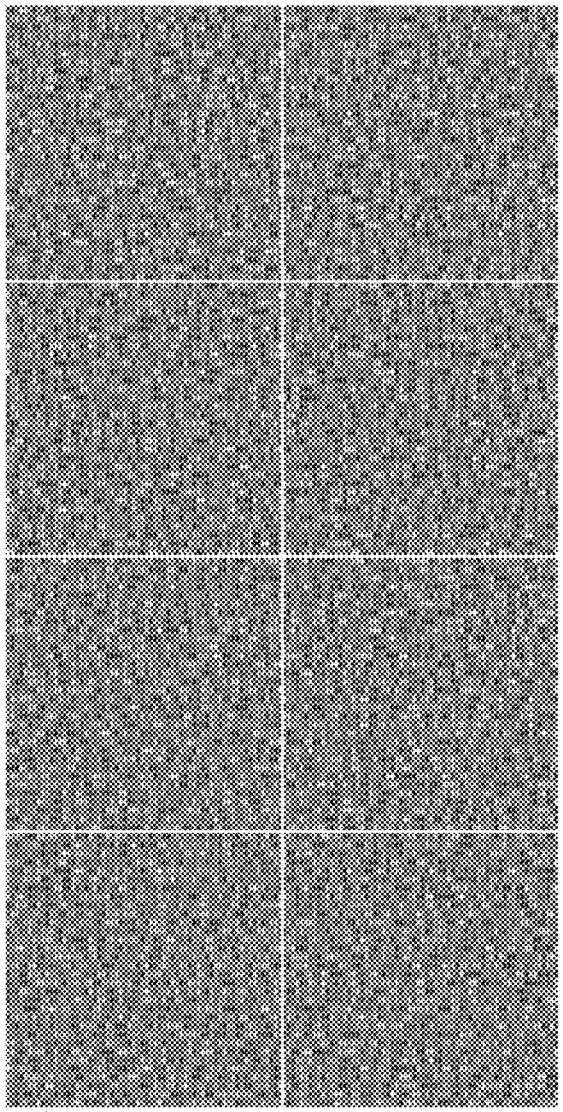
FIG. 53 illustrates that an input indicia can be geometrically transformed prior to being divided into sub-blocks, for application of other transformations.

FIG. 49 is a flow-chart of an exemplary process incorporating certain aspects of the present technology. A 2D machine readable code may optionally first be pre-processed. This can include operations such as sparsification (e.g., as detailed in 20190332840), conversion to bitonal form, greyscale remapping, colorization, etc. It can further include incorporation into other artwork elements, as just-mentioned.

The block is then sub-divided into sub-blocks. (As illustrated by FIG. 48C, a sub-block can be the entire block.) A windowing function can next be applied, to identify particular sub-block excerpts that are to be operated on. (Again, the excerpt can be the entire sub-block.) A transformation function is then applied. The transformation functions of FIGS. 24B-G, and I, are most commonly-used, although others can be employed. These transformations often involve summing differently-processed counterparts of the windowed excerpts to yield tiles that exhibit a organized structure—often geometrical symmetry—not present in the input code.

Figure 50:
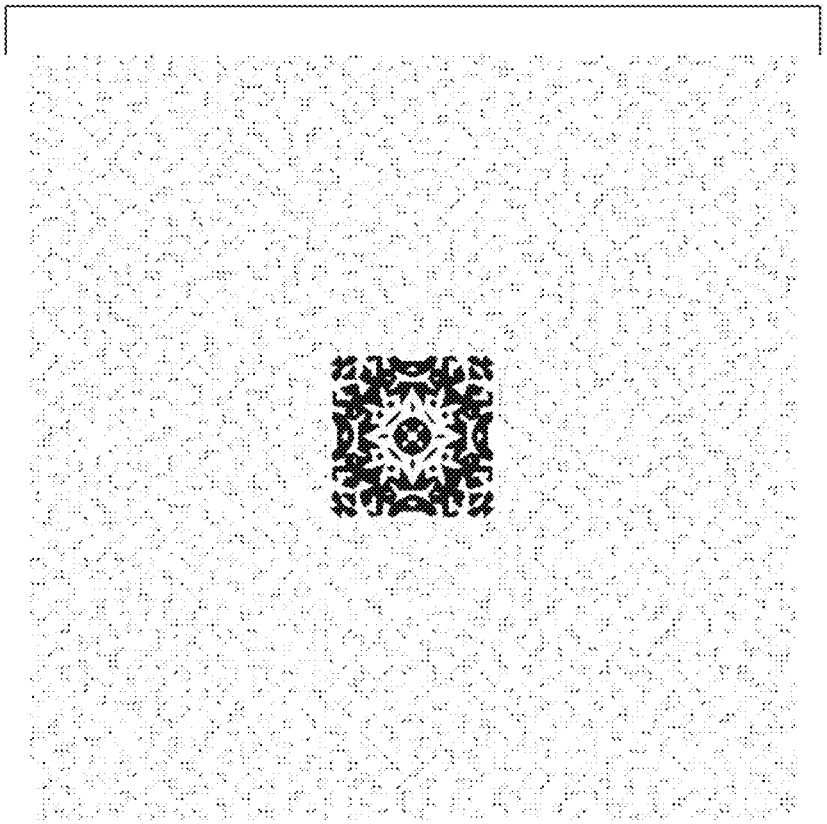
FIG. 50 illustrates that artwork according to aspects of the present technology can include both a conspicuously-structured sub-block, together with seemingly-random elements.

Although the methods so-far detailed have been applied to an entire signal block, this is not required. Such methods can be applied to just an excerpt. FIG. 50 gives an example, in which a single sub-block from a signal block is processed and thresholded to give it a visually-appealing symmetrical structure, but in which the surrounding signal is simply sparsified. (A distinctive pattern, like that shown in the center of FIG. 50, can serve as a "call to action," e.g., indicating that consumers should capture imagery of such area of a package with their smartphones to be linked to additional product information, such as nutritional information.) The particular pattern shown in the center of FIG. 50 is produced by an R4(M4) operation, and is found as a tile in the lower right of FIG. 33.

Moreover, it is not necessary that the transforms be applied to sub-blocks of the same size or shape. Any sizes or shapes, or combinations thereof, can be used, giving rise to countless tiling arrangements. A few examples are shown in FIGS. 51A-51E. In some cases the tiling arrangements may span multiple full signal blocks. And not all tiles need be processed in the same manner. For example, some tiles in a pattern (e.g., the darker tiles in FIG. 50D) may be produced by an M4 transform, while other tiles in the pattern (e.g., the lighter tiles in FIG. 50D) may be produced by an R4 transform, etc.

(Further examples of repetitive patterns that can be used with the present technology are detailed in the appendices, which include Wikipedia articles for Wallpaper Group; Truncated Square Tiling; and List of Euclidean Uniform Tilings.)

Although reference has been made to M4, M6, R4 and R6 transforms, it will be recognized that M2 and R2 transforms are also highly versatile, as they can be used—without cropping—with sub-block shapes having only a single axis of symmetry. Naturally, rotations and mirroring transforms of still different orders can also be used.

Still other aesthetic patterns can be achieved by applying a geometrical transformation to the 2D code signal as one of the pre-processing operations in FIG. 48. Then, at the end of the process, an inverse-geometrical transformation is applied. Such a method is shown in FIG. 51. (The sub-dividing and windowing operations are reversed relative to FIG. 48, as these operations can be performed in any order.)

Figure 52:
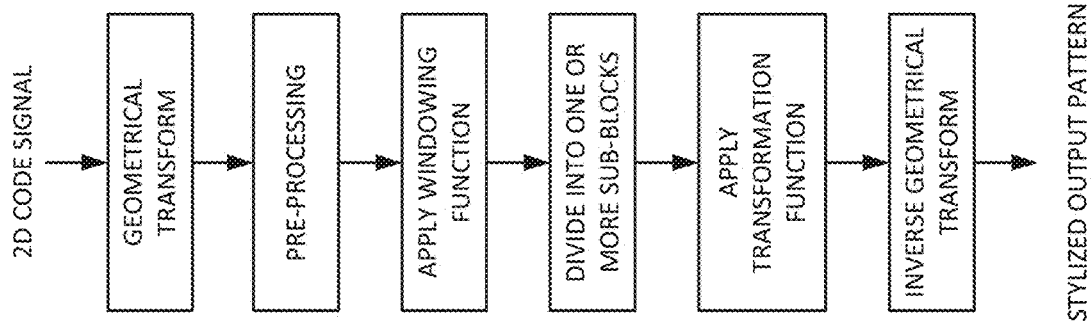
FIG. 52 is a flow chart detailing another particular implementation incorporating aspects of the present technology.

One such geometrical transformation is asymmetrical scaling. For example, the signal block 250 of FIG. 25 may be stretched by a factor of two in the horizontal direction. It is then divided into an array of square sub-blocks, as shown by the stretched signal block of FIG. 52. Each square sub-block is processed, e.g., by an R4 transformation, to produce stylized square tiles. Then, the stretched signal block, comprised of the stylized tiles, is scaled back to its square shape by an inverse geometrical transformation—compressing it by a factor of two horizontally. The resulting stylized tiles comprising the restored square block are no longer square—they are rectangles, twice as tall as they are wide.

Another geometrical transformation is a conformal mapping. Conformal mappings preserve local angles, while preserving rotational and mirror symmetries.

Figure 54:
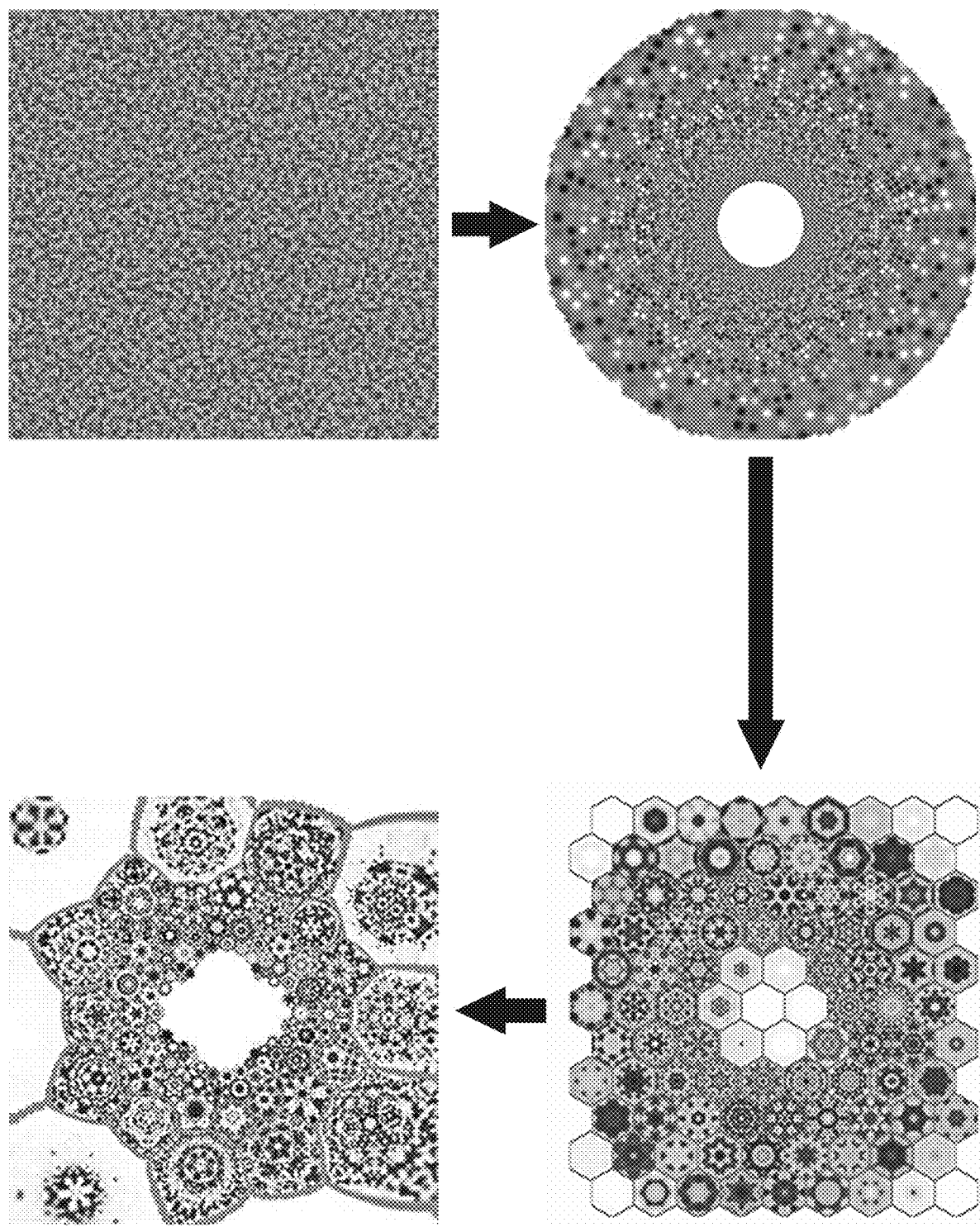
FIG. 54 details how an input signal block can be conformally-mapped into a geometrically-transformed form, after which sub-blocks thereof are symmetrically-transformed, and inverse-conformally mapped.

FIG. 54 illustrates an example using conformal mapping. An input signal block is shown in the upper left. It is conformally mapped to produce the pattern shown in the upper right. The pattern shown in the upper right is then divided into sub-blocks (here hexagonal), which are transformed as detailed above (here using an R6(M) transform, as discussed in connection with FIG. 36B), yielding the pattern shown in the lower right. An inverse conformal mapping is applied to this pattern to yield the output pattern shown in the lower left. Strange but true: a standard watermark detector is readily able to read the payload from this output pattern.

The conformal mapping used is this example is the function $f(z)=1/z$. This is probably the simplest conformal mapping, but there are many others—each of which can be used with the present technology. Some other examples include:

$f(z)=z^2/2$ $f(z)=1/(2z^2)$ $f(z)=SQRT(2)*SQRT(z)$ $f(z)=e^z$ $f(z)=\sin(z)$

Generally speaking, any polynomial function will work.

Figure 55A:
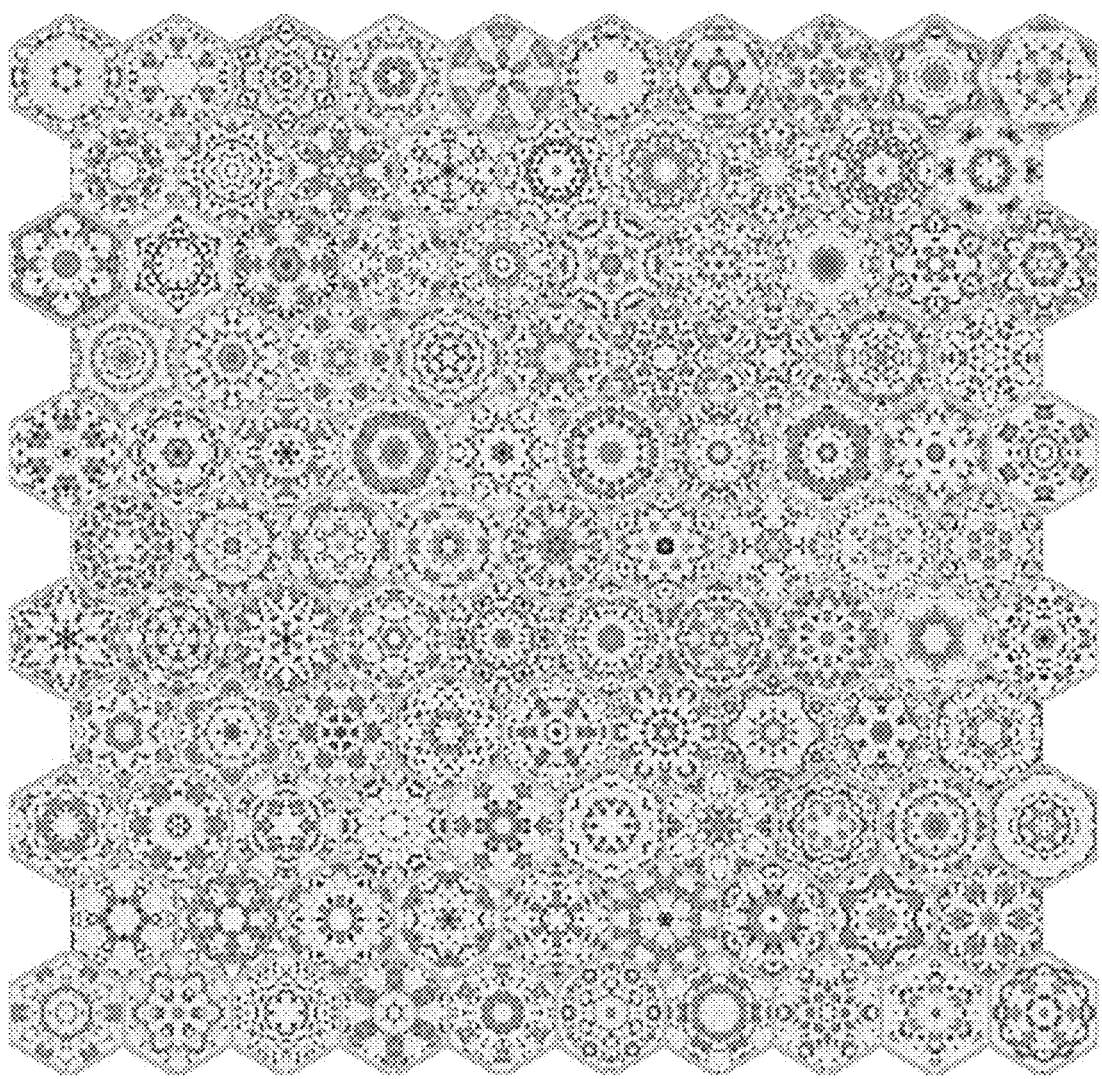
FIG. 55A shows that a patterned signal block may be made lighter by tone-mapping.

As is familiar to graphic artists, a greyscale image can be made lighter or darker by remapping the grey tones to different values. For example, the pattern of FIG. 36A can be tone-mapped to produce the lighter pattern of FIG. 55A.

Figure 55B:
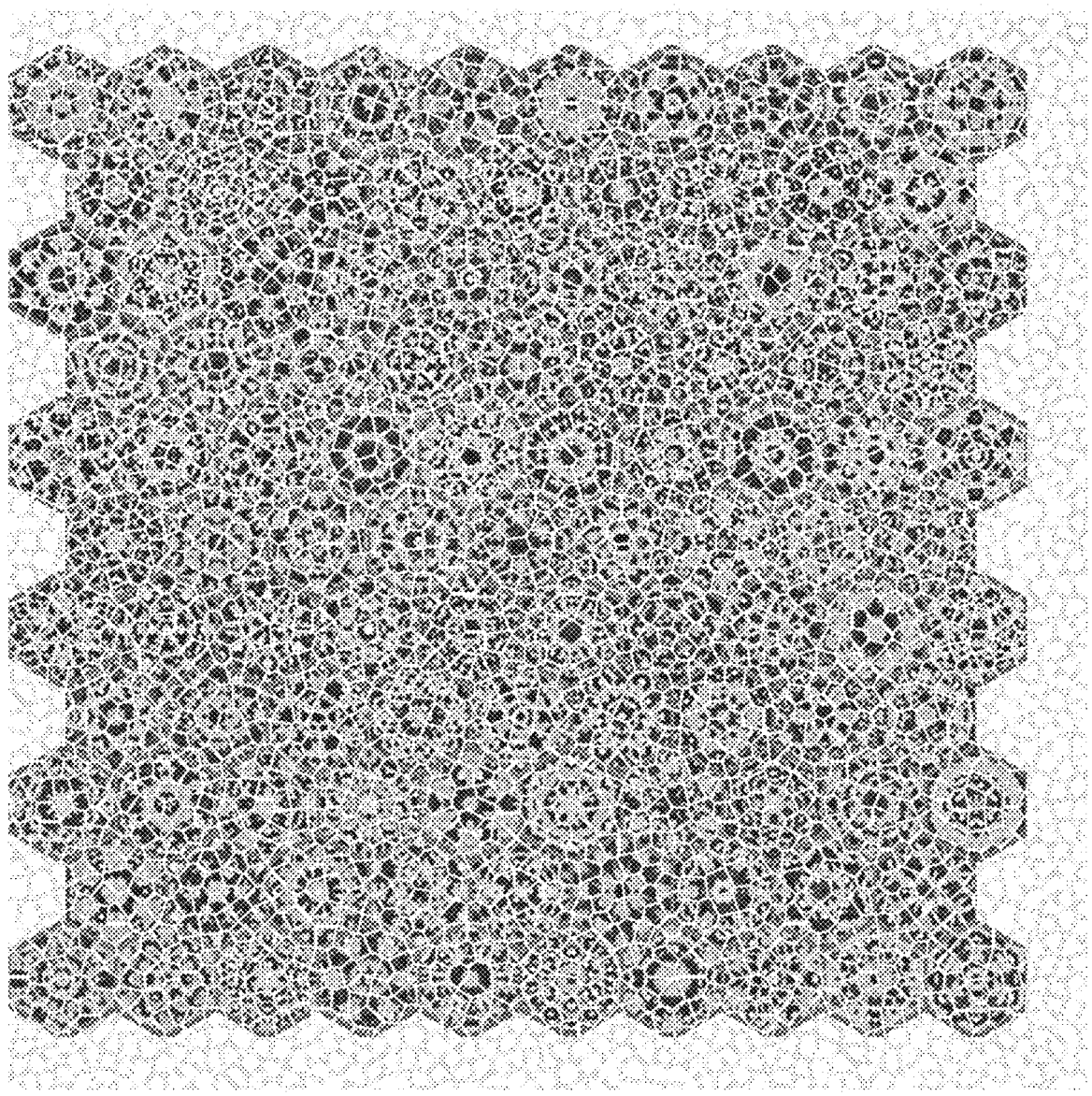
FIG. 55B shows that a patterned signal block may be made lighter by screening.

Another way of lightening or darkening a pattern is by screening with another pattern. One such example is shown in FIG. 55B. This is the pattern of FIG. 36A now overlaid by a pattern of white lines. (The web of white lines is made visible at the margins to aid visual understanding.) Again, due to the highly redundant encoding of the payload in the underlying pattern, the loss of parts of such pattern due to masking by the overlaid line does not prevent watermark reading.

By making the overlaid lines wider or narrower, the composite pattern can be made lighter or darker.

In this case the web of lines is a Voronoi pattern derived from a sparse dot pattern, which in turn is derived from a watermark pattern (e.g., using the methods detailed in application Ser. No. 16/435,164, filed Jun. 7, 2019, published as 20190378235, the disclosure of which is incorporated herein by reference). Thus, the artwork of FIG. 55B can convey two payloads: one in the watermark of the hex-stylized artwork, and one in the watermark of the overlaid screen pattern. Alternatively, both watermarks may convey the same payload, in which case the two watermarks are desirably overlaid in registered alignment, with the same scale, rotation and translation.

If the two watermarks convey different payloads, a watermark signal detector can be configured to decode one or the other, e.g., by using different reference signals or spreading functions in the two watermarks, and employing parameters in the detector that are tailored to one or the other. Alternatively, high-pass or low-pass spatial image filtering can be employed to accentuate one of the two watermark patterns in data submitted to the decoder, causing that pattern to be preferentially read.

Screens of different shapes and forms can naturally be applied, e.g., regular or stochastic dot and line screens that define transparencies and masks. Any pattern can be used as a screen.

Reference was made to converting a greyscale pattern to bitonal by thresholding. To make such a bitonal pattern lighter, the threshold can be changed to reduce the amount of ink deposited. However, this manner of adjustment can seriously compromise signal robustness. Applicant has found that thresholding to yield 50% ink coverage, followed by screening as above-described, preserves more of the signal energy, for a given lightness of the resulting pattern.

It will be understood that patterns produced according to this aspect of the present technology are characterized by an organized structure—one that is usually apparent to human viewers of the pattern. When printed in an end-use application, the structure is typically still human-visible—even if the pattern(s) is incorporated into other artwork (as in FIG. 47). That is, the organized structure patterns are commonly non-steganographic in their end use.

Whether a tile has an organized structure can be determined in several alternate ways. Often such structure manifests as visible symmetry, i.e., one or more axes of symmetry are present in a tile having organized structure. Sometimes such structure is indicated by a central "vortex" feature (e.g., as in FIGS. 37-39, 41 and 42), or by concentric, radial or spiral features (as respectively typified in FIGS. 39, 41 and 42). Still further, tiles having an organized structure typically have a higher auto-correlation that the input data from which they were derived. Furthermore, a histogram of pixel values within such a tile commonly exhibits a "lumpiness" not found in the input data from which it was derived. For example, the northeast quadrant of tile 271 in FIG. 27 is comprised of pixels having values that are replicated in the other three quadrants. Thus, any pixel value found in the tile is found at least four times. This is in contrast to the histogram of the corresponding region of the input signal block, where some pixel values may occur 1, 2 or 3 times. In such case the histogram of the tile has fewer different pixel values, but no pixel value present in the tile is present less than four times. If a tile has any of the foregoing attributes, and the input data from which it was derived does not, then the tile can be regarded as having an organized structure.

While the foregoing discussion has details transformations in the spatial image domain, transformations can likewise be applied in the spatial frequency domain. For example, a 2D code indicia can be transformed from the pixel domain into a DCT representation. In the DCT domain the representation can be sparsified by discarding elements. For example, the odd indexed DCT coefficients may be discarded, while retaining the others. The processed DCT domain representation is then transformed back into the spatial image domain to yield a structured code pattern. (As with other embodiments, thresholding can be applied in the spatial image domain to convert the pattern to bitonal form, and to change the pattern darkness.)

In contrast, it will be recognized that some transformation operations—if applied singly—do not yield organized structure. For example, the structure of an input 2D code signal is not made organized by just scaling it, or by just rotating it, or by just translating (shifting) it.

Moreover, applicant does not mean the present technology to extend to arrangements in which a steganographically-encoded watermark block is simply rendered at plural different scales, or other affine distortions, to extend a range of locations from which it can be read (e.g., as taught in our U.S. Pat. No. 8,412,577).

Concluding Remarks

Having described and illustrated certain features of the technology with reference to illustrative embodiments, it should be apparent that the invention is not so limited. Additional, complementary disclosure of various embodiments is provided in Kamath, Ajith, *Signal Rich Art: Improvements and Extensions*, attached as Appendix B to application 62/972,522. Appendix A and B are hereby incorporated by reference.

As noted, a particular application of the technology is in marking food packaging with watermarked identifiers, without the challenges of keeping the watermark pattern below a threshold of visual perceptibility when rendered on a particular printing press. Instead, by creating a pattern that is made plainly visible, the pattern serves as a deliberate component of package artwork—one that contributes to, rather than detracts from, package aesthetics. In this context, applicant has found that images of fruits, nuts, seeds, grains, beans, and other food items (e.g., gumballs), often serve as suitable style images for the arrangements detailed in Section I. Likewise, geometrical patterns are another class of frequently-suitable watermark style images for food packaging, e.g., as detailed in Section II.

Naturally, the technology is applicable more broadly than in food packaging. Any application in which machine-readable information is to be conveyed can utilize patterns created by the above-described methods. One such other application is in secure documents, where such patterns can be used as ornamental backgrounds or design elements for checks, passports, drivers licenses, airport boarding passes, and the like. As in other applications, a reader device can decode a payload encoded by such a pattern, and take an action based thereon (e.g., opening a turnstile to admit a passenger to an airplane).

Although the technology is illustrated with reference to digital watermark technology, the principles are similarly applicable to other machine-readable codes/symbologies.

The artisan is presumed to be familiar with methods of generating watermark blocks, e.g., from the patent documents cited herein. With such knowledge by way of background, the process for generating watermark pattern of FIG. 1B can be summarized essentially as follows. An ensemble of 64 2D spatial sinusoids spanning the watermark block, of different frequencies and phases, are summed together and sampled (e.g., based on a 128×128 waxel array) to form a reference signal component (used by the watermark detector to discern affine transformation of the watermark pattern within captured imagery). This reference signal is clipped at the 13.5 and 86.5 percentile levels (lower and upper clipping limits) and added to a binary payload signal at an amplitude (relative to the reference signal) of 0.55.

This binary payload signal is formed by applying a payload (e.g., of 50 bits), together with associated CRC data (e.g. of 25 bits), to a convolutional encoder to produce a 1024 bit signature. This signature is randomized by XORing with a 1024 bit scrambling key. Each of the resulting bits is modulated by XORing with a fixed 16-bit spreading key sequence, transforming each of the randomized signature bits into 16 binary "chips," yielding 16,384 such chips. Each chip is assigned a different location in a 128×128 waxel array by data in a scatter table. At waxel locations where a "1" chip is mapped, the value of the underlying signal (e.g., a flat grey signal of constant value 128) is increased; at waxel locations where a "0" chip is mapped, the value of the underlying signal is decreased.

The combined signal that results from summation of these payload chips with the reference signal values may have a resolution of 75 watermark elements (waxels) per inch (WPI). A Gaussian bump shaping function is then applied to up-sample the 75 WPI tile to the desired DPI. For example, to up-sample to a 300 DPI embedding resolution, the following 4×4 bump shaping function can be applied:

$$B = \begin{bmatrix} 1 & 4 & 4 & 1 \\ 4 & 16 & 16 & 4 \\ 4 & 16 & 16 & 4 \\ 1 & 4 & 4 & 1 \end{bmatrix}$$

If $T_{128}$ is the 75 WPI tile, the 300 DPI tile is obtained as follows $T_{512}=T_{128} \otimes B$, where $\otimes$ is the Kronecker tensor product. Finally, the amplitude of the 128×128 waxel block is scaled to the desired range depending on the embedding strength. (In the present correlation-based embedding case, the amplitude of the signal block is not relevant, except for rounding errors.)

The payload information conveyed by the watermark can represent a product GTIN, metadata specified by a user, etc. This information may literally be encoded in the payload, or the payload may be a generally-unique ID that serves as a pointer into a local or remote database where corresponding information is stored.

In a particular embodiment the watermark conveys a payload of 32 bits. This payload can be segmented into various fields, which represent different items of information. Some fields can convey an index or flag (yes/no) value. If needed, each index value can be resolved into a literal text, date string, or value (or range of values) by reference to a data structure, such as a table or database.

FIG. 56 depicts examples of images carrying machine-readable codes.

The image on the far left is formed by placing or removing markings comprised of a regular pattern according to a machine-readable, digital watermark signal. In this case, the regular pattern consists of horizontal rows/columns of spaced apart dark blocks, but a variety of graphic primitives may be used as this base pattern. These primitives may be squares, circles, tringles, or various other shapes corresponding to mark or no-mark areas when applied to a physical object by printing, embossing, engraving, ablating, etching, thermal marking, or the like (e.g., ink or no ink; or mark or no mark on an object, including within one or more color separations applied to the object). To generate the data carrying image, the image formation process modifies the pattern according to the digital watermark signal. This can be implemented as a screening or masking process. Here, screening refers to forming the composite signal from screen elements, which are graphic primitives. Masking refers to removing the base pattern according to binarized watermark signal (locations where the watermark is a binary 1 value retain the base pattern, whereas locations where the watermark value is a binary 0 value are removed, or vice versa). For example, the dark square graphic primitive elements fill in regions where the watermark signal is below a darkness level, or the absence of marks fill in regions whether the watermark is above a darkness level (as represented by brightness, grayscale, luminance value, or the like). This process generates a composite image comprising parts of the pattern of graphic primitives and light areas that together form a machine-readable digital watermark signal. This composite image carries the digital watermark because the placing of the pattern, or conversely the shaping of the non-marked areas in the pattern, form the date carrying signal.

The image in the center depicts an example of an image in which a digital watermark signal is conveyed in the line breaks of the line art pattern. In this case, the pattern formed of line and line breaks convey the digital watermark signal. Again, dark elements are placed corresponding to dark elements of the digital watermark signal in a screening or masking method to place line elements or insert line breaks.

The two images on the far right depict a third example image, shown at different scales. This third image is formed from first and second source images, each encoded with distinct machine-readable signals. The first and second images are combined to form a composite image in which both the machine-readable signals are readable. A first source image carries a first machine readable data payload encoded at a first resolution (e.g., as quantified in cells per inch of data carrying cells within a tile). A second source image carries a second machine readable code at a second, higher resolution. In this example, the first image is a binarized digital watermark image generated at a resolution of 75 watermark cells per inch. The second source image is a Voronoi pattern encoded with a digital watermark at 150 watermark cells per inch. Various of the binarized watermark signal and signal rich patterns described in this document and incorporated documents may be used for the first and second source images (e.g., Voronoi, stipple, Delaunay, or other stylized data carrying artwork). These two images are combined using an image editing operation in cells at the higher cells per inch resolution in which the markings in the cell of the first image are replaced with or substituted for markings in corresponding cell locations (e.g., corresponding X, Y pixel coordinates) of the second image.

This approach is a method of creating a counterpart to a target image, the target image comprising two distinct 2D machine-readable codes. The counterpart is a composite image made from two source images. This composite image has an attribute of being decodable by a compliant reader apparatus to produce a plural-symbol payload earlier encoded therein, and in particular, two different plural-symbol payloads originating in the two source images.

The method generates a first image at a first resolution, the first image carrying a first machine-readable code. As noted, this may be accomplished by binarizing a digital watermark signal, or digitally watermarked image, using the various methods described in this or incorporated documents.

The method also generates a second image at a second resolution higher than the first resolution, the second image carrying a second machine readable code. Likewise, this may be accomplished with a binarized digital watermark or watermarked image, including the approaches of generating stylized artwork bearing a digital watermark using Voronoi, stipple, Delaunay, style transfer, and related masking or screening methods described or incorporated in this document.

The method inserts parts of the second image into the first image to create a composite image. In one approach, it substitutes parts of the second image for parts of the first image at corresponding locations in the first and second image where both the first and second images have a marking. This can be accomplished, for example, by an element-wise logical AND operation of binarized versions of the two source images, where the elements are spatial cells of each image in a 2D pixel array at the resolution of the higher resolution image. It may also be accomplished by screening a first source image with the primitive elements in the cells of the higher resolution source image. It may also be accomplished by a masking operation (e.g., masking one source image with the other) such that the high resolution marked cells of the second source are placed within the lower resolution marked cells of the first source image. This method generates a composite image in which the first and second machine-readable codes are decodable from an image captured of an object bearing the composite image. Inverse operations may also be performed with un-marked elements to make light regions within a dark background.

These methods for plural codes in one image are particularly suitable for source images that are vector graphics, such as line art. For example, the second image parts comprise vector graphics that are substituted for artwork of the first image. Both the binarized first source image (e.g., a binarized digital watermark or digitally watermarked image) and second source image may comprise vector graphic artwork.

As noted, the combining of the first and second source images maybe implemented in variety of ways. One approach is the substituting elements from the second source into the first with a pixel wise AND operation at the corresponding locations. These corresponding locations are corresponding pixel coordinates in the first and second images.

The method applies for any embodiments where the first image comprises a binarized watermark signal and the second image comprises artwork carrying a watermark signal at a resolution higher than the binarized watermark signal. For example, the second image may comprise a stylized image of data carrying graphical elements. These data carrying elements may be a stipple pattern, Voronoi pattern, Delaunay pattern, or other signal rich art method, including style transfer method and its variants described herein.

The composite image may comprise two distinct machine-readable codes from the first and second images that are machine readable from images captured at corresponding first and second depth ranges, the first depth range comprising a maximum distance of a camera from a marked object bearing the composite image that is greater than a maximum distance in the second depth range. This is achieved by encoding the plural machine codes in the source images at different spatial resolutions. Relatively lower resolution codes are readable at a depth range spanning at least some further distances than relatively higher resolution codes, which are readable at depth range spanning at least closer distances between the image sensor and marked object. Of course, the depth ranges may have overlapping distances.

For more examples and explanation of the examples in FIG. 56, please see Appendix B, filed with application 62/972,522.

The processes and arrangements disclosed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nVidia Tegra 4. Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC). Additional details concerning special purpose electronic circuitry are provided in our U.S. Pat. No. 9,819,950.

Software instructions for implementing the detailed functionality can be authored by artisans without undue experimentation from the descriptions provided herein, e.g., written in C, C++, Visual Basic, Java, Python, Tcl, Perl, Scheme, Ruby, Matlab, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

Details concerning watermarking included in embodiments of the present technology are detailed in certain of the references earlier-identified, and are also disclosed in applicant's U.S. Pat. Nos. 6,122,403, 6,590,996, 6,614,914, 6,975,744, 9,747,656, 9,959,587, 10,242,434, 20170024840, 20190266749, 20190306385 and 20160364623.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular orderings of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention.

The invention claimed is:

1. A method of producing an output 2D machine-readable indicia from an input 2D machine-readable indicia, comprising the acts:
    identifying a first excerpt of the input 2D machine-readable indicia;
    processing the excerpt to yield a tile having an organized structure, by applying to said excerpt a conformal mapping function, yielding a first interim result; applying to said first interim results one or more transformation operations, including at least one transformation operation from the list: (a) mirroring, (b) rotating, (c) translation, (d) toroidal shifting, (e) signal-inverting, (f) scaling and (g) glide-reflection transformation, to yield a second interim result; and applying an inverse conformal mapping function to the second interim result to yield said tile; and
    incorporating said tile in the output 2D machine-readable indicia.

2. A tangible article bearing a 2D machine-readable indicia, said indicia comprising a first excerpt of a machine-readable code that is presented two or more times in transformed form relative to each other, said transformed form comprising (a) mirrored, (b) rotated, (c) translated, (d) toroidally-shifted, (e) inverted, (f) scaled and/or (g) glide-reflection-transformed form, wherein said indicia conveys a plural-symbol payload that enables a compliant camera-equipped decoder system to access information relating to said article.

3. The article of claim 2 comprising packaging for a retail item, wherein said payload conveys a Global Trade Item Number (GTIN) for said item.

4. The article of claim 2 comprising packaging for a retail item, wherein said payload enables the complaint camera-equipped decoder system to access price information for said item.

5. The article of claim 2 comprising packaging for a food item, wherein the payload enables the compliant camera-equipped decoder system to obtain nutritional information about the food item.

6. The article of claim 2 in which said first excerpt is the entire machine-readable code.

7. The article of claim 2 in which said first excerpt of the machine-readable code is presented three or more times, in three or more different forms, in said indicia.

8. The article of claim 2 in which said three or more times includes two or more of said forms (a)-(g).

9. The article of claim 2 in which said first excerpt is square and has a side dimension shorter than a shortest side dimension of the machine-readable code.

10. The article of claim 2 in which said two or more forms of the first excerpt are presented in normalized-sum form in said 2D machine-readable indicia.

11. The article of claim 2 in which the first excerpt is square with a first side dimension, and the machine-readable indicia is also square, also with said first side dimension.

12. The article of claim 2 in which the 2D machine-readable indicia has two or more axes of symmetry.

13. The article of claim 2 in which the 2D machine-readable indicia has four or more axes of symmetry.

14. The article of claim 2 in which the 2D machine-readable indicia is bitonal.

15. The article of claim 2 in which said two or more presentations of the first excerpt occupy a shared space on the article, said shared space having an area equal to an area of the first excerpt.

16. The article of claim 2 in which said two or more presentations of the first excerpt occupy different, non-overlapping space on the article.

17. The article of claim 2 in which a portion of the machine-readable code is not presented in said indicia.

18. The article of claim 2 wherein said indicia conveys a plural-symbol payload that enables a compliant camera-equipped decoder system to access information relating to said article from a database.

19. The article of claim 2 in which the 2D machine-readable indicia further includes a second excerpt of the machine-readable code, different than said first excerpt, wherein said second excerpt is presented two or more times in (a) mirrored, (b) rotated, (c) translated, (d) toroidally-shifted, (e) inverted, (f) scaled and/or (g) glide-reflection-transformed form relative to each other.

20. A non-transitory computer readable medium containing instructions for configuring a processing system to produce an output 2D machine-readable indicia from an input 2D machine-readable indicia by acts including:
    identifying a first excerpt of the input 2D machine-readable indicia;
    processing the first excerpt to yield a tile having an organized structure, by applying to said first excerpt one or more transformation operations, including at least one transformation operation from the list: (a) mirroring, (b) rotating, (c) translation, (d) toroidal shifting, (e) signal-inverting, (f) scaling and (g) glide-reflection transformation;
    incorporating said tile in the output 2D machine-readable indicia; and
    rendering said output 2D machine-readable indicia on a tangible article to be visible to human observers, wherein the output indicia has a non-steganographic form on said article.

* * * * *